United States Patent [19]

Glaser et al.

[11] 4,382,277

[45] May 3, 1983

[54] METHOD AND MEANS UTILIZING MULTIPLE PROCESSING MEANS FOR DETERMINING DEGREE OF MATCH BETWEEN TWO DATA ARRAYS

[75] Inventors: Edward L. Glaser, Santa Monica; Louis M. Galie, Culver City, both of Calif.

[73] Assignee: System Development Corp., Santa Monica, Calif.

[21] Appl. No.: 38,517

[22] Filed: May 14, 1979

[51] Int. Cl.³ .................. G06F 7/20; G06F 15/16
[52] U.S. Cl. .................. 364/200; 340/146.2; 364/728
[58] Field of Search .......... 364/728, 200 MS File, 364/900 MS File; 340/146.3 A, 146.2

[56] References Cited

U.S. PATENT DOCUMENTS

| | | | |
|---|---|---|---|
| 3,221,158 | 11/1965 | Roth et al. | 364/900 |
| 3,748,451 | 7/1973 | Ingwersen | 364/728 |
| 3,816,722 | 6/1974 | Sakoe et al. | 364/728 |
| 3,947,673 | 3/1976 | Jordan et al. | 364/728 |
| 4,084,260 | 4/1978 | Fleming et al. | 364/900 |

Primary Examiner—Gareth D. Shaw
Assistant Examiner—Eddie P. Chan
Attorney, Agent, or Firm—Christie, Parker & Hale

[57] ABSTRACT

Method and apparatus are disclosed for determining a particular criterion value and an associated positional value for the degree of match between the juxtaposition of a plurality of events of a query and a plurality of corresponding events of a stored data base entry. Plural processors are utilized. Each processor includes a plurality of data stores and a temporary store for each data store. Each data store stores a group of data values. The data values are priorly formed and represent the number of event positions between the occurrence of events in the query and the occurrence of the corresponding events in the stored data base. The plural processors, working together using the plural data stores and the temporary stores, form determined data values and sum-of-distance values which are then used for deriving a criterion value and a positional value corresponding to the degree of match between the query and the data base.

33 Claims, 37 Drawing Figures

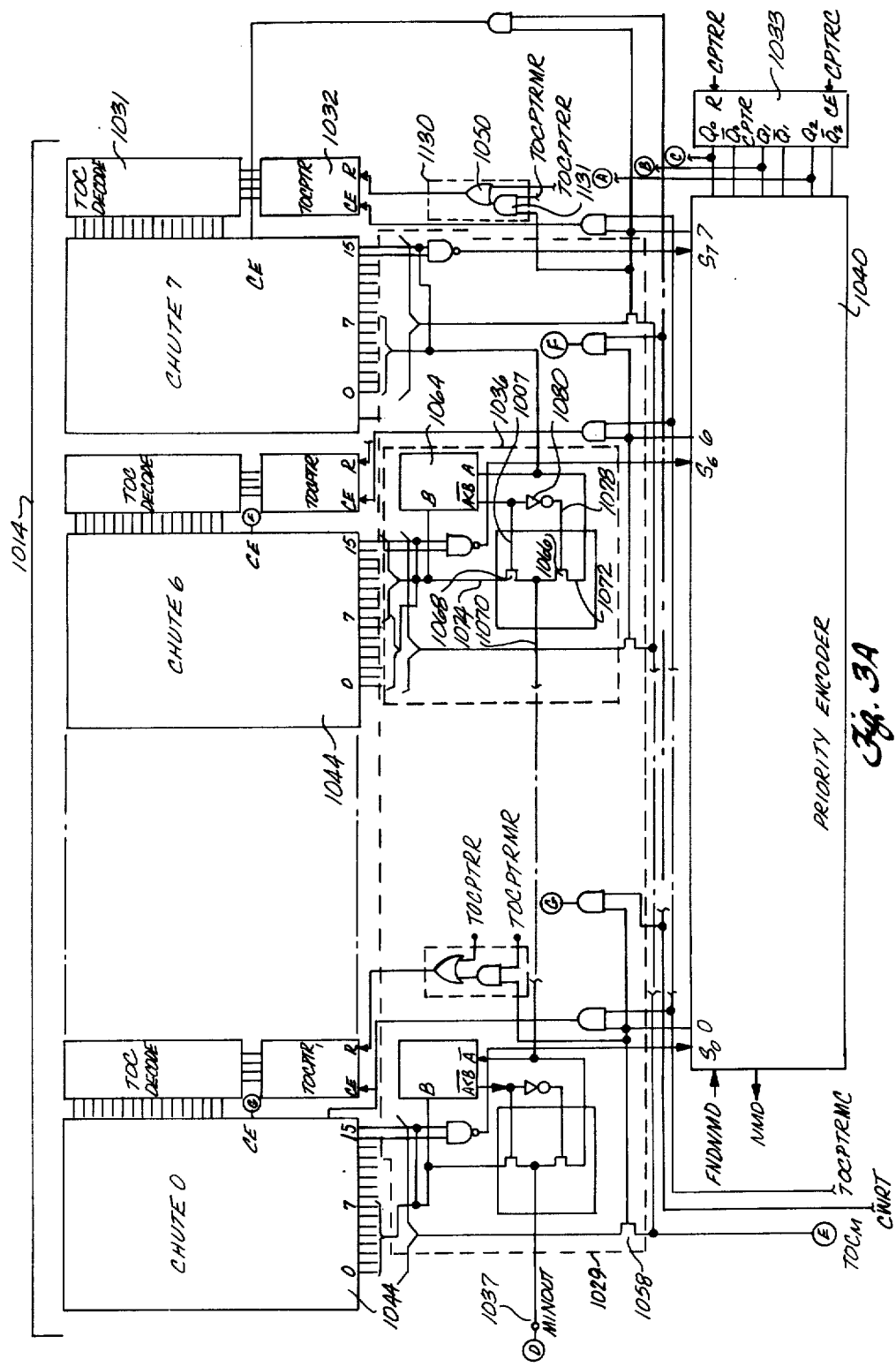

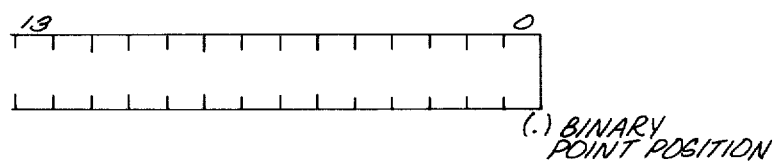
Fig. 7A
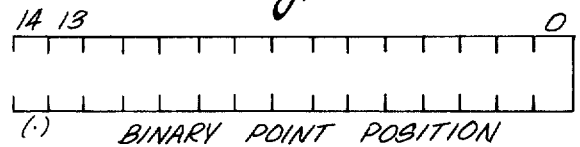
Fig. 7C
Fig. 8
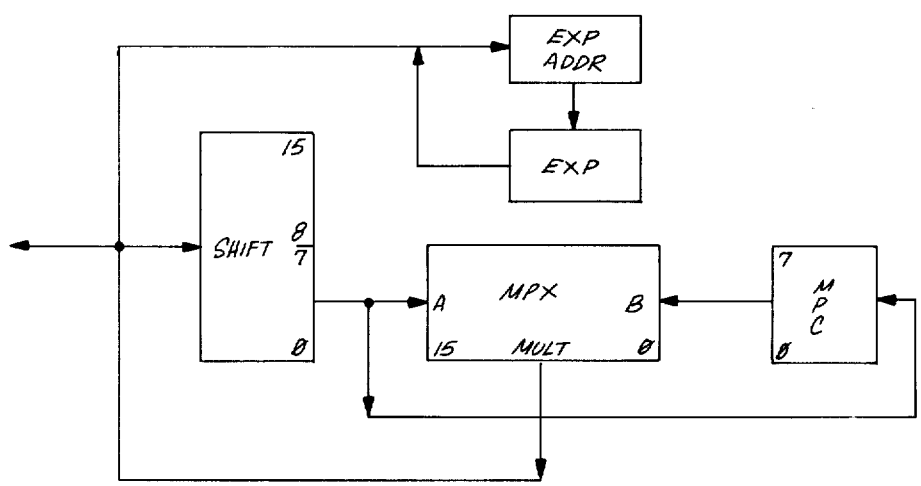

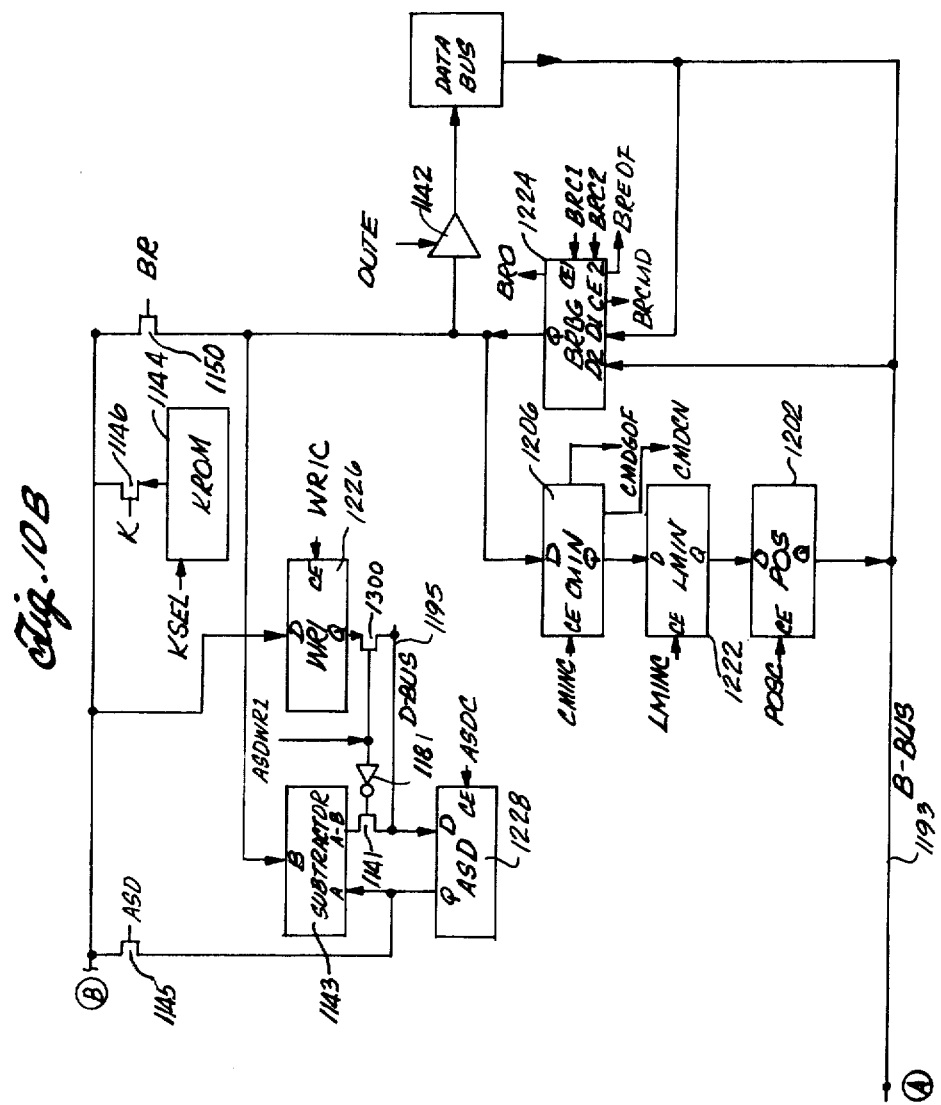

Fig. 10c
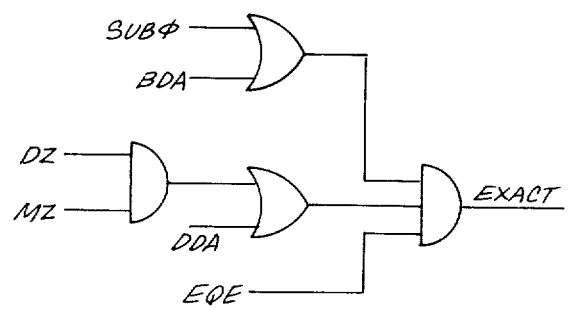
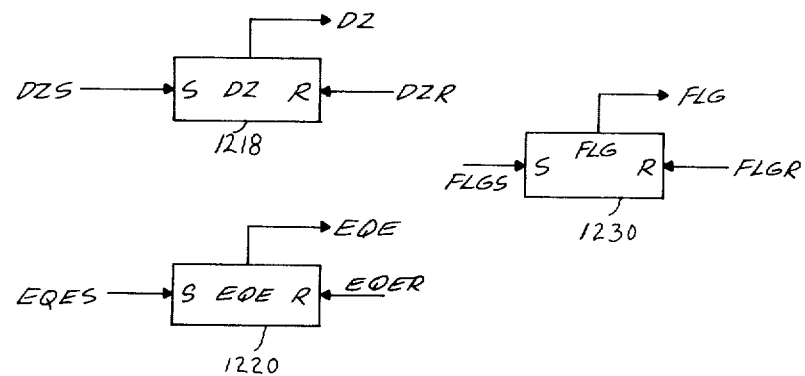

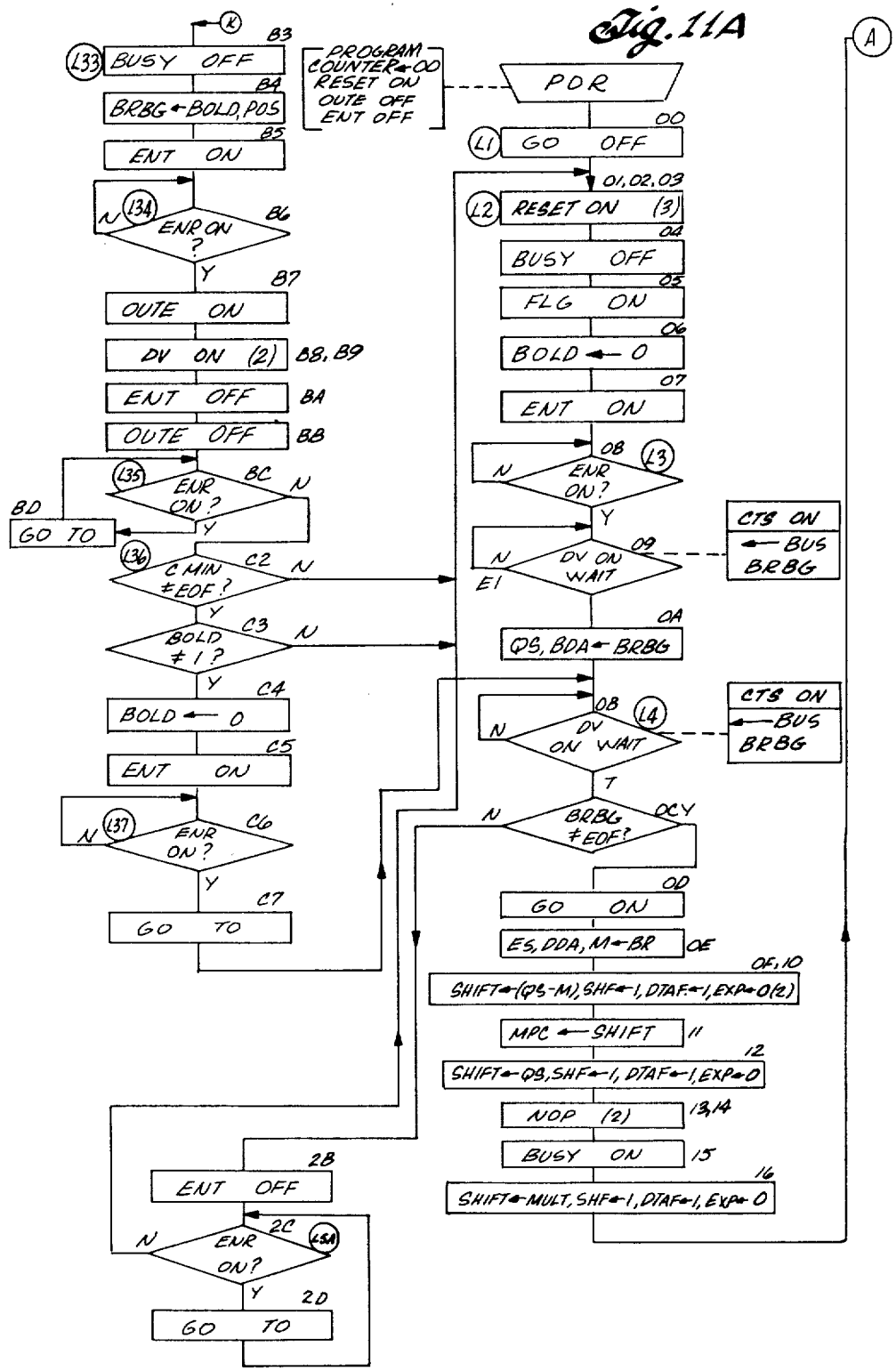

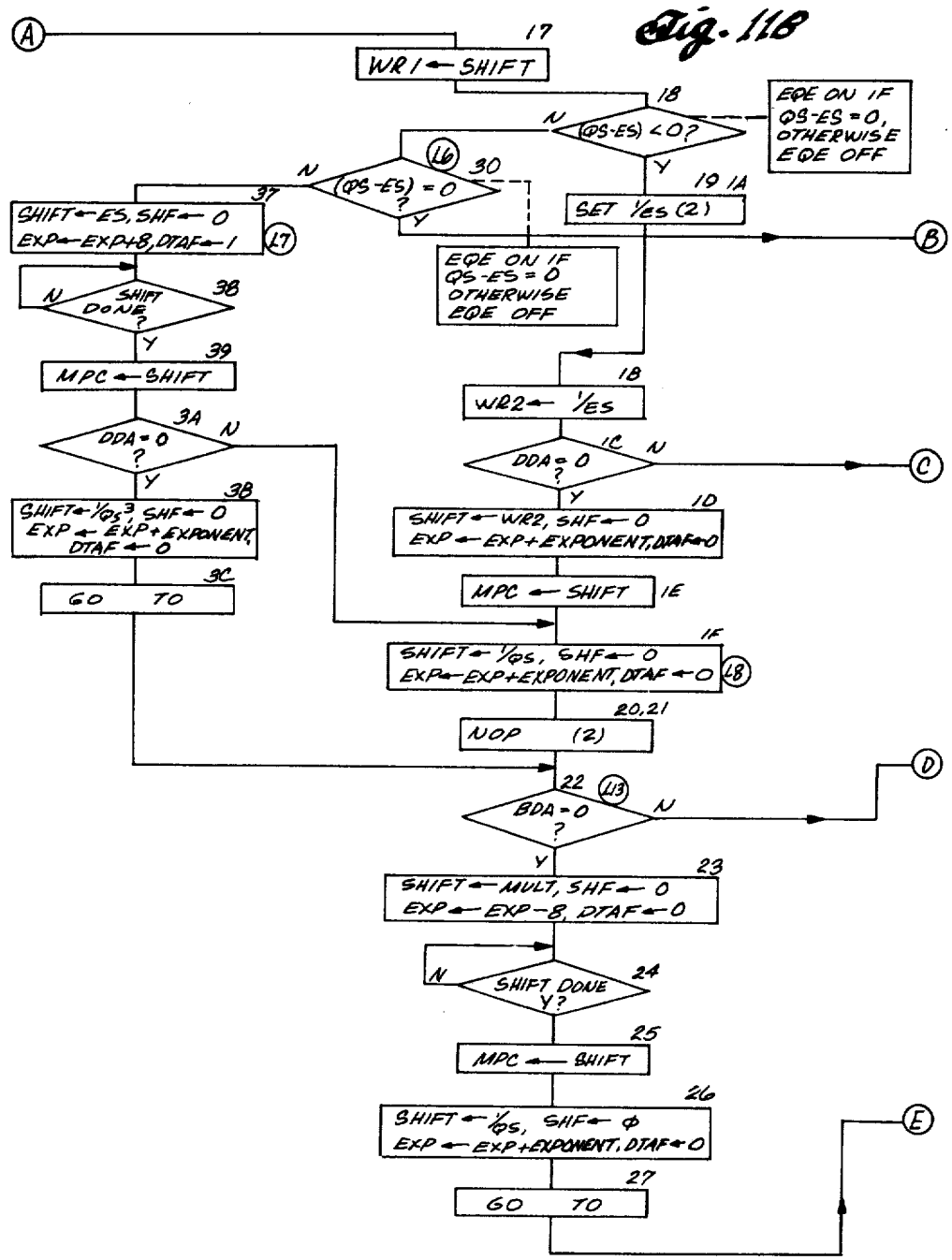

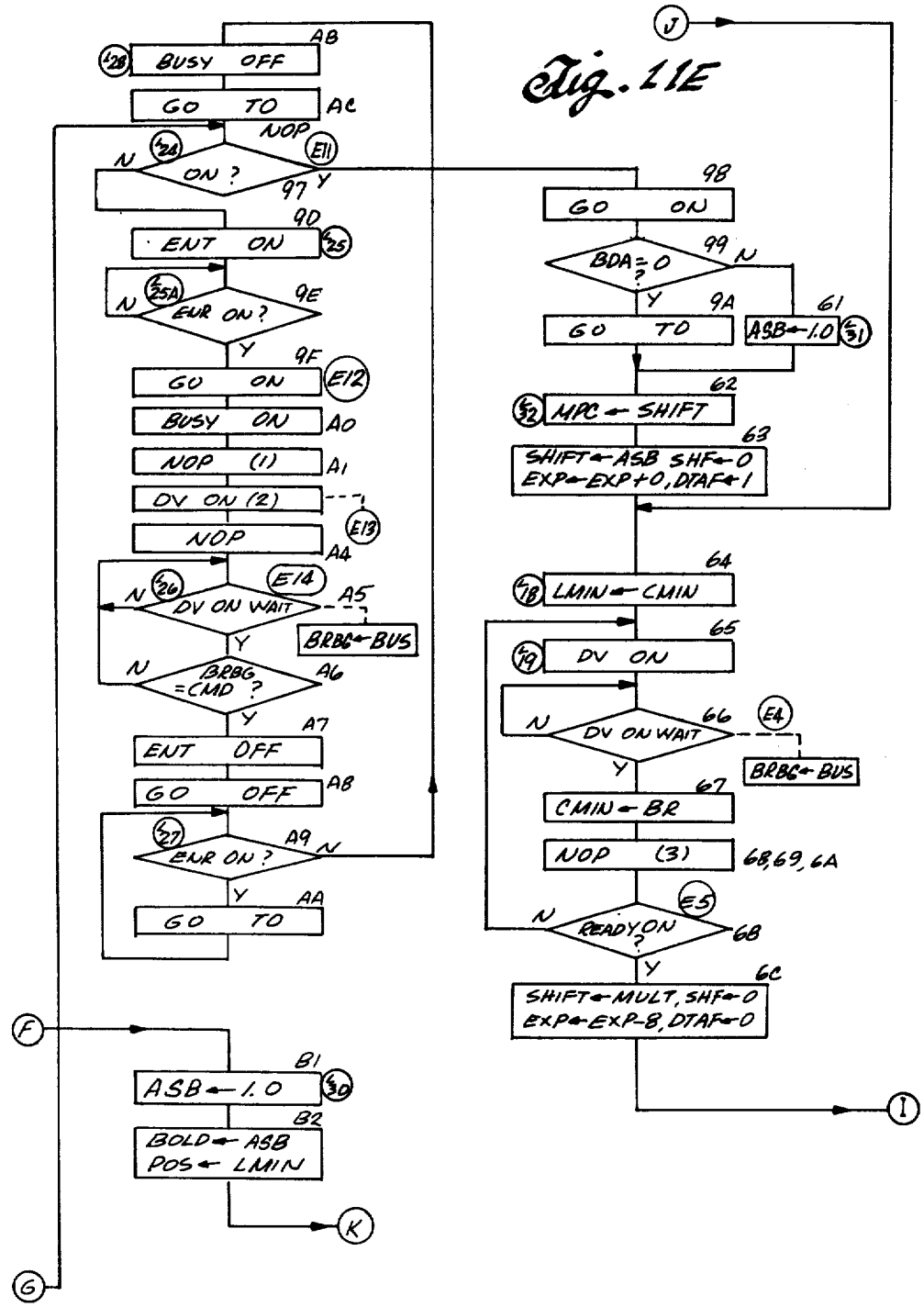

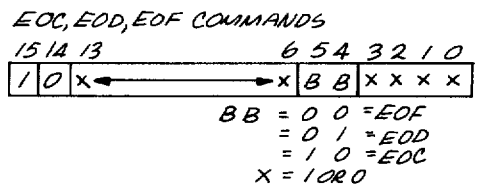
Fig. 13A  EOC, EOD, EOF COMMANDS
BB = 0 0 = EOF
= 0 1 = EOD
= 1 0 = EOC
X = 1 OR 0
Fig. 13B  NMD COMMAND
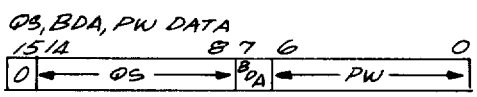
Fig. 13C  QS, BDA, PW DATA
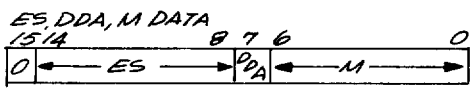
Fig. 13D  ES, DDA, M DATA
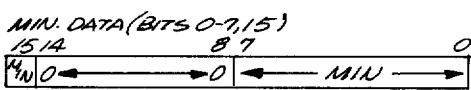
Fig. 13E  MIN. DATA (BITS 0-7, 15)
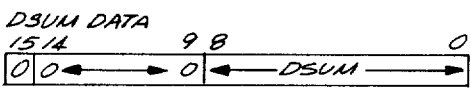
Fig. 13F  DSUM DATA
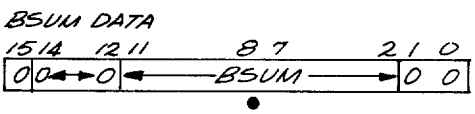
Fig. 13G  BSUM DATA
• = BINARY POINT
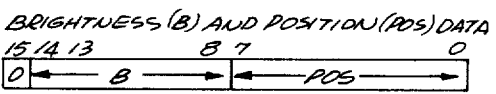
Fig. 13H  BRIGHTNESS (B) AND POSITION (POS) DATA
• = BINARY POINT
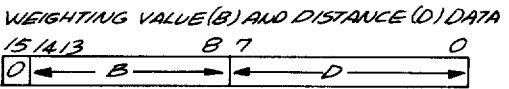
Fig. 13I  WEIGHTING VALUE (B) AND DISTANCE (D) DATA
• = BINARY POINT

METHOD AND MEANS UTILIZING MULTIPLE PROCESSING MEANS FOR DETERMINING DEGREE OF MATCH BETWEEN TWO DATA ARRAYS

CROSS REFERENCE TO RELATED APPLICATIONS

U.S. application U.S. Ser. No. 038,518 titled DATA PROCESSING METHOD AND MEANS FOR DETERMINING DEGREE OF MATCH BETWEEN TWO DATA ARRAYS, now U.S. Pat. No. 4,290,115 filed on even data herewith in the names of Galie, Glaser and Pitt discloses common subject matter with this application.

BACKGROUND OF THE INVENTION

This invention relates to digital data processing systems and more particularly to method and means utilizing data processing means for determining the degree of match between two data arrays.

Data processing methods and means are known for processing data arrays. Methods and means of this type are also known which look for a match between one data array, hereinafter called a query, and a stored data base array.

One method and means of the latter type is disclosed in U.S. Pat. No. 4,068,298. This patent discloses a method and means using concepts called "piping" and "brightness" to locate those entries in a stored data base which have a predetermined degree of match, i.e., "brightness", to a query. Event times or time ticks are used to represent the order of occurrence of events and entries (composed of events) making up the data base. Utilizing the time ticks, the method and means determine those stored data base entries which have a predetermined degree of match with the query. The number of event positions of displacement between an event of the query and a corresponding (i.e., like) event in the data base is used in determining the predetermined degree of match. As a result, exact and inexact retrievals of data from the stored data base are more easily, efficiently and rapidly achieved.

The above referenced application titled DATA PROCESSING METHOD AND MEANS FOR DETERMINING DEGREE OF MATCH BETWEEN TWO DATA ARRAYS is broadly directed to an improved method and means utilizing data processing means to aid in the process of rapidly and efficiently determining the degree of match between a query array and a stored data base array. This application discloses method and means which operate on or utilize a priorly-formed array of data values. Each data value represents the number of event positions between the occurrence of events in the query and the occurrence of corresponding events in the stored data base. The method and means use the priorly-formed array of data values to rapidly and efficiently process and determine the position or entry in the stored data base which has the best match with the query and importantly forms a criterion value. The criterion value relates to the "brightness" or degree of match between the query and the identified entry in the stored data base.

SUMMARY OF THE INVENTION

Briefly, a method according to the present invention utilizes a plurality of data processing means. Each data processing means comprises a plurality of data stores and a corresponding temporary store for each such data store. The method determines a particular criterion value for the degree of match between the juxtaposition of a plurality of events of a query and a plurality of corresponding events of a stored data base entry. The method utilizes a priorly-formed array of data values in which each data value represents the number of event positions between the occurrence of an event in the query and the occurrence of a corresponding event in the stored data base. A group of one or more data values is provided for each of a plurality of different types of query events. Each different group is stored in a different data store with the data values thereof arranged in a monotonic order from a first end. The method is summarized as follows:

Designate in each data processing means a data value in each of a plurality of the data stores as a first data value. Detect in each data processing means at least one of the designated first data values which has a predetermined magnitude relative to the other designated first data values in such data processing means. Determine from among the detected data values for all of the data processing means that detected data value which has a predetermined magnitude relative to the others and provide a corresponding determined value. Store in each data processing means the at least one detected data value in the temporary store which corresponds to the data store in which the detected data value is detected. Form in each data processing means for each of the individual data stores thereof a first distance value which represents the algebraic difference between the determined data value and the designated data value for such data store. Form in each data processing means for each individual data store thereof a second distance value representing the algebraic difference between the determined data value and the data value in the temporary store corresponding to such individual data store. Select in each data processing means for each of individual data stores a distance value from the corresponding first and second distance values, the selected distance value having a predetermined magnitude relative to the other. Form in each data processing means for a detected data value a sum-of-distance value which represents the sum of the absolute values of the selected distance values formed therefrom. Designate in each data processing means a new data value in the data value stores containing the determined data value and repeat the steps, including the present step, using such new data value and the new designated data value. The step of designating a new data value designates in a predetermined order in the monotonic order of data values the next data value from the one which was previously designated. Finally, utilize the sum-of-distance values, which correspond to the determined data values, provided in each data processing means during the preceding steps for deriving such criterion value.

Preferably, the method determines a particular positional value which is associated with the criterion value and the last step utilizes the determined data values and the corresponding sum-of-distance values which correspond to the determined data values for deriving both the criterion value and a positional value.

Preferably, the data values in each group are arranged in a monotonic order with the smallest data value as a first data value and the step of detecting detects the smallest data value of the first data values.

Preferably, the step of determining determines the smallest of the designated first data values.

Preferably, in each data processing means the step of selecting selects the smallest of the first and second distance values.

Preferably, in each data processing means there is a store for a pipewidth value. The method additionally, for each data processing means, includes the following steps: Detect a predetermined relation between each algebraic difference used in the step of forming a sum-of-distance value, and a value in the pipewidth value store, operative upon the detection of such a predetermined relation as to a particular algebraic difference for substituting a predetermined value for such algebraic difference when forming such sum-of-distance value.

Preferably, in each data processing means, if the formed distance value represents zero for a particular data store, the designated data value is stored in the temporary store which corresponds to such data store, and the next data value in such data store is designated as the first data value.

Preferably, the data processing means includes a store for a positional value and a positional value which corresponds to a determined data value is stored in the positional value store.

Preferably, each data processing means has a weighting value stored in the data store in association with each of the data values. The method includes the additional step of combining the weighting values that are associated with the data values that are used in the step of forming a sum-of-distance value to thereby form sum-of-weighting values.

Preferably, in each data processing means, each temporary store and corresponding data store which have a data value in the temporary store and a designated first data value, the method includes the following steps: Detect if the distance values formed from the data value in the temporary store and the designated data value of the corresponding group are equal. Select from the two weighting values that are associated with the data values which are associated with the distance values that are detected equal, that weighting value which has a predetermined magnitude relative to the other. Utilize the selected weighting value in the step of combining the weighting values. Also, preferably in each data processing means, the step of selecting from the two weighting values includes the step of selecting the largest weighting value of the two weighting values. Preferably, for a determined weighting value, the sum-of-distance value and the corresponding sum-of-weighting value formed in each data processing means are combined to form a criterion value.

Preferably, the data processing means comprises a store for a criterion value, and for a determined data value the sum-of-distance value and the corresponding sum-of-weighting value formed in each data processing means are combined to form a criterion value. The criterion value replaces a priorly-formed criterion value in the criterion value store if the newly-formed criterion value has a predetermined relation to the value in the criterion value store. Preferably, the value in the criterion value store is replaced with the newly-formed criterion value when the newly-formed criterion value exceeds the value in the criterion value store. Preferably, there is a store for the positional value and the value in the positional value store is replaced with the positional value corresponding to the detected data value used in forming a criterion value having the predetermined relation to the value in the criterion value store.

Preferably, the step of utilizing comprises the step of forming a criterion value "B" according to the following:

$$B = (QS(QS - M) - SSD)(M + SSB)\frac{MIN(QS,ES)}{MAX(QS,ES)} \cdot \frac{1}{QS^3}$$

Where:
QS = the plurality of events of a entry,
ES = the plurality of events of a stored data base entry,
M = the number of events in the query for which at least one corresponding event type is not found in the entry,
SSD = the total of the sum-of-distance values from each data processing means,
SSB = the total of the sum-of-weighting values from each data processing means,
MAX(QS,ES) = the larger of QS and ES, and
MIN(QS,ES) = the smaller of QS and ES.

Preferably, the steps of the process are repeated until all data values in the data stores in all data processing means have been processed in accordance with the recited method.

In addition to the method, means is disclosed for performing the aforementioned method.

A number of advantages flow from the method and means according to the present invention. By way of example, a significant simplification is achieved and increase in speed is achieved over the arrangement disclosed in the aforementioned U.S. patent. Also the invention disclosed herein is the same as the second embodiment of the above referenced co-pending patent application and results in a substantial increase in speed as compared with the first embodiment in the co-pending application.

BRIEF DESCRIPTION OF THE DRAWINGS

FIGS. 3A-3D form a block diagram of each of the piper modules of FIG. 1;

FIGS. 7A-7E are diagrams of the word formats used in the brightness generator multiplication technique;

FIG. 8 is a block diagram of a multiplier for use in the brightness generator module;

FIGS. 10A-10C form a block diagram of the brightness generator;

FIGS. 11A-11F are flow charts illustrating the sequence of operation of the brightness generator module of FIG. 1;

FIGS. 13A–13I are diagrams of the word formats used in the pipers and brightness generator of FIG. 1.

DETAILED DESCRIPTION

INDEX

I. GENERAL DESCRIPTION OF A LAYERED DATA BASE AND PIPING METHOD
  A. GENERAL DESCRIPTION
  B. GENERATION OF DATA ARRAY
  C. ENTRIES, EVENTS AND EVENT TYPES
  D. QUERY-TO-ENTRY POSITIONS
  E. CHUTE DATA GENERATION
  F. LAYERED DATA BASE
  G. PIPING METHOD
  H. PIPER PROCESSING PHASES
  I. PIPING METHOD STEPS FOR A SINGLE PIPER
  J. PIPING METHOD STEPS FOR MULTIPLE PIPERS
  K. PIPING METHOD APPLIED TO A SAMPLE DATA ARRAY SHOWN IN TABLES 2A–2N

II. PIPER MODULE
  A. GENERAL DESCRIPTION
    1. CONTROL LOGIC BLOCK
    2. PIPER MODULE OVERVIEW
      INITIALIZATION
      CHUTE FILLING
      MINIMUM MIN DETERMINATION
      PIPING
      NMD SERVICING (CHUTE REFILLING)
  B. DETAILED DESCRIPTION OF THE PIPER INSTRUCTION PROGRAM
  C. MULTIPLE PIPER ENABLING

III. BRIGHTNESS GENERATOR MODULE
  A. GENERAL DESCRIPTION
    1. BRIGHTNESS CALCULATION
    2. BRIGHTNESS EQUATION
    3. BRIGHTNESS CALCULATION MATHEMATICAL OPERATIONS
      FIXED POINT FORMAT
      FLOATING POINT FORMAT
    4. FIXED AND FLOATING POINT TRANSFERS AND TRANSFORMATIONS
    5. FIXED AND FLOATING POINT MULTIPLICATION
    6. BRIGHTNESS GENERATOR CONTROL SIGNALS
    7. EXACT CONDITION DETERMINATION LOGIC BLOCK
    8. BRIGHTNESS GENERATOR MODULE OPERATIONAL SUMMARY
      INITIALIZATION
      MINIMUM MIN DETERMINATION
      SSD AND SSB COLLECTION
      NMD SERVICING
      BRIGHTNESS CALCULATION AND TRANSFER
    9. BRIGHTNESS GENERATOR MODULE OVERVIEW
      INITIALIZATION
      MINIMUM MIN DETERMINATION
      SSD AND SSB COLLECTION
      NMD COMMAND SERVICING
      NORMALIZED BRIGHTNESS CALCULATION AND TRANSFER
  B. DETAILED DESCRIPTION OF THE BRIGHTNESS GENERATOR
  C. DETAILED DESCRIPTION OF THE BRIGHTNESS GENERATOR INSTRUCTION PROGRAM
  D. SUMMARY OF THE PREFERRED EMBODIMENT

IV. APPENDIX A
  INDEX OF TABLES

DETAILED DESCRIPTION

I. GENERAL DESCRIPTION OF A LAYERED DATA BASE AND PIPING METHOD

A. GENERAL DESCRIPTION

Figure 1:
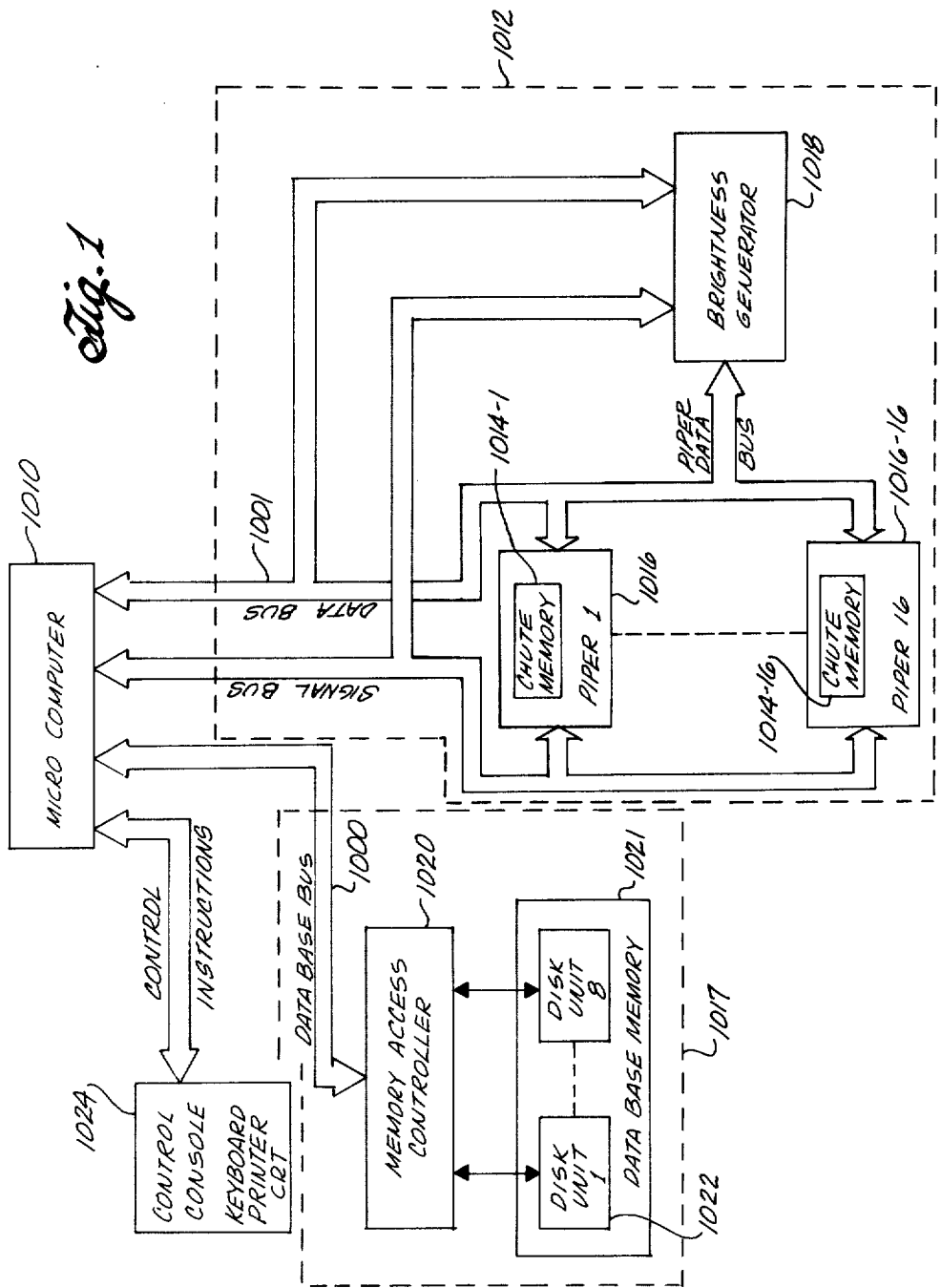
FIG. 1 is an overall block diagram of an embodiment of the data processing means of the present invention.

Referring now to FIG. 1, of a data processing means 1012 controlled by a microcomputer 1010 that forms an alternate embodiment of the data management and data base interrogation system of the present invention. The microcomputer may be any one of a number of computers well known in the art, a microprogram computer, or a specially designed computer. Coupled to the microcomputer 1010 by means of a Data Base Bus 1000 and a memory access controller 1020 is a data base memory 1021. The data base memory 1021 includes a plurality of conventional magnetic disc memory units 1022. To be explained later in more detail, a data base containing events arranged in entries is stored in the disc units of the data base memory 1021. Also coupled to the microcomputer 1010 is an operator-controlled console 1024 that includes a keyboard, printer and CRT display. The microcomputer 1010 contains a program which supervises the operation of the data processing means 1012. The data processing means 1012 is designed to perform certain specialized data handling functions in a method of determining a degree of match between a plurality of events of a query array of events hereinafter referred to as a query, and a plurality of events of an entry array of events contained in the data base hereinafter referred to as an entry. The method of determining such degree of match is called piping.

Under the supervision of microcomputer 1010, sixteen pipers 1016-1 through 1016-16, each of which includes a plurality of memory registers and logic blocks, and a brightness generator 1018 that includes registers, read-only memory, and logic blocks, execute the steps of the method for determining the degree of match. As shown in FIG. 1, the data processing means 1012 contains a plurality of identical pipers 1016 and thereby increase the data management and data base interrogation capacity of the overall data processing means. Only pipers 1016-1 and 1016-16 are specifically shown, the others being indicated by dashed lines.

A query is supplied to microcomputer 1010 by means of the operator console 1024. The query is restructured and compared by means of the application of a piping method in the microcomputer 1010 to form a criterion value for certain selected entries of the data base in the disc memories 1022.

To this end, the microcomputer 1010 issues executory commands to the memory access controller 1020, causing data base entries to be sequentially retrieved from the data base memory 1021 and sequentially compared in the data processing means with the query to determine the degree of match therebetween. To be later explained, each query and entry comprises a plurality of serially positioned event types and during the process of comparing the microcomputer 1010 forms for selected entries in the data base, an array of data values wherein each data value represents the number of event positions between the occurrence/alignment of an event type in the query and a corresponding like event type in the data base entry.

As a result of the comparison, a criterion value, called brightness, is generated by the data processing means. To be explained later, brightness is a measure of the degree of match between the event types of a query and the event types of a data base entry. As will be discussed, the brightness values thus determined are used as weighting values associated with a corresponding array of data values for a subsequent comparison with another data base entry.

Subsequent to forming the array of data values and brightness values, the microcomputer 1010 transfers the array via the Data Bus 1001 to the pipers 1016-1 through 1016-16. A piper control program (not disclosed) in each piper determines the number of pipers required to process the data of each particular array. It will be appreciated by those skilled in the art that the number of pipers disclosed in the present application namely sixteen is by no means restrictive, and by suitable modification of the hardware an increased number of pipers may be utilized to carry out the method herein described. Determinative of the number of pipers utilized is the size of the query and data base entries compared.

Under the supervisory control of microcomputer 1010, the pipers execute the steps of the piping method to determine a particular criterion value which as mentioned represents the degree of match between the event types of a query and the event types of a data base entry. The pipers 1016-1 through 1016-16 supply to the brightness generator 1018, via the Data Bus 1001, the piping method generated variables required for the calculation of the criterion value. As is hereinafter described, the criterion value formed in the brightness generator 1018 is a brightness value calculated from an equation having as inputs piper-supplied data that represent the result of each processing cycle of the piping method.

Brightness generator 1018 computes, by means of an equation to be explained later in the Detailed Description of the brightness generator, a brightness value that corresponds to the degree of match between the query and data base entry at a particular position alignment thereof. The brightness generator 1018 compares a newly-formed brightness value with a previously-formed brightness value, replacing the previously-formed brightness value with the newly-formed brightness value when the newly-formed brightness value exceeds the value of the priorly-formed brightness value. Along with the brightness values, the brightness generator stores a corresponding positional value which identifies the alignment position of the query relative to the data base entry that gives rise to such calculated brightness values. As will be shown, the positional value is actually one of the data base entry values received by the pipers from the microcomputer. Thus, at the completion of the piping method, wherein all of the data values have been processed, the brightness generator returns to the microcomputer the highest brightness value and the position of the query relative to the data base entry at which the highest degree of match exists.

As discussed previously, more than one piper may be activated by the piper control program when the array of data values exceeds the capacity of a single piper. In the multiple piper arrangement, data is supplied to each piper from the microcomputer in a serial manner; that is, data is supplied to piper 1016-1, then to piper 1016-2, etc., until all the data from the microcomputer has been transferred to the pipers. Execution, however, of the piping method occurs in parallel. That is, each active piper simultaneously calculates the variables that are to be later processed by the brightness generator in generating the criterion value and positional value.

B. GENERATION OF DATA ARRAY

Prior to a discussion of the piping method, it is important to have an understanding of the generation of the data array to be processed by the method.

Solution of the piping method requires that the data array be in a specified form and ordering. The data array to be processed by the piping method consists of data generated by the microcomputer 1010 and transmitted to the pipers 1016-1 through 1016-16 via the Data Bus.

A discussion of the following concepts provides an understanding of chute data generation and processing:
  (a) the concepts of Entries, Events and Event types;
  (b) the concept of Query-to-Entry position; and
  (c) the concept of Layered Data Base.

C. ENTRIES, EVENTS AND EVENT TYPES

A query or entry consists of a plurality of events. An event is a number that indicates the order of occurrence of an event type within a query or entry. An event can also indicate the order of occurrence of a plurality of event types called a package. A package of event types consists of a plurality of event types associated with an event. Package size is the number of event types in a package.

An event type is an item of data, such as a number or a symbolic representation of an item of data such as a number representing a letter, line segment or another entry, associated with a given event.

An example of a layered data base (to be later explained) illustrating such event types, events, and entries is given in Table 1A. A data base entry file shown in Table 1A comprises on the word layer the sentences "THIS IS THE TIME. ONE DAY IS LIKE ANOTHER." Each word in each sentence is identified as an entry in the order of occurrence of the words in the sentences. Thus, the word "THIS" is identified as entry 1, the word "IS" is identified as entry 2, etc., up to the word "ANOTHER" which is identified as entry 8. Each entry is composed of event types, i.e., characters. Each event type in each entry has associated therewith a number called an event that indicates the order of occurrence of the associated event type within the entry.

Thus, the word "THIS" which is identified as entry 1 is composed of four event types in the following order. Event type T, the first letter of the word "THIS", occurs at event 1. Event type H, the second letter of the word "THIS", occurs at event 2, and so on until all the event types have been so identified.

D. QUERY-TO-ENTRY POSITIONS

If the event types of an entry or query are visualized as occurring in the event order from left to right as shown in the word layer entries in Table 1A, then a query and an entry can be compared by aligning one under the other. The position of a query relative to an entry is defined as any horizontal alignment in which at least one event type of the query is positioned directly beneath, i.e., in alignment with, one event type of the entry. Position zero is defined as that position in which event 1 of the query is positioned in alignment with event 1 of the entry, event 2 of the query is positioned in alignment with event 2 of the entry, and so on. All other positions are numbered relative to position zero. Positions in which the query is to the left of position zero are assigned negative values, e.g., $-1, -2$.

Table 1B shows a sample query and entry with the query occupying all positions relative to the entry in which at least one event of the query is in alignment with one event of the entry. In 1B, query size QS, the number of events of a query, equals 4, and entry size ES, the number of events of an entry, equals 5. For any given QS and ES pair, the number of possible positions equals $(QS+ES)-1$.

A store is created for each event type or package of a query for which there is one or more occurrences of a corresponding event type in the entry and each such store is called a chute. Chute data is generated by the microcomputer 1010 for a given query/entry pair and contains information only on those positions of such query and entry in which at least one event type of the query is positioned in alignment with a corresponding event type in the entry. The positions $-1, 1,$ and $2$ shown in Table 1B satisfy this condition. For position $-1$, event 4 of the query is in alignment with event 3 of the entry. Both event 3 of the query and event 5 of the entry are associated with event type 1. Thus, at this query-to-entry position, corresponding event types are in alignment.

Likewise, for position 1, event 1 of the query is aligned with event 2 of the entry, which causes event type 2 of the query and the corresponding event type 2 of the entry to be in alignment. Also for position 1, event 4 of the query is in alignment with event 5 of the entry, causing the corresponding event type 1 of the query and event type 1 of the entry to be in alignment.

Position 2 causes event 2 of the query and event 4 of the entry to be in alignment. Both of these events are associated with a corresponding event type 8.

All other positions of query-to-entry alignment; namely, positions $-3, -2, 0, 3,$ and $4$; do not cause the alignment of corresponding query event types and entry event types.

E. CHUTE DATA GENERATION

Each event type or package of a query for which there is one or more occurrences of the corresponding event type in the entry causes the generation of data for one chute. For example, if a query contains event type 63, and an entry to which the query is compared also contains event type 63 associated with one or more events of the entry, then data (to be explained) is generated for one chute.

If an entry does not contain one event type corresponding to an event type or one event type of a package of event types in the query, then no chute is assigned for the unmatched query event type and no chute data is generated for that query event type. In each case in which a query event type has no corresponding entry event type, or in which at least one query event type of a package of query event types has no corresponding entry event types, the quantity 1.0 is added to M (M is initally set to zero for each query/entry pair). M is the number of event types or event type packages in the query for which there is no corresponding event type in the entry. M is used in calculating the criterion value which is a measure of the degree of match between a query and the entry.

Data for a chute is generated in the following manner. If a query and an entry are aligned at the zero position, then subtracting the events associated with corresponding event types in query and entry provides those positions of query relative to the entry where such corresponding event types are in alignment, as for example with the query in the zero position (underscored) (see Table 1B) relative to the entry, the event type 2 of the query occurring at event 1 of the query has a corresponding event type occurring at event 2 of the entry. To cause these corresponding event types to be in alignment, the entire query must be moved one position to the right, i.e., to position 1.

Alternately, this information can be determined by subtracting the query event, i.e., 1, of the query event type 2, from the entry event, i.e., 2, of the corresponding entry event type 2. The result $2-1=1$ yields the query position relative to the entry position where the two identical event types are in alignment.

For query event type 8 at event 2, the closest corresponding entry event type occurs at entry event 4. Referring again to Table 1B, event type 8 of the entry and query are in alignment when the query is at position 2. Subtracting the aforementioned query and entry event numbers also provides this information, i.e., $4-2=2$.

For query event type 1 at query event 4, corresponding entry event types occur at entry events 3 and 5. Subtracting the query event number from the entry event number yields $3-4=-1$, and $5-4=1$. Table 1B shows that shifting the query to position $-1$ results in the alignment of query event type 1 with the corresponding entry event type located at entry event 3. Table 1B further shows that shifting the query to position 1 results in the alignment of query event type 1 with the corresponding entry event type located at entry event 5.

Query event type 13 at query event 3 does not have a corresponding entry event type at any entry event. Therefore, no position numbers can be generated, and the quantity 1.0 is added to M.

As previously discussed, the chutes contain the position numbers generated by subtracting the event numbers of corresponding query and entry event types, as discussed above. Since these numbers represent the displacement (distance), where referenced to the zero position, between the occurrence of an event type in the query and one or more occurrences of the corresponding event type in the entry, these numbers are called distances and are placed in the distance (D) field of a chute data word (see FIG. 13I). Chute data for a given query/entry pair consists of a separate series of one or more chute data words for every query event type or package for which there is one or more occurrences of a corresponding entry event type. This means that if a query contains five event types that have corresponding event types in the entry, the chute data would contain five separate series of one or more chute data words. The sample query shown in Table 1B contains three event types, i.e., 2, 8, and 1, that have one or more occurrences of a corresponding event type in the entry. Therefore, three series of chute data words are generated for this query/entry pair. Thus, query event type 2 generates a distance of 1, query event type 8 generates a distance of 2, and query event type 1 generates a distance of $-1$ and a distance of 1. Table 1B depicts how this data is arranged in three chutes.

A chute data word (see FIG. 13I) contains the distance field in bits 0–7 and a weighting value field in bits 8–14. A weighting value (to be discussed in the section entitled "Layered Data Base") associated with a given distance, has a value between zero and 1. The weighting values are processed along with the distances in arriving at a criterion value which is a measure of the degree of match between a query and entry.

F. LAYERED DATA BASE

One way in which package events and weighting values may arise is in the interrogation of a layered data base. Table 1A is a representation of such a layered data base. The word layer contains events (alphabetic characters) grouped into entries (words). Each character is an event type occurring in the order indicated by the event sequence of each word. Each word is an entry on the word layer. The entries are numbered consecutively. The two sentences stored in this data base are: "THIS IS THE TIME. ONE DAY IS LIKE ANOTHER". Note that the entry "IS", common to both words, is stored only once.

The sentence layer consists of event types that are the entry numbers of the words on therd layer, grouped to represent the sentences on the word layer. The entry numbers of the sentence layer identify the sentences and then sequence on the word layer.

Such a layered data base is interrogated by first comparing the words of a given query sentence with each entry on the word layer.

The results of these comparisons on the word layer form a sentence query that is compared in a similar fashion with each entry on the sentence layer.

The results of the sentence layer comparisons yield the degree of match between the given query sentence and one or more stored data base entry sentences. The highest degree of match generated identifies which sentences in the stored data base are "most" similar to the given query sentence.

As an example of the foregoing, assume that the layered data base of Table 1A is interrogated by a given three-word query sentence. The first word of the given query sentence is compared with each entry on the word layer. A package of these word layer entry numbers is thereby formed, and the associated criterion values assigned as weighting values. This package is assigned an event number of 1, since the package was generated by the first word of the given query sentence. An example of such a package is listed under the numeral 1 shown in Table 1C. Word entries 1 and 4 (see Table 1A-word layer) exist in the package because the assumed associated criterion values, i.e., 0.5 and 0.6 respectively, were greater than zero. A criterion value of zero indicates no match at all between the event types of a query word and the event types of an entry word.

Likewise, comparing the second word of the given query sentence causes word entry 6 at an assumed criterion value of 0.8 to be retained and assigned an event number of 2. Word 3 of the given query sentence causes word entry numbers 3 and 8 at an assumed criterion value of 0.7 and 0.5 respectively, to be retained as package event 3. This package query, consisting of individual words of the given query sentence compared with the word layer, is now used to query the sentence layer. The criterion values returned during the word layer piping are used as weighting values during sentence layer interrogation.

Thus, interrogating a layered data base results in the formation of package queries and weighting values associated with each event type.

The foregoing method of comparison and generation of criterion values thereby determining the degree of match between an entry and a query, describes the process heretofore identified as piping.

Table 1D (and referring again to FIG. 1) contains a sample example of a sentence package query of 11 package events at the zero position with a sentence entry of 24 events. The sentence package query represents $5 \times 4 \times 6 \times 4 \times 3 \times 4 \times 2 \times 4 \times 5 \times 5 \times 4 = 4,608,000$ possible sentences to match against the sentence entry. The chute data generation steps illustrated in Tables 1E through 1O and subsequent method steps illustrated in Tables 2A through 2N identifies which one of these 4,608,000 possible sentences is the best match, the degree of such match (criterion value) and the position at which this best match occurs.

The chute data is generated in the same manner as shown in Tables 1A–1C, with the exception that the microcomputer 1010 matches as many events as possible in a given package to entry events.

This process is illustrated in Tables 1E through 1O. Note that the order of events in a package is irrelevant, as is the order in which the microprocessor 1010 attempts to match the package query event types with the corresponding entry event types. Chute data, however, is placed into the chutes with the position/weighting value pairs arranged in increasing monotonic order from word 1 of the chute. The number of the chute in which the position/weighting value pairs are placed is arbitrary. In the example, however, the matching process proceeds from the lowest numbered to the highest numbered query/event, and the chute data thus generated is placed sequentially in the chutes starting from the lowest numbered chute. The processing of the query/entry pair thus proceeds from the leftmost position with corresponding event types aligned to the rightmost position with corresponding events aligned. The maximum number of data words that can be prepared for a given chute is 127 in the current implementation arranged by the microcomputer in groups of 15 data words plus an NMD command word. Chute number 1 contains that data generated for the first (from the left) query package event found to have corresponding event types in the entry. Likewise, chute number 2 contains that data generated for the second query event package found to have corresponding event types in the entry, and so on through the last query event package found to contain corresponding event types in the entry. The maximum number of chutes possible in data processing means 1012 is 127 (16 pipers).

Referring to Table 1E, the entry is scanned to find event types matching any of the event types contained in query event 1 package. A match is found for query event type 8 at entry event 5. The distance data is obtained as previously described by subtracting the event number of the query package containing a given event type from the event number of the corresponding entry event type $(5-1=4)$. A corresponding entry event type is also found for query event type 21 at data base entry event number 9. In each case, the weighting value associated with the query event type being matched is paired with the distance data. The complete data for chute number 1, then, is 4/0.5, 8/0.6.

Referring to Table 1F, the microcomputer finds corresponding event types in the entry for event types 21, 360, and 52 of query package event number 2 at entry events 9, 11, and 7 respectively. The distance for each is 7 (9−2), 9 (11−2), and 5 (7−2). The quantity 2 is substracted in these cases because the correspondence occurs with query event number 2 event types. Chute number 2 data is therefore 5/0.4, 7/0.7 and 9/0.8.

Referring to Tables 1G through 1O, the same operations are carried out for each query package event containing at least one event type that has a corresponding event type in the entry. In Table 1J, query event package 6 contains no event types that have a corresponding event type in the data base entry. In this case, no chute is created, and a 1 is added to the quantity M (missing event count).

The pipers, as demonstrated in Tables 2A through 2N, process the chute data generated in Tables 1E through 1O, using the piping method described below. In effect, the piping method does the following:

(a) Detects the leftmost (smallest) unprocessed position of a given query-to-entry in which at least one event type of the query is in alignment with one event type of the entry;

(b) Measures and totals the minimum distances between all corresponding event types of query and entry at the position detected in (a);

(c) Totals the weighting factors associated with the distances totaled in (b); and (d) Uses the totals computed in (b) and (c) and the value of M (missing events) to compute brightness, a criterion value representing the degree of match between the given query and entry at a detected position.

G. PIPING METHOD

In order to understand the piping method and brightness calculation technique, especially in the situation when there is more than one active piper, it is important to have an understanding of the piping method steps and the hardware that executes such a method, and to consider the method applied to a sample example.

Figure 3B:
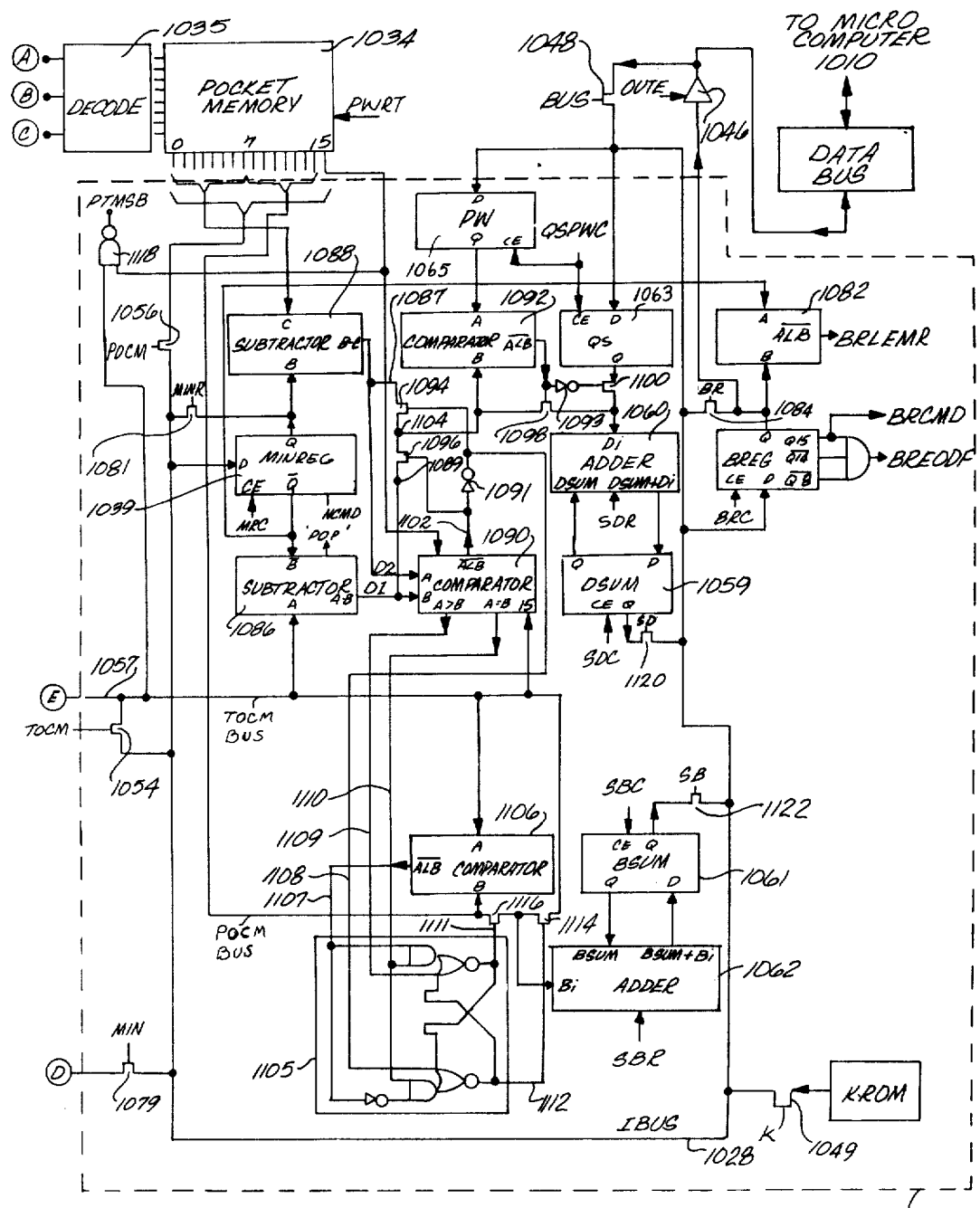
Figure 6:
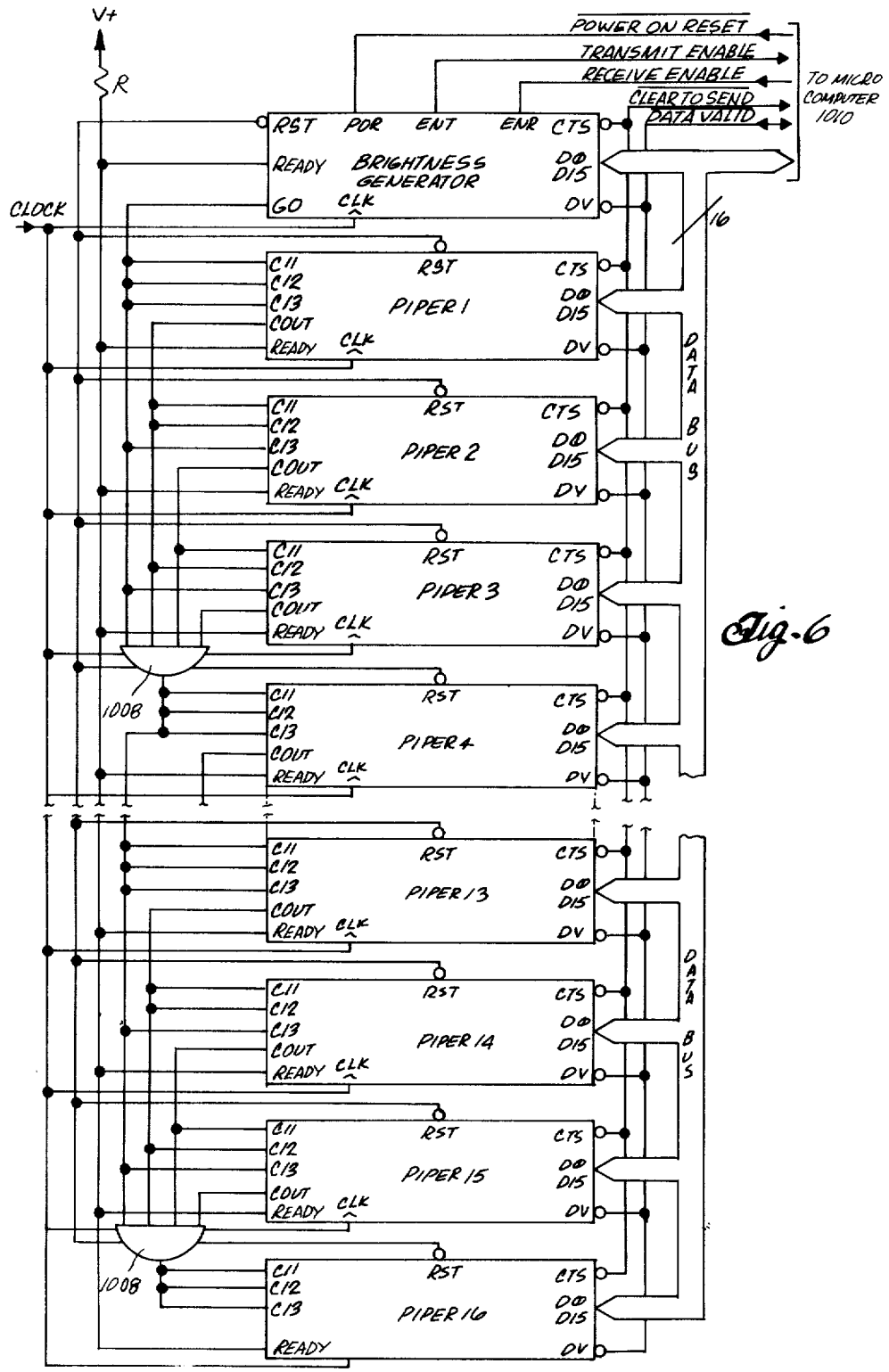
FIG. 6 is a block diagram of the interconnection of the pipers of FIG. 1.

Referring now to Tables 2A-2N and making reference to FIGS. 3A, 3B and 6, there is shown the sample data array transferred to pipers 1 and 2 by the microcomputer. For the example shown, the amount of information supplied by the microcomputer requires the use of two active pipers. The data delivered by the microcomputer 1010 is loaded into a chute memory block 1014 of each piper. The chute memory block 1014 consists of eight 16-word static random access memories (RAMs) with associated addressing logic blocks. Each of these memories is identified by reference numeral 1044 and is termed a "chute". Each chute word storage location is 16 bits wide. The chute memory block has associated with it logic blocks including a chute pointer CPTR 1033 and a top-of-chute pointer TOCPTR 1032 and top-of-chute decoders TOC 1031. The chute pointer CPTR 1033 and the top-of-chute pointer TOCPTR 1032 are indexed to address a particular word storage location within one chute to be processed. In addition to the chute memory block 1014, each piper 1016 has a pocket memory 1034 having eight addressable word locations. A pocket POC is a word storage location in the pocket memory 1034. There is one pocket POC that corresponds to each chute in a particular piper. The word storage location is indexed by the chute pointer CPTR 1033 such that indexing the CPTR causes the pocket POC to be indexed along with the corresponding chute.

Each piper also contains a minimum value finding logic block 1029, whose output MIN 1037 is stored in a register MINREG 1039. Also included in the piper is an accumulator register DSUM 1059 for accumulating a sum-of-difference value and an accumulator register BSUM 1061 for accumulating a sum-of-weighting value. Available to each piper is a variable called query size QS, which is the number of events in a query string, and for Tables 2A-2N, QS equals 11. Each piper also receives on the data bus and in the same word a quantity called "pipewidth" PW, which is a maximum permissible value of the difference between a query event position and an entry event position. For Tables 2A-2N, pipewidth is equal to 9.

It will be appreciated from the above discussion that the data values stored in each chute are a series of values arranged in monotonic increasing order from a first end to a second end of the chute. Each value represents the number of event positions between like events of a query and an entry of the stored data base. Stored in the chutes, and corresponding to each data value, is a weighting value, which is always less than or equal to one. The weighting value represents a degree of match of a query obtained in response to an interrogation in a lower level data structure.

The first data value in every chute, which is also the smallest data value in that chute, is initially placed in a word storage location called the "top-of-chute" TOC. Each of the other data values are separately stored in sequentially addressable word storage locations following TOC. The word storage location after the last data value stored in each of the chutes of each of the pipers contains a command word either EOC, EOD, EOF or NMD. The EOC command word, when encountered, indicates an End-of-Chute and only that no more data exists for that particular chute, (see by way of example the EOC command word in chute number 1 of piper number 1 in Table 2A). EOF is a command word when encountered indicates the end of data for the last entry in the Data Base. The last chute data word in the last piper-enabled chute is followed by a command word EOD. EOD is a command word that signals the end-of-chute data for a particular data base entry, see by way of example the EOD command word in chute number 2 of piper number 2 in Table 2A. During initialization, the pockets that correspond to the chutes of each chute memory block are cleared by a piper control program and loaded with an EOC command word.

H. PIPER PROCESSING PHASES

Figure 2:
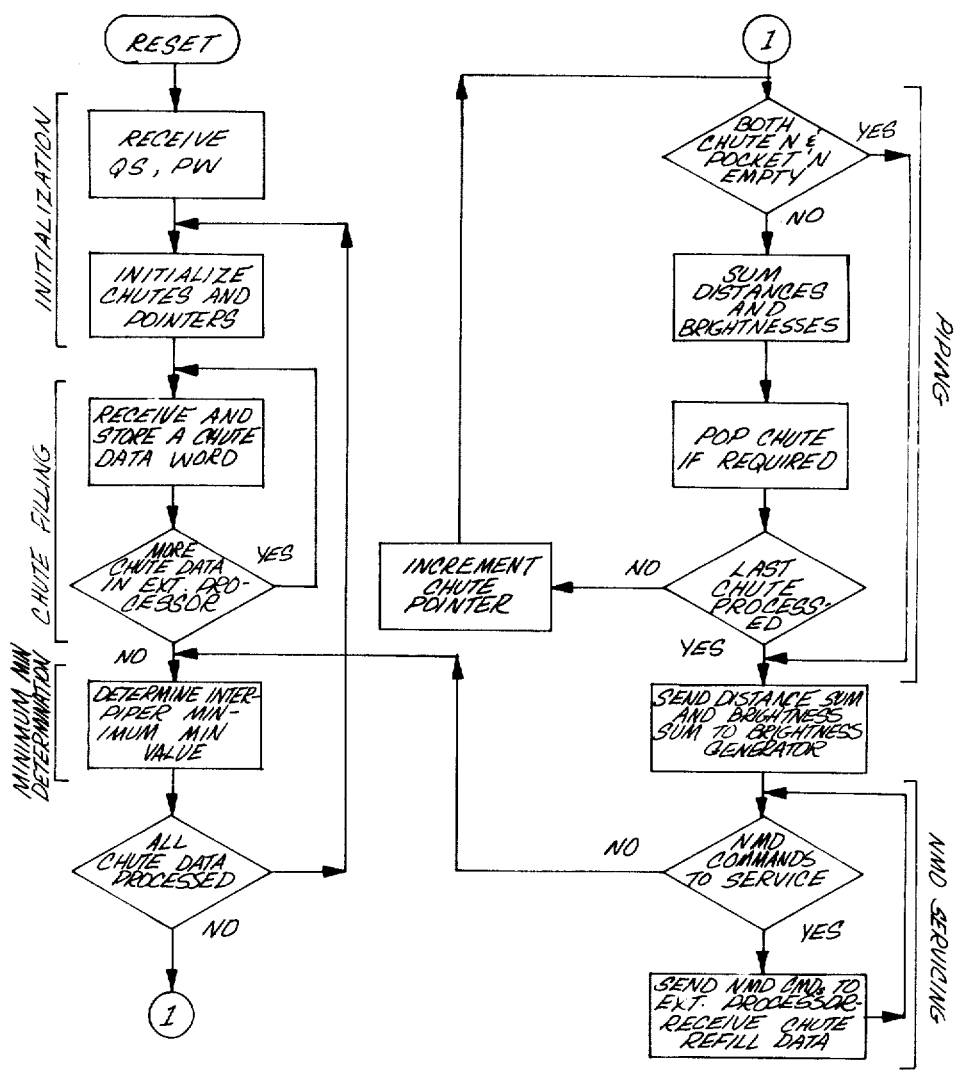
FIG. 2 is a flow diagram illustrating the overall operation of each of the piper modules shown in FIG. 1.

Each piper executes a prescribed series of logical operations. A summary of the operational flow is given in FIG. 2. The figure shows five processing phases: initialization, chute filling, minimum MIN determination, piping, and NMD servicing.

In the initialization phase, a piper loads the first word which includes the values QS and PW appearing on the Data Bus into the QS register 1063 and the PW register 1065. Additionally, the pointers are initialized such that TOCPTR pointers are set to point to the first top-of-chute of each chute and CPTR is set to point to the first chute.

In the chute-filling phase, a piper fills its chutes with data values from the microcomputer, via the Data Bus, until either all chutes have been filled, or an EOD or EOF command word has been detected on the Data Bus. EOF represents a command word that signals the end of a data base entry file for a particular piping cycle.

Each piper is controlled by a piper control program (Table 4) which is stored in a Read-Only Memory ROM 1043 of the piper control logic block 1042. Upon instruction from the piper control program the piper then begins the minimum MIN determination.

In the minimum MIN determination phase, the piper establishes which top-of-chute holds the smallest value in the distance (D) field (see D output of the chutes in FIG. 3A) of each data word in the top-of-chutes across all the pipers. This number is stored in the MINREG register of each piper. If MINREG contains either an EOD or EOF command word, it signifies that all data has been piped, and the piper returns to the chute-filling phase. If MINREG contains a data value, then more data remains to be processed, and the piper proceeds to the piping phase to process the chute data.

In the piping phase, the top-of-chutes and their corresponding pockets are evaluated according to the piping algorithm (to be discussed below). This process is repeated until all values in all chutes have been evaluated, and a summed difference and weighting value are transferred to the brightness generator. The piper then enters the NMD servicing phase.

In the NMD servicing phase, the tops of all chutes are examined for the existence of NMD commands. A NMD data command word is written into the sixteenth data word location of a chute by the microcomputer when the microcomputer detects that more than fifteen data word locations are required for storage of data in a particular chute. Upon detection of a NMD command, the microcomputer refills the identified chute with the remaining data for such a chute. The NMD detection and chute refill process continues until no more NMD commands are detected. Once all NMDs have been serviced, or if no more NMDs exist, the piper returns to the minimum MIN determination phase again and continues processing.

Thus, for a single piper, the data processing means 1012 proceeds to empty the chutes and determines the final DSUM and BSUM register values by execution of the following steps:

I. PIPING METHOD STEPS FOR A SINGLE PIPER

STEP 1

Find the chute or chutes with the smallest data value MIN existing at the top of such chute(s).

STEP 2

Form the absolute difference between such smallest data value MIN and the data value in each top-of-chute in each chute not having a data value in its corresponding pocket, retaining this difference and the weighting value associated with such top-of-chute value.

STEP 3

Form the difference between the data value in the pocket and MIN for each chute that has a data value in the pocket but no data value in the top-of-chute retaining this difference and the weighting value associated with the data value in the pocket.

STEP 4

Form the absolute difference between such smallest data value MIN and each data value in the pocket and each data value in each top-of-chute in each chute having a data value in both the pocket and top-of-chute, retaining the smaller of the differences and the weighting value associated with the data value (pocket or top-of-chute) used in forming such smaller difference. If the differences calculated are equal, retain the difference and the larger of the two weighting values associated with the pocket and top-of-chute.

STEP 5

In Steps 2 and 4 above, if the data value obtained when MIN is subtracted from the data value in the top-of-chute value is zero, retain the zero and the weighting value associated with the data value in the top-of-chute, place the MIN value in the associated pocket, replacing any previous data value already in the pocket from such chute, and designate the next data value in that chute as the top-of-chute.

STEP 6

If any difference calculated in the described Steps 2–5 is greater than the pipewidth PW, replace the difference formed with a predetermined value. For the embodiment presented herein, the predetermined value is equal to the query size QS. Note this does not affect the weighting value to be retained.

STEP 7

Sum the retained differences obtained in Steps 2–6 to form sum-of-difference value, also sum the retained weighting values to form sum-of-weighting values.

STEP 8

Utilize the sum-of-difference value and the sum-of-weighting value in a brightness formula to derive a criterion brightness value (B).

STEP 9

If B is greater than the previous brightness value calculated (or is the first brightness value to be calculated), replace the previously-calculated brightness value with the just calculated brightness value and retain MIN as the position value for that calculated brightness value.

STEP 10

Repeat Steps 1–9 until all chute values have been processed. The brightness value retained at the end of these steps is the criterion value for the degree of match between a query and a data base entry. The associated position represents the relative position of the query relative to the entry at which such a criterion value was obtained.

J. PIPING METHOD STEPS FOR MULTIPLE PIPERS

Given the arrangement of Table 2A requiring more than one piper, i.e., two pipers, the data processing means 1012 proceeds to empty the chutes and determines the final DSUM and BSUM register values by execution of the following steps:

STEP 1(A)

Within each piper, detect the chute or chutes with the smallest data value MIN existing at the top of such chute or chute(s).

STEP 1(B)

Compare the MIN values found in Step 1(A), selecting the smallest of these MIN values (minimum MIN)

and replacing the MIN value in each piper with the minimum MIN thus selected.

STEP 2

Within each piper, form the absolute difference between such smallest data value minimum MIN and each top-of-chute data value in each chute not having a data value in its corresponding pocket, retaining this difference and the weighting value associated with such top-of-chute data value.

STEP 3

Within each piper, form the difference between the pocket data value and the minimum MIN for each chute that has a pocket data value but no top-of-chute data value, retaining this difference and the weighting value associated with the pocket data value.

STEP 4

Within each piper, form the absolute difference between such smallest data value minimum MIN and each pocket data value and each top-of-chute data value in each chute having a data value in both the pocket and top-of-chute, retaining the smaller of the differences and the weighting value associated with the data value (pocket or top-of-chute) used in forming such smaller difference. If the differences calculated are equal, retain the difference and the larger of the two weighting values associated with the pocket and top-of-chute.

STEP 5

In Steps 2 and 4 above, if the value obtained when the minimum MIN is subtracted from the top-of-chute data value is zero, retain the zero and weighting value associated with the top-of-chute data value, place the minimum value in the associated pocket replacing any previous data value already in the pocket from such chute, and designate the next chute data value in that chute as the top-of-chute.

STEP 6

Within each piper, if any difference calculated in Steps 2-5 is greater than the pipewidth valve (PW), replace the difference formed with a predetermined value. For the embodiment presented herein, the predetermined value is the value query size (QS). Note this does not affect the weighting value to be retained as described in Steps 2-5.

STEP 7

Within each piper, sum the retained differences obtained in Steps 2-6 to form a sum-of-difference (DSUM), also sum the retained weighting values to form a sum-of-weighting value (BSUM).

STEP 8(A)

Sum all DSUMs from all active pipers to form the sum of DSUMs (SSD), and sum all BSUMs to form the sum of BSUMs (SSB). Utilize the quantities SSD and SSB in a brightness formula for deriving a brightness (B).

STEP 9

If B is greater than the previous brightness calculated (or is the first brightness to be calculated), replace the previous brightness with the just-calculated brightness and retain the minimum MIN as the position value for that brightness.

STEP 10

Repeat Steps 1-9 until all chute values in all active pipers have been processed. The brightness retained at the end of this procedure is the criterion for degree of match between query and data base entry.

The piper executes the method steps in a piping logic block 1038 (see FIG. 3B). The piping logic block continuously monitors the top-of-chute TOC and the pockets POC being addressed by the CPTR and TOCPTR and calculates the difference between the value in the distance D field of TOC and the data value in MINREG, and the difference between the distance field of the data value in the pocket POC and the value in MINREG. The data value in MINREG is the smallest value MIN exposed at the top of such chutes. D1 is defined as the difference between the data value in the top-of-chute and the data value in MINREG, and D2 is defined as the difference between the data value in MINREG and the data value in the corresponding pocket such that (in shorthand notation) D1 equals D(TOC(-TOCPTR) (CPTR))-MINREG, and D2 equals MINREG-D(POC(CPTR)). D(TOC(TOCPTR)(CPTR)) indicates the value in the distance field of the data value stored in the word storage location of the top-of-chute TOC indexed (indicated) by the top-of-chute pointer TOCPTR of the chute indexed (indicated) by the chute pointer CPTR. Similarly, D(POC(CPTR)) indicates the value in the distance field of the data value stored in the word storage location of the pocket POC as indexed by CPTR. B refers to the weighting value field of the data value being indexed.

The piping logic block executes the method steps by performing the following logical operations:

a. If POC(CPTR), i.e., the pocket word storage location as indexed by CPTR, contains a command word (i.e., does not contain data), then D1 and B(TOC(-TOCPTR)(CPTR)) shall be made available at Di and Bi inputs of adder registers 1060 and 1062 respectively (see FIG. 3B). Di represents the difference between the value in MINREG and the value in the presently indexed TOC or POC. Bi represents the weighting value associated with such TOC or POC. The values Di and Bi will be added in accumulator registers DSUM 1059 and BSUM 1061 respectively with such Di and Bi values determined for the previously-indexed TOCs and POCs. As will be shown later, the accumulator registers DSUM and BSUM will contain the accumulated Di and Bi values corresponding to the TOCs and POCs of all the chutes indexed in a complete chute processing cycle.

b. If POC(CPTR) does not contain a command word (i.e., contains data), and TOC(TOCPTR)(CPTR) contains a command word, then D2 and B(POC(CPTR)) shall be made available at Di and Bi, respectively.

c. If POC(CPTR) and TOC(TOCPTR)(CPTR) both contain data (i.e., neither contains a command word), the D1 and D2 shall be compared.

1. If D1 is less than D2, then D1 and B(TOC(-TOCPTR)(CPTR)) shall be made available at Di and Bi, respectively.

2. If D2 is less than D1, then D2 and B(POC(CPTR)) shall be made available at Di and Bi respectively.

3. If D1 equals D2, then B(TOC(TOCPTR)(CPTR)) and B(POC(CPTR)) shall be compared.

(a) If B(TOC(TOCPTR)(CPTR)) is greater than or equal to B(POC(CPTR)), then B(TOC(-TOCPTR)(CPTR)) shall be made available at Bi.

(b) Otherwise, B(POC(CPTR)) shall be made available at Bi.

(c) In either case, D1 (or D2) shall be made available at Di.

d. If D1−0 (D(TOC(TOCPTR)(CPTR))=MIN-REG), i.e., the value in the distance field of the presently-indexed TOC equals the value in MINREG, a flag POP shall be set on (high); if not, the flag shall be set off (low). The value D1 is formed in subtracter 1086 (see FIG. 3B) and if the A input of subtracter 1086 (see FIG. 3B) and if the A input of subtractor 1086 which corresponds to the D(TOC(TOCPTR)(CPTR)) value equals the B input (inverted MINREG value), the "POP" flag output of subtracter 1086 goes on (high).

e. In any of the above cases, if the value to be made available to Di is greater than PW, then QS shall be made available at Di. (This does not affect the output to Bi.)

f. Bi shall be summed in BSUM.

g. The state of the POP flag shall be checked;

1. If the POP flag is set off for a given chute, then Di shall be summed to DSUM.

2. If the POP flag is set on for a given chute, then TOC(TOCPTR)(CPTR) shall be transferred to POC(CPTR); i.e., the chute shall be "popped".

h. When all top-of-chutes have been processed by the piping logic block, DSUM and BSUM shall be transferred to the brightness generator.

K. PIPING METHOD APPLIED TO A SAMPLE DATA ARRAY SHOWN IN TABLES 2A–2N

Illustration of the data processor execution of the foregoing method steps and piping logic operations is illustrated in Tables 2A through 2N. As will be described in detail below, the best fit between query and entry is in position 8, yielding a brightness value of 0.236915.

Consider briefly Table 2A. Table 2A depicts the data arrangement for the number of queries requiring the use of two pipers. The piping method and piping logic operations are identical for each piper. The results of the data processing of each piper are accumulated to form an overall criterion value of brightness that is formed in a brightness generator. As described, each piper contains eight chutes with each chute identified by a chute/pocket number. An indexed pointer CPTR points to the particular chute in which the present data manipulation is being performed. Each chute of each piper may contain as many as 15 information values, and a top-of-chute pointer TOCPTR is indexed to point to the particular data value in the presently-addressed chute required in the piping method. The data values are arranged in the chutes in monotonic increasing order, each data value having associated therewith a weighting value which is either equal to or less than 1. After the last data value in each chute, an EOC command word exists. As previously discussed, the EOC command word terminates any data processing for the chute or pocket in which such command word exists. An EOD command in a chute indicates that no more data exists for the query/entry pair being processed.

Each piper has a number of registers that contain information necessary to perform the piping method. Thus, at the lower portion of Tables 2A–2N and listed for each piper under the piper registers are: the MIN-REG register, which contains the minimum top-of-chute value for a present processing pass; a chute pointer register CPTR, which points to the chute presently being processed; a series of top-of-chute TOCPTR pointers 1 through 8 that indicate the location in which the present top-of-chute value exists; a D1 subtractor register, which contains the value D1 that is equal to the difference between the minimum value of the top of the chutes as presently stored in the MIN-REG register and the other top-of-chute values; a subtractor register, which contains the difference value D2 between the minimum of top-of-chute which presently exists in the MINREG register and the pockets of each of the chutes; a DSUM register, which accumulates the smaller value of D1 and D2 for each processing pass of the piping method; a BSUM register that accumulates the weighting values associated with the information values that are used in forming the D1 and D2 values; a QS or query size register 1063 containing a number of events in a particular query, and for the sample example, QS equals 11; and pipewidth PW register 1065 containing a value which is the maximum permissible value of the difference between a query event position and an entry event position and for the present example, PW equals 9.

Also included in the Tables 2A–2N is a list of brightness generator registers containing values necessary for establishing the criterion value required for determining the position for the best degree of fit between a query and an entry. Thus, included are: a candidate brightness register BOLD containing the criterion brightness value resulting from the completion of a piping algorithm processing pass; a candidate position register LMIN containing the relative position of the query and the entry that gives rise to such candidate brightness value; a selected criterion brightness B register containing a brightness value that has a predetermined relation to the other calculated brightness value, and, for the data processing means herein described, the selected criterion brightness is the largest of the brightness values calculated through all of the processing steps through all of the information values in all of the chutes; a selected position register POS containing the position at which the selected criterion brightness was calculated; a register containing the value M which is equal to the number of missing events, i.e., the number of event types in the query that are not contained in the entry; and an ES register containing the entry size, i.e., the number of events that make up the data base entry currently being piped.

Consider briefly now the operation of data processing means 1012 in carrying out the example depicted in Tables 2A through 2N while also making reference to FIGS. 3A–3B and 6. Referring to Table 2A, initially the data processing means 1012 detects the data value at the top-of-chutes TOC of each of the pipers which is the smallest, i.e., has the smallest value in relation to the other data values at the top of the chutes. To this end, the data processing means 1012 detects, in those data locations identified by the top-of-chute pointer TOCPTR equaling 1, the smallest data values and determines that for piper 1 the data value 1 in chute number 7 is the smallest relative to the remaining TOC values. The data processing means detects in piper 2 a data value of 0 in the data location identified by the TOCPTR equal to 1 and the chute/pocket number 2.

The data processing means determines the smallest value of the minimum detected TOC in piper 1 and the minimum detected TOC in piper 2, and loads the smallest value found into the MINREG register of piper 1 and piper 2. Thus, for the examples shown, the value 0 is loaded into the MINREG register of piper 1 and piper 2.

In conforming with Step 2 of the piping method, the absolute difference is formed between the value in the MINREG register and each TOC data value in each chute not having a value in its corresponding pocket POC. This difference is added in the DSUM register and the corresponding weighting value associated with such top-of-chute value is added in the BSUM register. To this end, the data processing means determines the algebraic difference between the value 0 in the MIN-REG register and the value 4 in the TOC of chute number 1. This difference, designated as D1 for the present example, equals 4, and the value 4 is added to the value in the DSUM register, and the corresponding weighting value of 0.5 is added to the value in the BSUM register. Since a command word, i.e., EOC, exists in the POC corresponding to chute number 1, no difference is taken between the MINREG register value and the POC of chute number 1 of piper 1.

The chute pointer CPTR is now indexed by 1 such that CPTR equals 2, thereby making available to the piping method the TOC of chute number 2 of piper 1. In a manner as described previously, the difference value D1 is formed between the value 0 in the MINREG register and the value in the TOC of chute number 2 of piper 1. Thus, the difference value D1 equal to 5 is formed and 5 is added to the value in the DSUM register, and the corresponding weighting value of 0.4 is added to the value in the BSUM register.

The CPTR is next indexed by 1, thereby making available the TOC of chute number 3 for processing in the piping method. Thus, the difference between the value 0 in the MINREG register and the value 3 in the TOC of chute number 3 of piper 1 is formed, and the value D1 equal to 3 for such difference is added to the value in the DSUM register, and the corresponding weighting value of 0.4 is added to the value in the BSUM register.

The CPTR is next indexed by 1, and the information value of 6 at the TOC of chute number 4 of piper 1 is made available to the piping method. Thus, the difference between the value 0 in the MINREG register and the value 6 in the TOC of chute number 4 of piper 1 is formed. This difference D1 equal to 6 is added to the value in the DSUM register, and the corresponding brightness value of 0.2 is added to the value in the BSUM register.

The CPTR is indexed by 1, thus making available the TOC value of chute number 5 of piper 1 to the piping method. The difference is formed between the value 0 in the MINREG register and the value 12 in the TOC of chute number 5 of piper 1. The difference D1 of the value 12 is noted to have exceeded the pipewidth value 9, and, therfore, a predeterminned value equal to the query size is added to the value in the DSUM register, and the corresponding weighting value of 0.9 is added to the value in the BSUM register. For the present example, the query size is equal to 11.

The CPTR is indexed by 1, thereby making available the TOC of chute number 6 of piper 1 to the piping method. Thus, the difference between the value 0 in the MINREG register and the value 3 in the TOC of chute number 6 of piper 1 is formed, and the resulting value for D1 equal to 3 is added to the value in the DSUM register, and the corresponding brightness of 0.1 is added to the value in the BS register.

The CPTR is indexed by 1, thereby making available the TOC of chute number 7 of piper 1 to the piping method. Thus, the difference between the value 0 in the MINREG register and the value 1 at the TOC of chute number 7 of piper 1 is formed, and the resulting value for D1 equal to 1 is added to the value in the DSUM register, and the corresponding weighting value of 0.9 is added to the value in the BSUM register.

The CPTR is next indexed by 1 so that the TOC value of chute number 8 of piper 1 is made available to the piping method. Thus, the difference is formed between the value 0 in the MINREG register and the value 15 in the TOC of chute number 8 of piper 1. The difference value of 15 is found to exceed the pipewidth value of 9, and, therefore, the query size value of 11 is added to the value in the DSUM register, and the corresponding weighting value of 0.2 is added to the value in the BSUM register.

At the completion of this processing pass, the sum of the differences formed equals 44, and the sum of the corresponding weighting values equals 3.6.

As indicated in Table 2A, the amount of piper chute data for the sample example requires more than one piper, i.e., two pipers. The piping method, as applied to piper 1, is applied identically to piper 2, and the execution of the method steps in piper 2 is carried on concurrently with the execution of the method steps in piper 1. Thus, the processing of the data in the pipers is accomplished in a parallel fashion so that the differences to be formed, as called out in the piping method and in the piping logic operations, are occurring simultaneously in all pipers.

Consider briefly the processing of the data in piper 2. The CPTR of piper 2 was initialized to the value 1 such that the TOC of chute number 1 of piper 2 is made available to the piping method. Thus, the difference between the value 0 and the MINREG register of piper 2 and the TOC of chute number 1 of piper 2 is formed. The resulting difference of 3 is calculated for D1 and added to the value in the DSUM register in piper 2, and the corresponding weighting value of 0.7 is added to the value in the BSUM register of piper 2.

The CPTR is indexed by 1 to make available the TOC of chute number 2 of piper 2 to the piping method. Thus, the difference between the value 0 in the MINREG register and the TOC of chute number 2 of piper 2 is formed. The value 0 in the MINREG regiseter is, however, identical to the TOC value of 0, and, therefore, in accordance with the piping method, the TOC value for chute number 2 of piper 2 of 0 is transferred to the corresponding pocket for chute number 2 of piper 2. The TOCPTR is indexed by 1 such that the next succeeding data in chute 2 of piper 2 is designated as the new TOC for chute number 2 of piper 2. Since the value 0 in the MINREG register equals the value in the priorly-designated TOC value for chute number 2 of piper 2, 0 is added to the value in the DSUM register of piper 2, and the corresponding weighting value of 0.6 is added to the value in the BSUM register of piper 2.

The CPTR is indexed by 1 such that the TOC of chute number 3 of piper 2 is made available to the piping method. For chute number 3 of piper 2, a command word EOC exists in both the pocket and the top-of-chute. Upon this occurrence, the piping method terminates processing the remaining chutes of piper 2.

The value 44 in the DSUM register of piper 1 is combined with the DSUM register value in piper 2, and the BSUM register value of piper 1 of 3.6 is combined with the BSUM register value of 1.3 in piper 2, and these values are utilized in a brightness equation (to be later explained) to form a candidate criterion or brightness value B that is stored in register BOLD. For the presently-calculated values, a selected criterion brightness value of 0.127995 results, and the position of the query with respect to the entry that gives rise to such selected criterion brightness which is equal to 0 is stored in register LMIN. The value in LMIN also corresponds to the present value in the MINREG register.

Upon completion of the first processing pass through the piping method, the steps are repeated, and thus the minimum value of the TOC of each piper is detected and stored in the MINREG register of the piper in which such minimum detected value was found. The MINREG values of each piper are then compared, and the minimum of those values is returned and placed in the MINREG register of each of the pipers. To this end, the value 1 in the TOC of chute number 7 of piper 1 is found to be the minimum TOC value, and thus the value 1 is placed in the MINREG register of piper 1. Similarly, for piper 2, the minimum TOC value of 1 is found in chute 2, and the value 1 thus found is placed in the MINREG register of piper 2. The value of 1 in the MINREG register of piper 1 is compared with the value 1 in the MINREG register of piper 2 and found to be equal. Thus, the value 1 is returned to both MINREG registers, and the piping method is executed.

As previously described, the difference is formed between the value in MINREG and the TOC of each of the chutes and the corresponding POC of each piper, and such differences are added in the DSUM register. Thus, with appropriate indexing of the CPTR, the difference between the value 1 is formed in the MINREG register is formed between the TOC of chute number 1 such that a value of 3 for D1 is added to the value in the DSUM register, and a value of 0.5 for the corresponding weighting value is added to the value in the BSUM register. For chute number 2, the value calculated for D1 is equal to 4 so that the value 4 is added to the value in the DSUM register, and the corresponding weighting value of 0.4 is added to the value in the BSUM register. For chute number 3, the value for D1 is calculated to be 2 so that the value 2 is added to the value in the DSUM register, and the corresponding weighting value of 0.4 is added to the value in the BSUM register.

For chute number 4, the value for D1 is calculated to be 5; therefore, the value 5 is added to the value in the DSUM register, and the corresponding weighting value of 0.2 is added to the value in the BSUM register. For chute number 5, the difference calculated for D1 is equal to 11. Since 11 exceeds the pipewidth value of 9, the value for the query size is added to the value in the DSUM register. For the sample example, the query size is also equal to 11; thus, this value is added to the value in the DSUM register, and the corresponding weighting value of 0.9 is added to the value in the BSUM register.

For chute number 6, the difference value calculated for D1 is equal to 2; thus, 2 is added in the value in the DSUM register, and the corresponding weighting value of 0.1 is added to the value in the BSUM register.

For chute number 7, the value 1 in the TOC equals that in the MINREG register. Therefore, the difference value D1 is calculated to be 0, such that the value 0 is added to the value in the DSUM register. The corresponding weighting value of 0.9 is added to the value in the BSUM register, and the value 1, which was detected to be equal to the MINREG value, is transferred from the TOC of chute number 7 to the corresponding POC of chute number 7, and the next succeeding value is designated as the new TOC value for chute number 7.

For chute number 8, the difference formed for D1 is equal to 14, which exceeds the pipewidth value of 0.9. Thus, the value 11, equal to the query size, is added to the value in the DSUM register, and the corresponding weighting value of 0.2 is added to the value in the BSUM register. This completes the processing of the TOC in piper 1.

Concurrently, however, the difference values for D1 are being calculated in piper 2. Thus, the difference between the value in the MINREG register, i.e., 1, and the current TOC value 3 for chute number 1 is calculated to be equal to 2, and thus the value 2 is added to the value in the DSUM register, and the corresponding weighting value of 0.7 is added to the value in the BSUM register. For chute number 2 of piper 2, it is observed that the present TOC value equals 1, and therefore, equals the value in the MINREG register.

It is also observed that a value of 0 exists in the pocket for chute number 2. Thus, the value D2, which is the difference between the value in the MINREG register and the pocket value for the chute presently being processed, is equal to 1. The value D1, which is the difference between the value in the MINREG register and the TOC, is calculated to be equal to 0. In accordance with the method steps, the smaller of the values of D1 and D2 for a particular chute and corresponding pocket is added to the value in the DSUM register. Thus, the value 0 is added to the value in the DSUM register, and the corresponding weighting value of 1 is added in the value in the BSUM register. Since the value 1 in the TOC of chute number 2 equals the value of 1 in the MINREG register, the value 1 is transferred to the POC of chute number 2 of piper 2, replacing the value 0 previously contained in the pocket for chute number 2, and the next succeeding value in chute number 2 is designated as the new TOC.

At the termination of this processing pass for piper 1, the value in the DSUM register equals 38, the value in the BSUM register equals 3.6, and for piper 2, the value in the DSUM register equals 2, and the value in the BSUM register equals 1.7. Utilizing these values in a brightness criterion equation, a value of 0.151860 is calculated. Since this value exceeds the value 0.127995, previously calculated, this presently-calculated value replaces the priorly-calculated value, and the candidate position, i.e., 1, replaces the candidate position 0 priorly calculated.

Consider now, briefly, the piping method applied to Table 2C. The minimum value presently existing in the top of all chutes of piper 1 is detected to be the value 3. The minimum value of the presently-designated top-of-chutes of piper 2 is detected to be 4. Thus, the minimum value of the minimum detected in each of the pipers, i.e., piper 1 and piper 2 is the value 3 from piper 1. Thus, the value 3 is stored in the MINREG registers of each of the pipers, and the piping method is reexecuted.

Thus, for piper 1 for chute number 1, the difference value for D1 is calculated to be 1, and thus the value 1 is stored in the DSUM register, and its corresponding weighting value of 0.5 is added to the value of the BSUM register.

For chute number 2, the value for D1 is calculated to be equal to 2. Thus, the value 2 is added to the value in the DSUM register, and the corresponding weighting value of 0.4 is added to the value in the BSUM register.

For chute number 3, the value 3 presently existing in the TOC equals the value 3 in the MINREG register. Thus, the difference D1 is calculated to be 0. Since no value existed in the POC of chute number 3, D2 is not calculated. The value 3 is transferred to the POC of chute number 3, and the next succeeding data value in chute number 3 is designated as the new TOC.

For chute number 4, the value for D1 is calculated to equal 3. Thus, the value 3 is added to the value in the DSUM register, and the corresponding weighting value of 0.2 is added to the value in the BSUM register.

For chute number 5, the value for D1 is calculated to equal 9. Thus, the value 9 is added to the value in the DSUM register, and the corresponding weighting value of 0.9 is added to the value in the BSUM register.

For chute number 6, it is observed that the present TOC value of 3 is equal to the value in the MINREG register. Since a command word, i.e., EOC exists in the pocket of chute number 6, D2 is not calculated, and the value for D1 equal to 0 is added to the value in the DSUM register, and the corresponding weighting value of 0.1 is added to the value in the BSUM register, value 3 is transferred to the POC of chute number 6, and the next succeeding value is now designated as new TOC for chute number 6.

For chute number 7, the value D1 is calculated to be equal to 3, and the value D2 is calculated to equal 2. Thus, the smaller of D2 and D1, i.e., the value 2, is added to the value in the DSUM register, and the corresponding weighting value of 0.9, that is, the weighting value associated with the data value in the POC of chute number 7, is added to the value in the BSUM register.

For chute number 8, the value D1 is calculated to equal 12, which exceeds the pipewidth value of 9. Thus, the query size value of 11 is added to the value in the DSUM register, and the corresponding weighting value of 0.2 is added to the value in the BSUM register.

For piper 2, it is observed that the TOC value of chute number 1 equals the value in the MINREG register. Since the command word EOC exists in the pocket of chute number 1, a calculation for D2 is not performed. The value of 0 for D1 is summed in the DSUM register, and the corresponding weighting value of 0.7 is added to the value in the BSUM register. For chute number 2, the value of 1 is calculated for D1, and the value of 2 is calculated for D2. The minimum value between D1 and D2 is 1 so that the value 1 is added to the value in the DSUM register, and the weighting value corresponding to the data value used in the D1 calculations is added to the value in the BSUM register.

Since no more data values are present for processing, the DSUM register value in piper 1 is combined with the DSUM register value in piper 2, and the BSUM register value in piper 1 is combined with the BSUM register value in piper 2, these sums being utilized for the criterion of brightness equation which yields a value of 0.170145. This presently-calculated brightness criterion value exceeds the just priorly-calculated value of 0.151860. Therefore, the priorly-calculated criterion brightness value is replaced with a newly-calculated criterion value, and the new candidate position replaces the prior candidate position.

In a like manner, the piping method is applied until all the data values and all the active pipers have been processed. For example given, it is observed that a maximum criterion brightness value of 0.236915 occurs at position 8 so that, at the termination of the data processing, a selected criterion brightness of 0.236915 and a selected position of 8 results.

The exact way in which the piping method and the brightness calculations are completed is best understood in connection with each module. Accordingly, a more complete description and understanding of the various data processing means modules are presented below. Additionally, reference should be made to Table 3 for an identification and definition of the control signals and registers utilized in such data processing means.

II. PIPER MODULE

A. General Description

Referring now to FIGS. 3A and 3B, there is shown in block diagram of the piper module of the herein-described invention. The piper module 1016 of the data processing means 1012 processes microcomputer 1010 supplied chute data, in accordance with the chute emptying steps of the piping method, previously described. The pipers make available generated difference sums and weighting value sums to a brightness generator for the calculation of a criterion brightness value.

Each piper includes a chute memory array 1014, associated decoding logic blocks 1031, a top-of-chute pointer register TOCPTR 1032, a chute pointer register CPTR 1033, a pocket memory 1034 and associated decoding logic block 1035, and a minimum MIN finding block 1036. Also included in a piper is a piping logic block 1038 (FIG. 3B), a need-more-data NMD detection logic block and priority encoder 1040, and a controller logic block 1042.

The chute memory block 1014 shown in FIG. 3A includes eight 16-word Random Access Memories RAMs 1044. Each of the RAMs 1044 is termed a "chute". Each chute word is 16 bits wide (see FIG. 13I for the chute word formats). Bits 0 through 7 of the chute word contain distance (positional displacement) information; and bits 8 through 14 of the chute word contain the corresponding weighting value; and bit 15 of the chute word contains a command bit such that if bit 15 equals binary 1, then that chute is considered empty of data. The chute pointer register CPTR 1033 is a 3-bit counter register, whose value is the number of the particular chute being addressed at any given time. The CPTR is under instruction control from a piper control program (to be later explained) contained in controller logic block 1042 (see FIG. 3B) and receives instructions therefrom such that the CPTR is indexed by 1 after the processing of the data in the presently-pointed chute.

Associated with each chute is a top-of-chute pointer TOCPTR 1032. Each TOCPTR is a 4-bit counter register whose value indicates the storage word location being addressed in the chute to which that particular TOCPTR is assigned. The TOCPTR is under instruction control from the piper control program contained in controller logic block 1042 and addresses the word in the chute that is presently designated as the TOC.

It should be noted that for purposes of illustration, Tables 2A-2N refer to piper chutes 1 through 8 and top-of-chutes 1 through 16. The apparatus described herein uses a 3-bit counter register for CPTR 1033 to index the piper chutes and a 4-bit counter register for TOCPTR 1032 to index the top-of-chutes. The apparatus therefore is mechanized to identify the chutes as 0 through 7 and top-of-chutes as 0 through 15. The piper control program and flow charts describing operation of the various modules also follow this latter convention.

The pocket memory 1034 is an addressable register having eight storage word locations, each word location having 16 bits. Each pocket memory word location is associated with a particular chute in the chute memory block 1014. A pocket memory location word is loaded with data only from its corresponding chute during an operation called "popping the chute" (described in the section discussing the logical operations of the piper logic block). The pocket memory 1034 is addressed by the CPTR 1033 so that addressing any chute simultaneously addresses its corresponding pocket (POC). The decoding logic block 1035 (FIG. 3B) decodes the output of the CPTR to point to the word location of the value in the pocket memory corresponding to the chute presently being processed.

The data value presently existing at a designated TOC of each chute is supplied to a corresponding MIN finding block 1036 (FIG. 3A) that is associated with each of the chutes. Each of the MIN finding blocks 1036 of each chute is serially connected to form a minimum value finding logic block 1029 to determine the minimum value of the information values presently existing at all the TOCs of a piper. Each MIN finding block 1036 is connected to the distance fields, i.e., bits 0 through 7 plus bit 15 and of the current TOC. Thus, the value MIN existing at the output 1037 of the minimum value finding logic block 1029 represents the smallest value of the TOC of a single piper. It should be noted that the MIN finding block 1036 includes bit 15 along with bits 0 through 7 of the distance field in the comparison of each TOC data value so that the end-of-chute EOC, end-of-data (EOD), and an end-of-file EOF command words are included in such comparisons. Thus, a command (see FIG. 13A) value will appear in the minimum value register MINREG 1039 after all valid data words have been processed.

The piping logic block 1038 continuously monitors the TOC and the POC storage locations being addressed by the CPTR and the TOCPTR registers, and calculates the difference between the distance field (D) of TOC and the value in MINREG and the difference between the D field of POC and the value in MINREG. The piping logic block performs the logical operations as described in the piping method steps and corresponding logical operations.

The need-more-data NMD detection logic block and priority encoder 1040 continuously monitors the TOC of every chute and provides an indication if any present TOC contains an NMD command (see FIG. 13B). An NMD command is indicated by a 1 in bit 14 and a 1 in bit 15 in an NMD command word that exists in word 15 (16th word) of the chute requiring such additional data. Bits 0 through 13 contain the chute refill identification information so that the microcomputer 1010 will have the proper address in its memory where the next segment of chute data for the indicated chute is located. The need-more-data detection logic block checks all the chutes for the existence of an NMD in one clock time. The logic also sets CPTR to the address of the highest numbered chute containing an NMD command.

1. CONTROL LOGIC BLOCK

Figure 4:
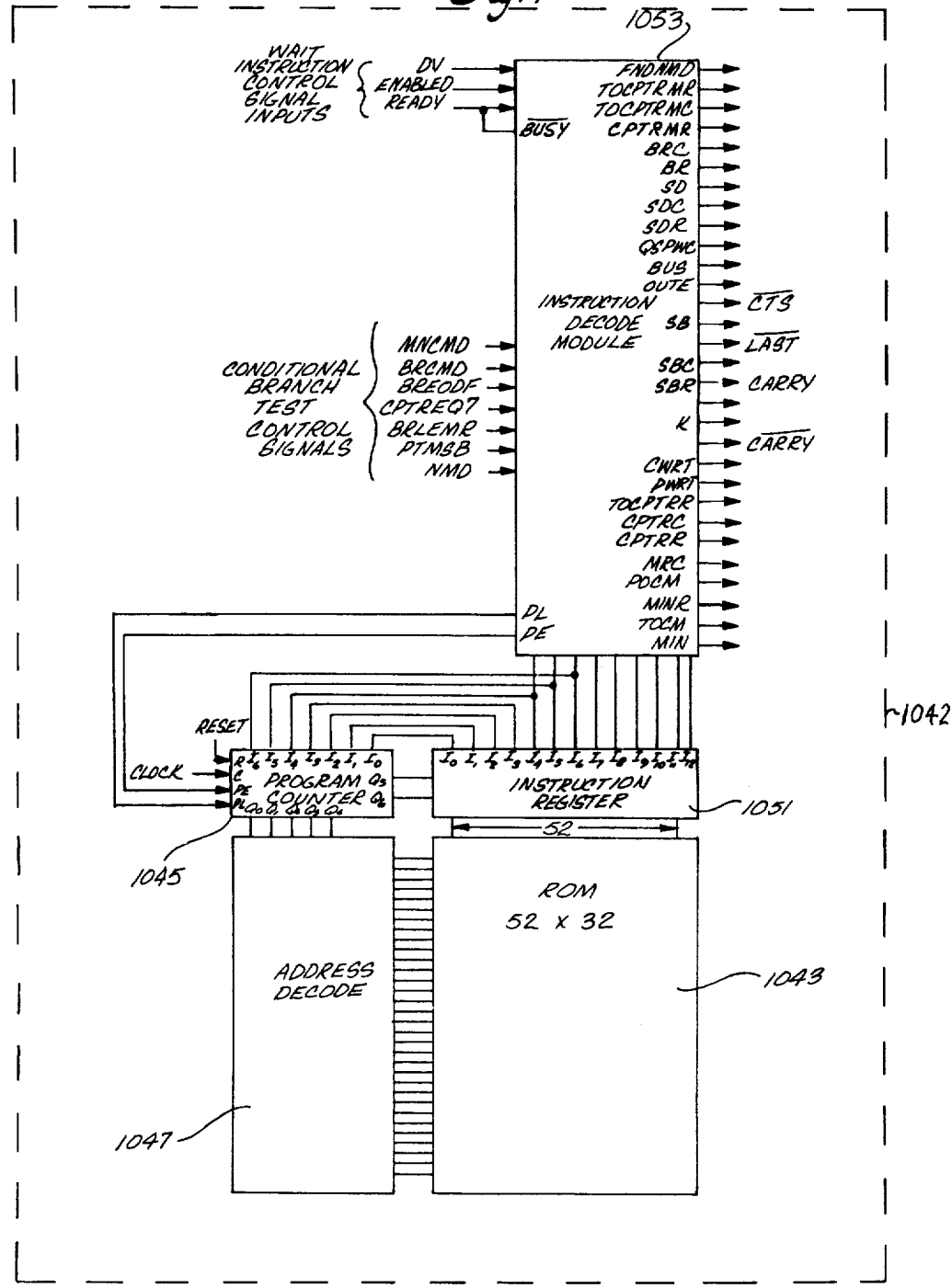
FIG. 4 is a block diagram of the program controller for each of the piper modules of FIGS. 3A-3D.

The control logic block 1042 shown in FIG. 4 includes a 52×32 Read-Only Memory ROM 1043 for storing instructions associated with a piper control program. The program counter 1045 stores the address of the instruction location of an instruction stored in the ROM 1043. The program counter 1045 is advanced by means of an external clock signal coupled to the Clock input terminal C of the program counter.

In the present embodiment, an external clock operating at 5 MHZ clock rate is used.

The program counter 1045 is enabled or disabled by a Program counter Enable PE control signal from the instruction decode module 1053. Upon receipt of each clock pulse, the program counter 1045 advances by 1 in hexadecimal order to the next instruction number. The advance occurs, however, only if control signal PE is not low. Control signal PE is low whenever a READY on wait, DV on wait, or ENABLED wait instruction is currently in the instruction register 1051, and the appropriate external control signal, READY, DV, or ENABLED input to the instruction decode module 1053 is off. Otherwise, control signal PE is high, and the program counter advances by 1. The wait instructions and the external control signals are explained during the detailed description of piper operation.

If the Parallel Load PL control signal is high at the same time that the PE control signal is high and a clock pulse arrives, the program counter 1045 does not advance by 1. Instead, it loads the address present on its input address lines 0-6 directly into its counter registers in order to execute jump instructions. These seven address lines are connected to bits 0-6 of the instruction register. Control signal PL is high (jump instructions are executed) whenever a conditional or nonconditional jump instruction is currently in the instruction register 1051, and the appropriate test control signal input to the instruction decode module is high. The jump instructions and test control signals are explained during the detailed description of piper operation. A Reset control signal is coupled to the R input terminal of the program counter 1045. A Reset control signal is issued by the brightness generator and causes the piper program counter to reset to the 00 instruction. A Reset signal overrides all other signals to the program counter.

The address decoder 1047 is coupled between the program counter 1045 and the ROM 1043. The address decoder decodes the 5 bit program counter output, i.e., $Q_0$ through $Q_4$ (see FIG. 4) and causes four instructions, whose location in the ROM is decoded by decoder 1047, to appear in the instruction register 1051, which is 52 bits wide, and thus accommodates four 13 bit instructions. Address lines $Q_5$ and $Q_6$ from the program counter 1045 selects one of the four instructions for execution.

The instruction decode 1053 is coupled to the instruction register 1051 and decodes the instruction contained therein, as selected by the seven address lines of the program counter 1045. The outputs (see FIG. 4) of the instruction decode 1053 are the control signals that control the various hardware elements that execute the piper operation. The high or low state of each control signal is set in accordance with the states specified by each instruction decoded from instruction register 1051.

The control logic block 1042 thus produces the control signals that sequentially step the piper components through the logical states required to execute the piping method by a rate set by the external clock control signal. The control logic block executes detailed microinstructions, contained in the ROM of the control logic block 1042, and activates the piper logic components in order to execute the steps of the piping method.

Table 4 is a listing of the piper control program that controls the execution of the steps of the piping method, as well as other piper functions. Explanation of the instructions and corresponding effect of such instruction in the piper is given in the detailed description.

2. PIPER MODULE OVERVIEW

Figure 3C:
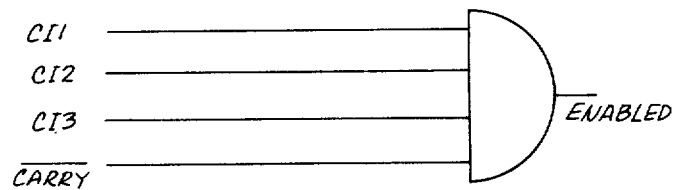
Figure 3D:
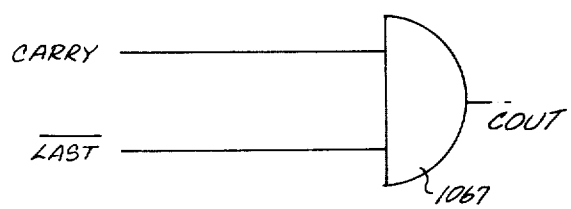
Figure 5A:
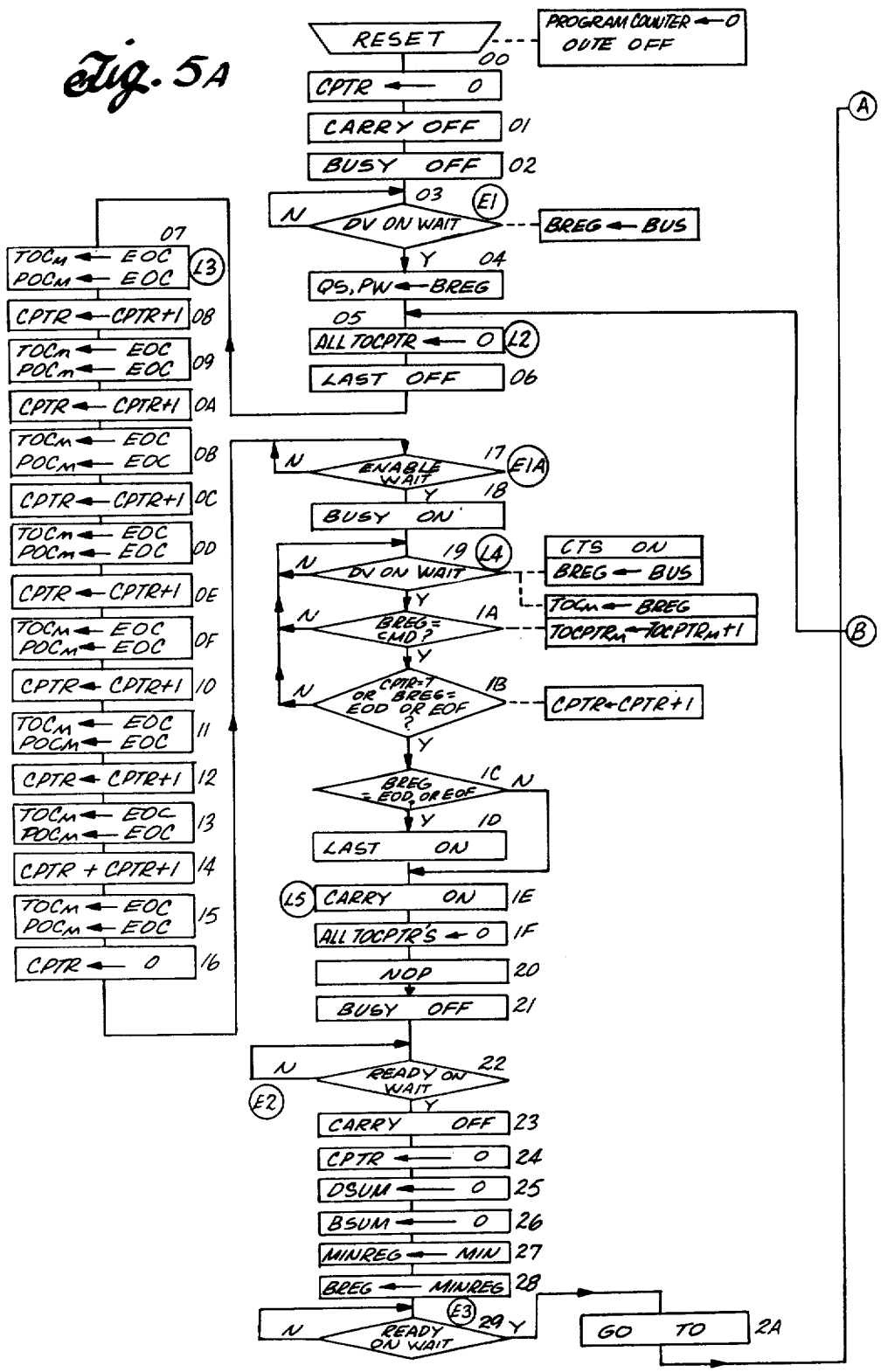
FIGS. 5A-5C are detailed flow charts illustrating the sequence of operations of each of the piper modules of FIGS. 3A-3D.
Figure 5B:
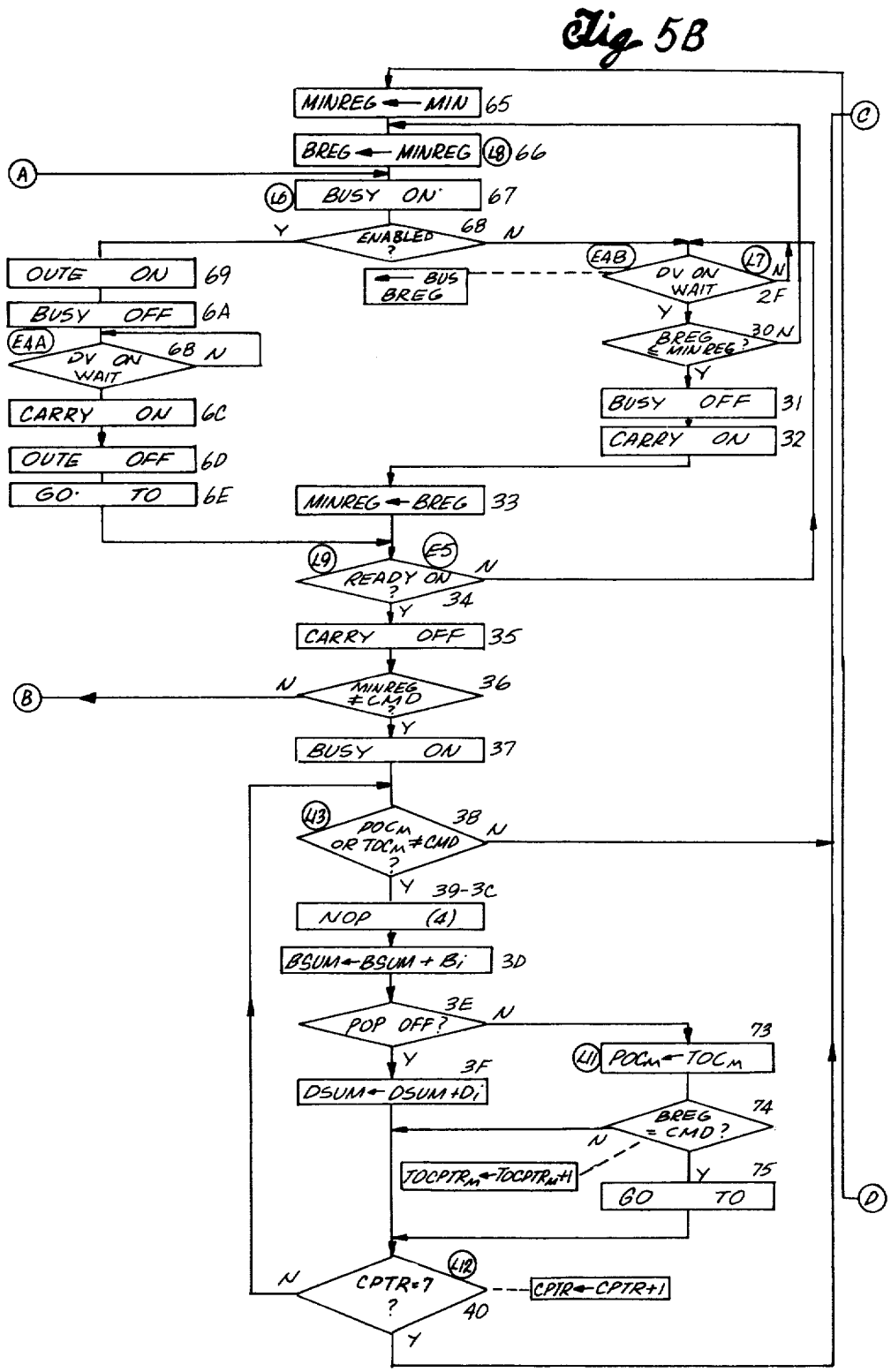
Figure 5C:
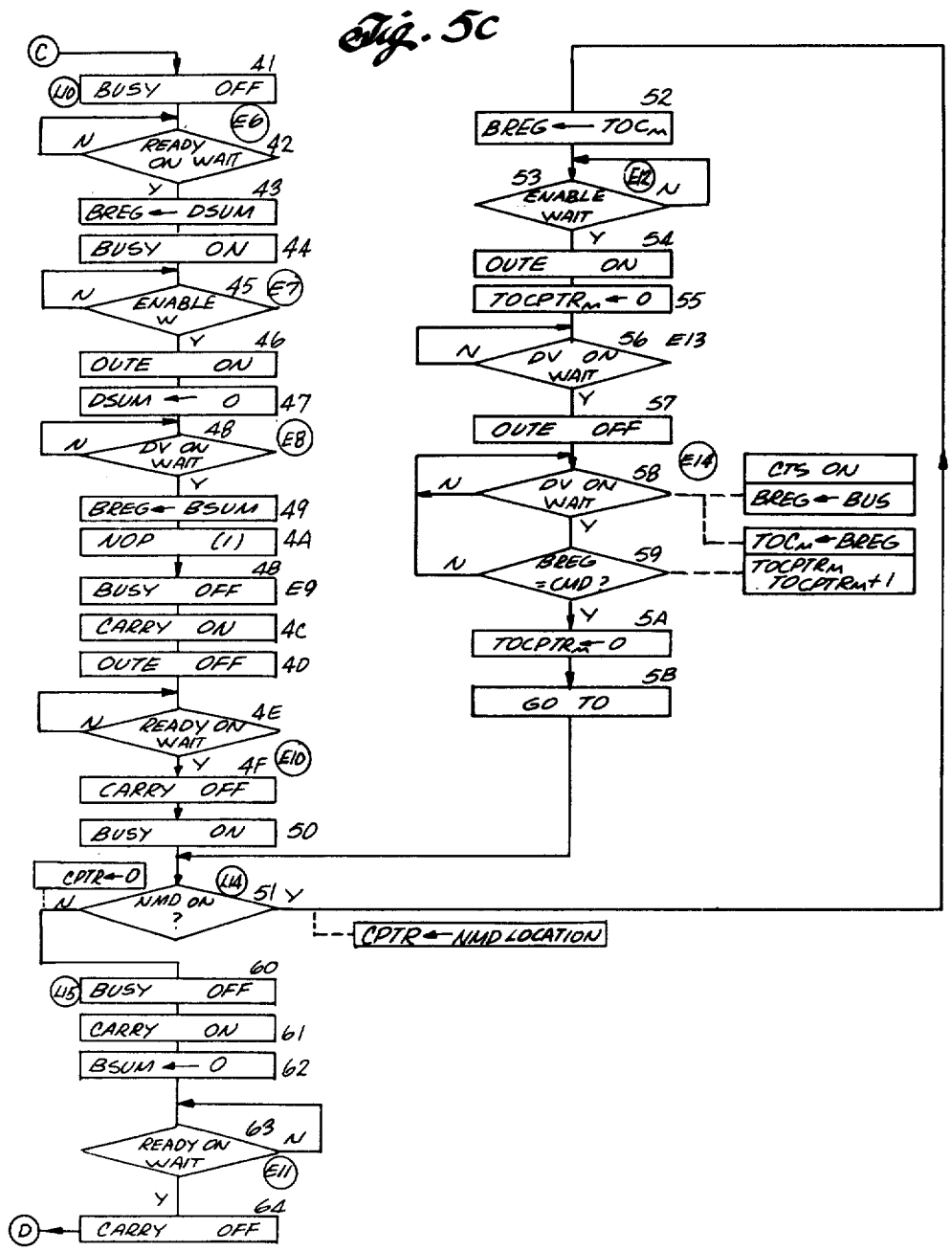

Prior to a detailed discussion of the piper in terms of the instruction sequence and effect on the piper hardware components, a more general operational overview utilizing the block diagrams of FIGS. 3A and 3D and the flow diagrams of FIGS. 5A through 5C is appropriate. References E1 through E14 in FIGS. 5A through 5C designate points of piper module synchronization with the brightness generator. Such reference numerals are also indicated in the brightness generator flow diagrams of FIGS. 11A through 11F. The references L1 through L16 in FIGS. 5A through 5C and Table 4 designate the first microinstruction following an entry point in the logic flow where processing control reenters the microinstruction sequence from a processing loop or a "return". As discussed, the piper executes five independent operational functions. Each of the functions is briefly discussed below with reference to the flow charts shown in FIGS. 5A through 5C.

The piper control signal instructions referred to in the following sections are stored in ROM 1043 that forms a part of the piper control logic block 1042 (see FIG. 4). The brightness generator control signal instructions referred to in the following sections are stored in ROM 1147 of the brightness generator program controller 1140 (see FIG. 12).

It should be noted that the numbers (not encircled) adjacent the function blocks shown in FIGS. 5A through 5C refer to the instruction identified by such instruction number executed by such function block. (See Table 4 for the piper control program instruction numbers and corresponding instruction).

INITIALIZATION

The initialization function is executed during instructions 0016. A RESET on signal from the brightness generator (see FIG. 12 and Table 6) resets the program counter to zero and thus the piper control program (see FIG. 4 and Table 4) is reset to instruction 00. As a result of the RESET command, the piper control program turns control signal OUTE off which disables the Data Bus line driver 1046 to decouple the output of register BREG from the Data Bus. The RESET command also initializes CPTR to zero so that it points to the first chute to be filled with data, sets control signal CARRY off which disables subsequent pipers (if any) "below" it on the Data Bus (see FIGS. 3D and 6), and turns BUSY off to release the READY line. The piper control program then enters the DV on wait state at E1 (FIG. 11) to test for the receipt of a DV (data valid) on signal from the microcomputer 1010. Control signal DV is set on by the microcomputer when data is ready to be transferred to the appropriate data processing means module. Since each DV on test simultaneously transfers Data Bus contents to the input of register BREG when the YES branch is taken at E1, (see FIG. 5A), valid data from the Data Bus exists in BREG. This first Data Bus word after a reset contains the new query size QS and pipewidth PW for the next cycle of piping. The value of QS and PW in BREG is then transferred to registers QS and PW and the piper begins chute filling processing.

CHUTE FILLING

The chute filling function is executed during instructions 17-1B. The piper control program initializes all TOCPTR registers to zero so that they point to the first TOC in each chute to be filled. It then sets control signal LAST off in case more chutes are required beyond the eight in the piper, and stores EOC command words in each TOC and POC to clear these memory locations of random startup values and to guarantee that bit 15 of each POC contains a 1. Piper control program uses bit 15 of POC and TOC to determine if data exists in a chute or pocket presently indexed. If bit 15=1, then that pocket or chute is considered "empty" of data. Storing a data word (noncommand) in a POC or TOC automatically clears bit 15.

The piper control program next checks to see if the piper has been enabled, i.e., CI1, CI2, and CI3 (see FIGS. 3C and 6) all on, signifying that the brightness generator and any pipers "above" (see FIG. 6) a given piper have finished initialization processing and filled their chutes without encountering an EOD or EOF command. Thus piper 2 will not be enabled until filling the chutes of piper 1 by microcomputer 1010 is completed. When a piper control program detects its piper enabled control signal on (see FIGS. 3A and 4), it turns BUSY on to hold the READY line off, thus indicating to the remaining pipers that chutes are being filled in the presently-enabled piper. Note (see FIGS. 4 and 6) that READY outputs of all pipers are tie-ORed, thus forcing synchronization of the piper array at the READY on wait instruction points in the logical flow. At each iteration of the DV on wait (at L4), the control program: sets control signal CTS on to indicate to the microcomputer that the piper is ready for data; enables a BREG to TOC transfer to occur on the next instruction cycle; and checks for a DV on signal, each time transferring bus contents to BREG. After detecting the DV on signal, which indicates that valid data exists on the Data Bus, the control program takes the YES branch from the wait state. It next checks BREG for the presence of a command while simultaneously transferring Data Bus contents from BREG into TOC(-TOCPTR)(CPTR), as set up by the previous microinstruction. As described below, TOC(-TOCPTR)(CPTR) is a shorthand notation that indicates the top-of-chute indicated by the value in the TOCPTR register of the chute indicated by the value in the CPTR register. If the last Data Bus word transferred was data (i.e., no command in BREG), the control program loops back to wait for another DV on signal and the next data or command word from the microcomputer. If BREG contains a command, indicating that the particular chute is full or requires no more data, the control program checks the contents of CPTR and BREG. If CPTR does not equal 7, indicating that not all chutes contain data, and BREG does not contain an EOD or EOF command, indicating that more chute data exists for the data base entry being piped, the control program increments CPTR to point to the next chute to be filled and takes the NO branch, returning to L4 to await the first chute word to be filled in the next chute from the microcomputer. If the YES branch is taken (all chutes filled or end of data), the control program checks to see if it was the result of finding an EOD or EOF command in BREG. If it was the result of an EOD or EOF command, LAST is set on to prevent the enabling of any subsequent pipers during piping of the current query/entry pair, since no more data is expected, and thus no more chutes required. Note that the "lower" piper enabling signal COUT (see FIG. 6) is formed in an "upper" piper, at the output of AND gate 1067 (see FIG. 3D) having input control signal CARRY on and LAST off (i.e., LAST on). If the branch was the result of CPTR=7, the control program branches around the LAST on instruction, leaving LAST off, as initially set, since at least one additional piper will be needed to provide at least one additional chute.

In either case, the control program next turns CARRY on to enable subsequent pipers, if any, to load their chutes. All TOCPTR pointer registers are reinitialized to zero so that they point to the first word in each chute for the beginning of chute processing. The control program then turns BUSY off to indicate to the reset of the piper array that the piper is finished with chute loading and is ready to enter the next processing sequence on receipt of a READY on signal at E2.

When a READY goes on, indicating that the pipers have finished chute loading, the control program turns CARRY off and initializes chute pointers and summation registers DSUM and BSUM, in preparation for minimum MIN determination and piping, and then waits at E3 until the brightness generator causes the microcomputer to decouple from the Data Bus. When READY goes on, the control program enters the minimum MIN determination processing.

MINIMUM MIN DETERMINATION

The minimum MIN determination function is executed during instructions 1C-34 and 65-6E. During minimum MIN determination, each current piper MIN value as found by the MIN finding logic block 1029 of each piper (see FIG. 3A) with the MIN values found in the other pipers, replaces higher values with lower values iteratively in register MINREG of each piper until all pipers contain the same value, i.e., the smallest existing MIN value for the current set of array TOCs, in their MINREG registers. Minimum MIN determination is performed after each change in the current set of TOC values in one or more pipers, i.e., after chute filling, piping, and NMD servicing. Minimum MIN determination processing proceeds as follows:

a. All Pipers

The control program first turns BUSY on at L6 (FIG. 5B) to hold all pipers and the brightness generator in the minimun MIN determination phase via the READY on check at E5 (FIG. 5B) until the minimum MIN (smallest TOC of the current set) is found and each piper has replaced its local MIN value with the array minimum MIN in its MINREG register.

b. Piper 1

On entering minimum MIN determination processing from either E3 (FIG. 5B) (first chute processing pass) or from E11 (after piping and NMD servicing), piper 1 is enabled by the brightness generator GO on signal. All other pipers at this time are disabled by one or more COUT off signals from other pipers. Therefore, piper 1 is always the first piper to take the YES branch from the ENABLED test function block that follows the BUSY on instruction at L6 and to place its MIN value on the Data Bus. The piper waits at E4A for a DV on signal from the brightness generator. Upon detection of the DV on, which indicates that the other pipers now have piper 1's MIN value transferred from the Data Bus for comparison, the piper 1 control program turns CARRY on (activating COUT) to enable the next pipers below it; decouples from the Data Bus; and subsequent to checking other pipers operating in the minimum MIN determination phase (READY off at E5), enters the MIN compare loop instructions 2F-33 (explained in c. below).

c. Other Pipers

Since all pipers other than piper 1 are disabled when first entering minimum MIN determination, they initially take the NO branch of the ENABLED instruction following L6; enter the MIN compare loop; and wait at E4B for a DV on signal while simultaneously transferring Data Bus contents to BREG at each iteration of the E4B check. When a DV on is detected, the pipers take the YES branch from E4B and compare the value of their local MIN with piper 1's MIN value just transferred from the Data Bus.

The pipers whose MIN values are equal to or greater than the piper 1 MIN value; (1) turn their BUSYs off, since they cannot contain the minimum MIN, (2) turn CARRY on to enable subsequent pipers (if any) whose MIN values were less than piper 1's, and (3) replace their own MIN value with piper 1's smaller MIN value in register MINREG. Then, if READY is still off at E5, indicating that one or more pipers still remain whose MINs are less than the piper 1 MIN, these remaining pipers enter the MIN compare loop again to compare their newly-acquired (piper 1) MIN with the next enabled piper's (smaller) MIN value.

The pipers whose MIN values compared at E4B are smaller than the piper 1 MIN, loop back to enter the instruction sequence at L8. Of these surviving pipers, the one closest to piper 1 in "lock ahead" order is the next piper to be enabled (i.e., GO on, plus piper 1 COUT on, plus possible COUT on signals from other pipers). Therefore, this "closest" piper now takes the YES branch from the ENABLED instruction and places its own MIN on the Data Bus. The other pipers that have looped back to L8, but are not enabled at this time, reenter the MIN compare loop.

The processing sequence just described above is repeated for the pipers whose MIN value is less than the current Data Bus MIN.

This cycle then repeats for succeeding piper(s) whose MIN value is less than the current Data Bus MIN until all pipers contain the minimum MIN value in their MINREG registers. The processing is now ready to proceed to the piping phase.

PIPING

The piping function is executed during instructions 35-50 and 73-75.

Following the YES branch at E5 (FIG. 5B), the control program checks MINREG to see if it contains a command. If all data has been processed, the control program returns to L2 to initialize and load the chutes for the next piping cycle. in MINREG contains data, the control program turns BUSY on both to indicate that the piper is entering its piping phase, and to inhibit DSUM transfer to the brightness generator by the other pipers until the presently-enabled piper has completed its piping function. The control program checks POC(CPTR) and TOC(TOCPTR)(CPTR) for the presence of piping data (bit 15=zero). If neither contains piping data (i.e., both contain bit 15−1 and are thus "empty"), processing control branches directly to L10 to begin DSUM or BSUM transfer to the brightness generator. If piping data is present in either POC to TOC indicating that piping results from the piping combinatorial logic exists at the Bi and Di inputs of registers 1062 and 1060 respectively (see FIG. 3B), the control program waits four clock periods for the piping logic to stabilize. It then sums Bi into BSUM 1061 (see FIG. 3B) and checks the POP flag (an output of subtracter 1086). If POP is on, indicating that the contents of TOC(-TOCPTR)(CPTR) equals MIN (i.e., that this TOC provided the minimum MIN for this chute processing pass and therefore must be moved into its corresponding POC), the control program stores the contents of TOC(TOCPTR)(CPTR) in POC(CPTR) and increments TOCPTR(CPTR) to point to the next TOC in turn for that chute. If POP is off, then Di is non zero and the control program sums Di into DSUM 1059 (see FIG. 3B).

In either case, the control program next checks the value of CPTR. If it is less than 7, indicating that not all TOC's have been processed, the control program increments CPTR to point to the next chute and loops back to L13 to process it. If CPTR equals 7 (all chutes processed for a given chute processing pass), the control program turns BUSY off to indicate that the piper's TOC processing is complete, and waits at E6 for a READY on signal. When a READY on is received, indicating that all the pipers are finished with TOC processing, and the brightness generator has completed brightness calculations for the previous chute processing pass, the control program initiates DSUM and BSUM transfer to the brightness generator as follows.

The control program causes the transfer of DSUM into BREG for subsequent transfer to the Data Bus. Next it turns BUSY on to indicate to the pipers that a given piper is ready to transfer DSUM and BSUM and then such piper remains in a wait mode until enabled. When an enabled condition is detected at E7, indicating that the previous pipers have finished their DSUM and BSUM transfer to the brightness generator, the control program turns OUTE on to place the contents of BREG on the Data Bus; clears register DSUM in preparation for the next piping cycle; and waits at E8 for a DV on signal from the brightness generator. When DV on is detected, indicating that the piper's DSUM has been transferred to the brightness generator, the control program transfers the contents of BSUM into BREG, with OUTE still on to make BSUM available to the brightness generator. The piper and the brightness generator are in synchronization at this point due to the DV on synchronization at E8. The piper turns its BUSY off at E9 in synchronization with the brightness generator's response to its own DV on signal and simultaneously reads the piper's BSUM from the Data Bus. The control program next turns CARRY on to enable the next piper to transfer its DSUM and BSUM to the brightness generator and turns OUTE off to decouple BREG from the Data Bus (see FIG. 3B). The control program now enters the READY on wait state at E10 while the pipers complete sequentially transferring their DSUM and BSUM's to the brightness generator. When the READY on occurs, the control program turns CARRY off to prevent subsequent pipers from being enabled and using the Data Bus, and turns BUSY on to indicate that it is now in the NMD processing loop, holding the other pipers at E11 until the present piper completes NMD servicing.

NMD SERVICING (CHUTE REFILLING)

The NMD servicing function is executed during instructions 51-5B. If the NMD processing block 1040 (see FIG. 3A) indicates that an NMD command exists in a particular TOC, the control program loads CPTR with the chute number provided by the NMD processing block 1040, then loads the NMD command found at the particular TOC into BREG in preparation for transferring it to the Data Bus. When an enabled condition is detected at E12, the control program turns OUTE on to place the NMD on the Data Bus, and initializes TOCPTR(CPTR) to zero in anticipation of chute reloading. Concurrently, the brightness generator generates a DV on signal to cause the microcomputer 1010 to read the Data Bus, and when DV on is detected by the piper at E13, indicating that the microcomputer has received and read the piper's NMD, the control program decouples the piper output from the Data Bus, i.e., (OUTE off) and waits at E14 for a second DV on signal from the microcomputer indicating that it has chute refill data ready for transmittal to the piper. At each execution of the DV on wait instruction, the control program generates a CTS signal to indicate to the microcomputer that the piper is ready for data; transfers bus contents to BREG; and sets up a BREG to TOC data transfer to occur on the next instruction cycle. After DV on is detected, indicating that the microcomputer has placed data on the Data Bus, the control program takes the YES branch from the wait state to check the contents of BREG. The control program checks BREG to see if the chute refill word just received contains a command; transfers the contents of BREG into TOC(TOCPTR)(CPTR), as set up by the previous instruction; and increments TOCPTR(CPTR) to point to the memory location in the chute indexed by CPTR in which to store the next chute refill word. If BREG does not contain a command, then the control program loops back to L16 to repeat the E14 processing to take the next chute refill word from the Data Bus. If the chute refill word does contain a command, the chute refill operation is complete, and the control program initializes TOCPTR(CPTR) to zero so that it points to the new TOC for the chute indexed by CPTR at the beginning of the next chute processing pass.

The control program now returns to L14 to see if it has processed all remaining NMDs. If it has not, it branches to repeat the NMD processing described above for the next NMD. If no NMDs remain to be processed, the control program branches to L15 and turns BUSY off to indicate to the pipers that it has finished NMD processing, turns CARRY on to enable subsequent pipers to service their NMDs, if any, clears the BSUM register 1061 in preparation for a new chute processing pass and enters the READY on wait state at E11 to wait for the other pipers to finish NMD servicing.

When READY goes on at E11, the control program prepares for a new minimum MIN determination sequence by storing the new MIN, resulting from NMD chute refilling and chute popping, into MINREG, and turns BUSY on to cause the piper to take the NO branch at E5 as long as this or any other piper remains in the MIN compare loop. MIN processing now proceeds as previously described in the Minimum Min Determination section.

B. DETAILED DESCRIPTION OF THE PIPER INSTRUCTION PROGRAM

Reference should be made to Table 4, FIGS. 3A, 3B, 3C, 3D, FIGS. 5A, 5B and 5C.

The piper control program as discussed provides the control signals that control the various hardware elements within each piper that execute the operational functions of the piper. The hardware elements as will be discussed respond to the state (i.e., on or off synonymous with high or low) of the control signals that are coupled to such hardware elements. The hardware contemplates implementation by means of LSI technology and therefore each hardware element will be described as to its function rather than a commercially-available equivalent.

The pipers are reset by a RESET signal from the brightness generator when the query size changes such as occurs after an end-of-file is reached in the memory, or after a brightness value of 1 is calculated. A reset pulse is also issued by the brightness generator subsequent to its receipt of a Power On Reset POR signal from the microcomputer 1010.

In the piper, the reset pulse resets the program counter of the control logic block 1042 to 00 causing the logic block 1042 to select and decode instruction 00 from the logic block ROM 1043. The reset pulse also causes control signal OUTE to become low, thus turning off the Data Bus line driver 1046 and disconnecting the output of register BREG from the Data Bus.

In the following descriptions of instruction interpretation, control signals not described as high are low, regardless of their state during the previous instruction. The four exceptions to this are control signals BUSY, OUTE, CARRY, and LAST. Once made high or low, they remain in that state during subsequent instructions until second instructions specifically change their state. Instructions are numbered in the hexadecimal (base 16) notation.

During instruction 00, control signal CPTRR (see FIG. 3A) is caused to become high, which causes register CPTR to reset (initialize) to zero. Initializing the CPTR register to zero causes it to point to the first chute to be filled with data and command words from the Data Bus.

During the instruction 01, control signal CARRY is caused to become low, causing the output COUT (see FIG. 3D) of AND gate 1067 to go low, which disables pipers other than the one presently active.

During instruction 02, control signal BUSY is caused to become low. Since all pipers (the pipers required to store the present query) $\overline{BUSY}$ control signal lines are tie-ORed to produce control signal READY, synchronization of the pipers occurs at each READY on wait instruction. The individual piper control programs remain at each such instruction until all pipers finish the previous processing phase and cause their BUSY control signals to become low. Any BUSY control signal high causes control signal READY to become low (READY off). All BUSY control signals simultaneously low cause control signal READY to become high (READY on). Thus, entry into the next processing phase is inhibited until control signal BUSY in each piper is off.

FIG. 6 shows that all READY control signal inputs of the pipers and the brightness generator are connected in parallel to one end of a resistor R whose other end is connected to a power supply V+. Internally in each piper and the brightness generator, the READY control signal is connected to the instruction decode module (see FIGS. 4 and 12). The READY control signal is also connected to the $\overline{BUSY}$ output of the instruction decode module. When the BUSY control signal is caused to become high, $\overline{BUSY}$ becomes low. Since $\overline{BUSY}$ is connected to the READY input, the READY signal becomes low. Since all READY signals are tied together to the common resistor R shown in FIG. 6, all READY control signals to all pipers and the brightness generator also become low. Thus, control signal READY to all pipers and the brightness generator is low if any piper or the brightness generator has caused its BUSY control signal to become high. The READY control signal remains low until all pipers and the brightness generator have caused their BUSY control signals to become low simultaneously.

Instruction 03 of the controller program is next executed. The instruction causes the control signal BUS and the control signal BRC from the instruction decode module 1053 of control logic block 1042 to become high. BUS high causes IBUS input gate 1048 to become conductive, placing the information presently existing on the Data Bus line on the IBUS 1028. The Data Bus line and the IBUS line include 16 individual data lines to accommodate a 16-bit word format (see FIG. 13). BRC (coupled to the Chip Enable CE input of BREG, see FIG. 3B) high enables the BREG register, which has its data input (D) terminal coupled to the IBUS, to copy in the data presently existing on the IBUS. The data presently existing on the Data Bus is the value QS, the query size and PW, the pipewidth, both supplied by microcomputer 1010.

It should be noted that although the IBUS has 16 individual data lines to accommodate a 16 bit word format, the IBUS is shown in FIG. 3B as a single line. The convention of showing multiple single lines as a single signal line is maintained throughout this discussion. FIG. 13A through FIG. 13I show the word formats for each of the various data word and command words used herein. It should be understood that the signal lines carrying such data and command words or parts thereof have the number of lines required for the transmittal of such words. The numerals above each pictorial representation of the words in FIGS. 13A–13I represent the bit positions in such word.

Additionally, it should be understood that control signals are coupled to those hardware elements that are responsive to such control signals. Such coupling is identified in the appropriate hardware figures with the name of such control signals adjacent to the hardware element to which the control signal line is connected. This convention will be maintained throughout this discussion.

Instruction 04 of the controller program is next executed. The instruction causes the control signal QSPWC and BR from the instruction decode module of the control logic block 1042 to become high. BR high causes gage 1084 to become conductive, allowing the value in the BREG register to be copied onto the IBUS. A high state of control signal QSPWC, that is coupled to the Chip Enable CE input of both the QS register 1063 and PW register 1065, enables the PW register and the QS register to copy in the information presently existing on the IBUS. The PW register data input (D) is coupled to lines 0 through 6 of the IBUS, which presently contains a 7-bit word equal to the pipewidth value. The data input (D) of the QS register is coupled to lines 8 through 14 of the IBUS, which presently contains a 7-bit word equal in value to QS. At this point, the initialization phase of the piper is complete.

The chute-filling phase is initiated upon issuance of instruction 05 of the piper control program. The control logic block 1042 initialized all TOCPTR registers to zero, such that they point to the first word location in each chute. The instruction causes the control signal TOCPTRR to become high. TOCPTRR high causes the output of OR gates 1050 (see FIG. 3A) (one per chute) to become high. The outputs of these OR gates are connected to the reset terminals R of the TOCPTR pointer registers 1032 (one per chute). With R high, the TOCPTR registers are initialized to zero.

Instruction 06 causes control signal LAST to become low in case more chutes are required beyond the eight in the piper. Thus, when the control signal LAST is low ($\overline{\text{LAST}}$ high), and control signal CARRY is high, the output of AND gate 1067, i.e., COUT is high, thereby enabling the next succeeding piper.

During instruction 07 of the control program, control signals K, TOCM, CWRT, PWRT, and POCM are caused to become high. Control signal K high causes gate 1049 to become conductive, placing the contents of KROM (an EOC command) on the IBUS. TOCM high causes gate 1054 to become conductive, placing the EOC command word appearing on the IBUS on the TOCM bus 1057 (see FIG. 3B), thereby making the EOC command word available to each chute. POCM high causes the POC gate 1056 to become conductive, thereby making available the EOC command word presently existing on the IBUS, to the pocket memory 1034. When write enable control signals CWRT and PWRT (see FIG. 3A), coupled to each chute and pocket respectively, are high, the contents of the TOCM bus 1057 and IBUS 1028 are copied into the chute and pocket, respectively, that are presently indexed by CPTR. Since CPTR was cleared during the initialization phase, it now points to the first chute (chute number 0), and since TOCPTR was reset to zero for each chute during instruction 05 of the control program, the command word EOC is copied into the first word location of chute number 0 and into the corresponding pocket for chute number 0.

Instruction 08 causes CPTR to be indexed by 1, such that the first word location of chute number 1 is presently addressed. Instruction 09 then causes the command word EOC to be copied into the first word location of chute number 1 and also into the corresponding pocket POC for chute number 1, as in instruction 07. The control program in instructions 0A through 15 repeats the above-described operation by indexing the CPTR by 1 and filling the corresponding chute and pocket with the EOC command words. The EOC command word in each TOC and POC clears these memory locations of random start-up values and guarantees that bit 15 of each POC memory location contains a logical 1. The control program utilized bit 15 of POC and TOC to determine if data exists in a chute or in a chute pocket. If bit 15 equals logical 1, then that pocket or chute is considered "empty" of data. Storing a data word in a POC or TOC automatically clears bit 15.

Instruction 16 next clears CPTR by causing the control signal CPTRR to become high. The control program next executes an ENABLE wait instruction to determine whether a particular piper is enabled. For a better understanding of the ENABLE wait function, reference is made to the multiple pipers shown in FIG. 6.

C. MULTIPLE PIPER ENABLING

Each piper has a CI1, CI2, and CI3 control signal input. In order to active (enable) a piper, all three control signals CI1, CI2, and CI3 must be high. Additionally, in order for a piper to be enabled, its internal CARRY control signal must be low, indicating that the piper is not enabling a subsequent piper.

Each piper is coupled to the GO control signal output of the brightness generator. The existence of a GO signal is a necessary condition to activate all pipers. The existence of a GO signal is a sufficient condition to active piper 1 in the piper string. If, for example, the storage capacity for piper 1 is insufficient for storage of an entry array, piper 1's COUT control signal will go high. Piper 1's COUT control signal is applied to the CI1 and CI2 inputs of piper 2, while the GO signal command is applied to the CI3 input of piper 2. Thus, since CI1, CI2, and CI3 of piper 2 are high, the piper will be enabled.

If, for example, the storage capacities of piper 1 and piper 2 are insufficient for storage of an entry array, the COUT control signal of piper 2 will go high. The CI1 input of piper 3 is coupled to the COUT input of piper 2. The CI2 input of piper 3 is coupled to the COUT of piper 1, and the CI3 input of piper 3 is coupled to the GO signal. Since for piper 3 its CI1, CI2, and CI3 control signals are high, piper 3 is enabled.

In a like manner, the succeeding pipers will be enabled when it is found that the storage capacity of the preceding piper is insufficient for storage of an entry array.

Referring to FIG. 3C, control signal ENABLED is the output of AND gate 1067. The output of AND gate 1067 is high only if control signals CI1, CI2, and CI3, and control signal $\overline{\text{CARRY}}$ from the piper instruction decode module are high simultaneously. $\overline{\text{CARRY}}$ is high when CARRY is low; i.e., when a given piper is not itself enabling a subsequent piper. As FIG. 6 shows, the GO control signal output from the brightness generator and the COUT control signals from the pipers are connected so that control signals CI1, CI2, and CI3 become high simultaneously for a given piper only if GO is high and the COUT control signals of all pipers, if any, between the given piper and the brightness generator (see FIG. 6) are also high. The GO control signal and COUT control signal are ANDed in AND gate 1008 for each group of four pipers to keep the number of enabling signals to not more than four.

The COUT control signal is caused to become high by a given piper to enable the next piper in the piper string (pipers 1-16) (see FIG. 6). As shown in FIG. 3D, the COUT control signal is the output of AND gate 1067. The output COUT of AND gate 1067 is high if control signal CARRY and $\overline{\text{LAST}}$ are high, simultaneously. Control signal $\overline{\text{LAST}}$ is high when control signal LAST is low. Control signal LAST is low when a given piper is not the last piper in the string to contain chute data. Control signal CARRY is caused to become high when processing requires that the next piper in sequence be enabled.

Instruction 18 of the control program causes the control signal BUSY to become high, which causes the control signal READY to become low. BUSY high at instruction 18 ensures piper synchronization at point E2 of the flow chart (see FIG. 5).

During instruction 19 of the control program, the following occurs simultaneously: Control signal CTS becomes low, thus indicating that the piper is ready to receive data from the Data Bus; and data on the Data Bus is copied into the BREG register. If the external DV control signal is off (high), instruction 19 is repeated. If the DV control signal is on (low), the program counter (see FIG. 4) increments to instruction 1A, and, simultaneously, the contents of the BREG register are copied into the TOC of the chute as indexed by the present setting of CPTR and TOCPTR. Since previous CPTR and all the TOCPTR registers have been set to zero, the first data word is placed in the first word location of chute number 0.

Data Bus contents are copied into BREG as follows: The control program sets control signal BUS high and control signal BRC high. To copy the contents of BREG into the first word location of chute number 0, the program controller causes control signal CWRT to become high, thus enabling all chutes to receive data. The control program causes control signal BR to become high, thus causing the contents of BREG to be copied onto the IBUS. Additionally, the control program causes control signal TOCM to become high, which causes the contents of the IBUS to be copied onto the TOCM bus.

The NMD detection logic block and priority encoder 1040 decodes the value in CPTR and, since the value in CPTR is presently zero, causes the 0 output of the priority encoder (see priority encoder 1040, FIG. 3A) to become high. A high on priority encoder output 0 causes the chute number 0 transfer gate 1048 to close, resulting in the copying of the contents of the TOCM bus into the chute location specified by the value in the TOCPTR register. The next instruction, 1A, simultaneously increments the value in the TOCPTR register by 1 and tests tha contents of BREG for the existence of a command word. The test consists of checking whether control signal BRCMD, issued from the BREG register, is high or low. If BRCMD is low, indicating that the data contained in BREG is not a command, the program counter is decremented to instruction 19, and instruction 19 is reexecuted, causing the next data word to be copied into the next available chute word location. If control signal BRCMD is high, indicating that the contents of BREG is a command, the program counter is incremented to instruction 1B.

Instruction 1B simultaneously tests the value in CPTR and the value of control signal BREODF issued from BREG. If the value in CPTR is less than 7, the value in register CPTR is incremented by 1 so that the contents of CPTR point to the next chute to be filled with data, and the program counter is decremented to 19. Instruction 19 is then reexecuted, causing the next data word to be copied into the first word location of the next chute to be filled. If the value in register CPTR equals 7, indicating that chutes 0 through 7 have been filled with data, or if control signal BREODF is high, indicating that the contents of BREG consists of an EOD or EOF command, the program counter is incremented to instruction 1C.

Instruction 1C tests the control signal BREODF output of BREG. If control signal BREODF is high, indicating that the contents of BREG consists of an EOD or EOF command, the program counter is incremented in 1D. If the control signal BREODF is low, indicating that the contents of BREG do not consist of an EOD or EOF command, the program counter is incremented to 1E. In the former case, instruction 1D is executed, causing control signal LAST to become high. The program counter is then incremented to 1E. Instruction 1E is executed, which causes the control signal CARRY to become high. Instruction 1D is executed only if an EOD or EOF command has been detected in BREG. Either of the EOD or EOF commands indicates that no more data will be forthcoming on the Data Bus, and, therefore, no more pipers are needed to store the piper data. If control signal LAST is high, control signal COUT (see FIG. 3D) is caused to become low, preventing subsequent pipers in the piper string (see FIG. 6) to become enabled. If instruction 10 is not executed, control signal LAST will remain low, and since instruction 1E causes control signal CARRY to become high, control signal COUT becomes high. This enables the next piper in line to begin receiving data from the Data Bus.

Instruction 1F is next executed. This instruction causes control signal TOCPTRR to become high. TOCPTRR high causes all TOCPTR registers to reset to zero so that they point to the first word in each chute for the beginning of chute processing. Next, instruction 20, a NO-OP instruction, is executed. A NO-OP instruction does not set any control signals, but allows time for the values in the TOCPTR registers, reset in instruction 1F, to stabilize.

Instruction 21 causes control signal BUSY to become low, permitting control signal READY to become high if all other such BUSY signals are low. During instruction 22, control signal READY is tested. As long as control signal READY remains low, the program counter is not incremented. When control signal READY becomes high, the program counters of all pipers increment to instruction 23. During instruction 23, control signal CARRY is caused to become low, and if control signal LAST is off, causes external control signal COUT to become low, thus disabling any pipers below the present piper.

During instruction 24, control signal CPTRR is caused to become high. CPTRR high resets register CPTR to zero, thus pointing to chute number 0.

During instruction 25, control signal SDR is caused to become high. SDR high resets 9-bit adder 1060 to zero. Concurrently with this operation, control signal SDC is caused to become high, thus enabling accumulator register DSUM, and, thus, the zero contents of 9-bit adder 1060 are copied into DSUM.

During instruction 26, control signal SBR is caused to become high. SBR high resets 10-bit adder 1062 to zero. Concurrently with the above operation, control signal SBC is caused to become high. SBC high enables accumulator register BSUM to receive the contents of adder 1062, thus causing the zero contents of the adder 1062 to be copied into register BSUM. This operation clears the BSUM register to accumulate the next weighting value sum.

During instructions 1C through 26, the MIN finding logic determines the minimum distance value for the current TOC for each chute. This is accomplished by means of continuously evaluating the present TOC for each chute in MIN finding logic block 1029. The MIN finding logic block 1029 comprises a series connection of the MIN logic blocks 1036, with a block 1036 coupled to each chute. The distance field and the command field, that is, bits 0 through 7 and bit 15 of chute number 7, are applied to the MIN logic block 1036 that is coupled to chute number 7. The MIN logic block 1036 includes a 9-bit comparator 1064, having an A input coupled to the distance/command (D/C) fields of chute number 7 and a B input coupled to the D/C fields of chute number 6. Included in the MIN finding logic block 1036 are series-connected gates 1066 and 1068. The common connection point 1070 of the two series-connected gates forms the output of the MIN logic block. Gate 1066 has a terminal 1072 that is coupled to the D/C fields of chute number 7. Gate 1068 has a terminal 1074 that is coupled to the D/C fields of chute number 6. The $\overline{A<B}$ output of comparator 1064 is coupled to the control terminal 1070 of gate 1068 and the input terminal of inverter 1080. The output of inverter 1080 is coupled to the control terminal 1078 of gate 1066. If the D/C field value of chute number 7 applied to terminal A of comparator 1064 is greater than the D/C field value of chute number 6 as applied to terminal B of the comparator 1064, the output $\overline{A<B}$ of the comparator will be high, thus activating gate 1068 and, due to inverter 1080, inactivating gate 1066. Thus, the D/C fields in chute number 6 will appear at the output 1007 of the comparator. For the case when the D/C field value in chute number 7 is less than the D/C field value in chute number 6, the output $\overline{A<B}$ will be low, thereby deactivating gate 1068 and, due to inverter 1080, activating gate 1066. Thus, the D/C field value of chute number 7, being less than the D/C field value of chute number 6, will appear at the output 1070.

In a like manner, the value appearing at output 1070 will be compared to the D/C field value presently at the TOC of chute number 5. In accordance with the discussion previously described, the smaller of the two values, i.e., the value at output 1070 of a MIN logic block coupled to chute number 5 and the value in the D/C fields of the TOC of chute number 5, will be selected. After all chutes have been compared, the smallest TOC value of all the chutes will appear at the MINOUT terminal 1037, i.e., MIN finding logic block output terminal.

During program instructions 1D through 26, the minimum distance value in the TOCs of each chute of each piper will appear at the corresponding MINOUT terminal of each piper.

During instruction 27, the control program causes the control signal MIN to become high. MIN high activates gate 1079, thus placing the MIN value presently existing at MINOUT terminal 1036 on the IBUS. The control signal MRC becomes high, thus permitting the value on the IBUS to be copied onto the MINREG register.

During instruction 28, control signal MINR goes high, causing gate 1081 to become conductive, thereby placing the contents of the MINREG register onto the IBUS. Control signal BRC goes high, thereby enabling the BREG register, thus copying the value on the IBUS into the BREG register.

During instruction 29, the program counter "waits" until control signal READY becomes high. Control signal READY high at E3 of the piper logic flow indicates that the brightness generator has caused its BUSY control signal to become low (to be explained in discussion of brightness generator). When control signal READY becomes high, the program counter is incremented to instruction 2A. During instruction 2A, the program counter is incremented to instruction 67. During instruction 67, control signal BUSY is caused to become high. This causes the READY control signal between pipers to be tested low at E5 as long as pipers remain with MIN values to compare.

During instructions 68 through 6E and 2F through 34, the MIN value in each piper is compared with MIN value of a subsequent piper, and the minimum of such two values is returned to each piper and placed in their corresponding MINREG register. The foregoing process is repeated, and the value just determined is compared with the BREG register value of a subsequent piper, and the minimum value therebetween is returned and copied into the MINREG register of the pipers just tested. At the conclusion of the testing of all active pipers, the smallest value of the MIN determined in each piper will appear in the MINREG register of each piper.

During instruction 68, the state of control signal ENABLED is checked. If control signal ENABLED is high, indicating that the input control signals CI1, CI2, and CI3 are high, and the CARRY control signal is low, the program counter increments to instruction 69.

During instruction 69, control signal OUTE is caused to become high. OUTE high causes the line driver 1046 to connect the Data Bus to the output of the BREG register, thus causing the contents of BREG to be copied onto the Data Bus. The BREG register currently contains the MIN value in MINREG.

During instruction 6A, control signal BUSY is caused to become low with effects on control signal READY at E5 as previously described. During instruction 6B, the program counter remains at 6B until control signal DV becomes low, indicating that the other pipers have copied the contents of the Data Bus into their BREG registers (see instruction 2F). During instruction 6C, control signal CARRY is caused to become high. If control signal LAST is also low, control signal COUT becomes high, thus enabling the next succeeding piper when executing its instruction 68 to place the contents of its register BREG on the Data Bus for comparison by the other pipers.

During instruction 6D, control signal OUTE is caused to become low, thus disconnecting the BREG register from the Data Bus.

During instruction 6E, the program counter is decremented to instruction 34. During instruction 34, if the READY control signal is low, indicating that one or more pipers have not finished the comparisons of their MIN values with the MIN values in all of the other pipers, the program counter decrements to 2F. Returning to the discussion of instruction 68, if, during 68, control signal ENABLED is found to be low, the program counter is decremented to instruction 2F.

During instruction 2F, control signal DV is checked. Simultaneously with each check of DV, control signal BUS is caused to become high, thus copying the contents of the Data Bus onto the IBUS. Simultaneously, control signal BRC is caused to become high, which enables register BREG to receive the contents of the IBUS.

During instruction 30, the output of comparator 1082, namely, control signal BRLEMR, is checked. If control signal BRLEMR is low, indicating that the value in register BREG is greater than the value in MINREG, the program counter is incremented to instruction 66. Since the value in BREG, and hence the value on the Data Bus, is greater than the value in the MINREG register, this piper then has potentially the smallest value of all of the pipers in its MINREG register and, thus, must take its turn to put its MIN value on the bus for comparison with the MIN values of other pipers.

During instruction 66, control signal MINR and control signal BRC become high. MINR high causes gate 1081 to become conductive, thus copying the contents of the MINREG register onto the IBUS. BRC high enables the BREG register so that the contents of the IBUS are copied into the BREG register. Instructions 67, 6B, 69, 6A, 6B, 6C, 6D, 7E, and 34 are again executed with this new value of MIN on the Data Bus.

Returning to the discussion of instruction 30, if the output of comparator 1082, namely, control signal BRLEMR, is high, indicating that the value in BREG is equal to or less than the value in register MINREG, the piper replaces its MINREG value with the value in BREG as follows. During instruction 31, control signal BUSY is caused to become low with effects on control signal READY at E5 as previously described. During instruction 32, control signal CARRY is caused to become high and, if control signal LAST is also low, causes ontrol COUT to become high, thus enabling subsequent pipers.

During instruction 34, control signal BR and the control signal MRC are caused to become high. BR high renders gate 1084 conductive, causing the copying of the contents of the BREG register onto the IBUS. MRC high enables the MINREG register to receive the contents of the IBUS. If control signal READY is found to be high, indicating that all of the pipers have finished comparing the contents of the MINREG registers of all of the other pipers and have the minimum MIN value in their MINREG register, the program counter is incremented to instruction 35.

During instruction 35, control signal CARRY is caused to become low which in turn causes control signal COUT to become low, thus disabling any subsequent pipers.

During instruction 36, control signal MNCMD, which is an output of the MINREG register, is checked. Control signal MNCMD low (bit 15 of the MINREG register is high) indicates that the contents of the MINREG register is a command word. The command word in the MINREG register indicates that all data in the chutes has been processed. The program counter is decremented to instruction 05, and the chute refilling process commences. If control signal MNCMD is high, the program counter is incremented to instruction 37.

During instruction 37, control signal BUSY is caused to become high with effects on control signal READY at E6, as previously described.

Instructions 38 through 41 and 73 through 75, in conjunction with the piping logic block, implement the piping method. For a better understanding of the piping logic, reference is made of FIG. 3B containing the logic blocks that implement the steps of the piping method.

The A input of subtracter 1086 is coupled to lines 0-7 of the TOCM bus 1057. As described previously, lines 0-7 of the TOCM bus contain the distance field of the word existing at the presently-indexed TOC. The $\overline{B}$ input of subtracter 1086 is coupled to the $\overline{Q}$ output of the MINREG register. The $\overline{B}$ input and $\overline{Q}$ output, as just described, are used simply to accommodate the hardware mechanization of the subtracter function. The A-B output of subtracter 1086 is coupled to the B input of comparator 1090 and to terminal 1089 of D1 transfer gate 1096.

Coupled to the normal or Q output of the MINREG register is the B input of subtracter 1088. To the C input of subtracter 1088 is coupled the distance field of the pocket register. The B-C output of subtracter 1088 is coupled to terminal 1087 of D2 transfer gate 1094. The D1 transfer gate 1096 and D2 transfer gate 1094 are coupled in series-circuit arrangement, and the common connection point 1104 of said gates is coupled to both the B input of comparator 1092 and to the input side of transfer gate 1098. The B-C output of subtracter 1088 is coupled to the A input of comparator 1090. The $\overline{A<B}$ output of comparator 1090 is coupled to the control electrode of the D1 transfer gate 1096 and to the input of inverter 1091. The output of inverter 1091 is coupled to the control electrode of D2 transfer gate 1094.

The output of the PW register is coupled to the A input of comparator 1092. The $\overline{A<B}$ output of comparator 1092 is coupled to the control electrode of transfer gate 1098 and the input of inverter 1093. The output of inverter 1093 is coupled to the electrode of transfer gate 1100. Coupled to the input of transfer gate 1100 is the Q output of the QS register. The output of transfer gate 1100 is coupled to the Di input of the 9-bit adder 1060. Also coupled to the input D1 adder 1060 is the output of transfer gate 1098. Coupled to adder 1060 is accumulator register DSUM.

Bits 8-14 of the TOCM bus are applied to the A input of comparator 1106 and the input of transfer gate 1114. Bits 8-14 of the pocket memory 1034 are applied to the B input of comparator 1106 and the input of transfer gate 1116. The $\overline{A<B}$ output of comparator 1106 is coupled to input 1107 of decode module 1105. The output of inverter 1091 is coupled to the 1108 input of decoder 1105. The A>B output of comparator 1090 is applied to to the 1109 input of decoder 1105, and the A=B output of the comparator 1090 is coupled to input 1110 of decoder 1105. Output 1111 of decoder 1105 is applied to the control electrode of transfer gate 1116. The output of transfer gate 1116 is applied to the input of 10-bit adder 1062. The output of transfer gate 1114 is also applied to the input of 10-bit adder 1062. The complementary output 1112 of decoder 1105 is coupled to the control electrode of transfer gate 1114. To the adder register 1062 is coupled accumulator register BSUM.

Data from the piping logic block 1038 exists at control program instruction 3D. The value, if any, at the present TOC of the presently-indexed chute is subtracted from the value in the MINREG register in subtracter 1086 thus forming the difference quantity D1 at the subtracter's output, i.e., the A-B output. The value, if any, in the corresponding POC of the presently-indexed chute, is subtracted from the value in the MINREG register in subtracter 1088, thus forming the difference quantity D2 at the subtracter's output, i.e., A-B output. D1 is compared with the value D2 in comparator 1090. If D1 is less than D2, output 1102, i.e., $\overline{A<B}$, of the comparator 1090 becomes high, thereby rendering D1 transfer gate 1096 conductive, thus making available D1 to the B input (1104) of comparator 1092. If D2 is less than D1, output 1102 of comparator 1092 becomes low, thereby rendering D2 transfer gate 1094 conductive, thus making available D2 to the B input 1104 of comparator 1092.

Also coupled to comparator 1090 are bits 15 of the presently-addressed TOC and the corresponding POC. If a command bit, i.e., EOC (see instructions 07-15), is detected in bit 15 of the TOC, comparison of D1 and D2 is bypassed, and D2 is made available to comparator 1092. If a command word is detected in the POC, the comparison of D1 and D2 in comparator 1090 is bypassed, and D1 is made available to comparator 1092. Comparator 1092 compares the value presently appearing at its B input 1104 and the value in the PW register. If the value at the B input 1104 is less than or equal to the value in the PW register, transfer gate 1098 is rendered conductive, thereby copying the value appearing at input 1104 into the 9-bit adder register 1060. If the value appearing at input 1104 is greater than the value in the PW register, transfer gate 1100 is rendered conductive, thereby copying the value in the QS register into adder register 1060 to be added to the value presently existing therein.

The corresponding weighting values are summed in accordance with the selection of D1 and D2. Thus, if D1 is selected for summation in adder register 1060, the 7-bit weighting value Bi in the presently-selected TOC data word is summed with BSUM in 10-bit adder register 1062. If D2 is selected for summation in adder register 1060, the 7-bit weighting value Bi in the selected POC is summed with BSUM in adder register 1062. If D2 and D1 are equal, then the larger of the 7-bit weighting values in the selected TOC and POC data words is summed with BSUM in adder register 1062. This logic is accomplished as follows.

If D1 is less than D2, the inverted output $\overline{A<B}$ of comparator 1090 becomes high, output A=B becomes low and output A>B becomes high. At this time, the status of the comparator 1106 $\overline{A<B}$ output is irrelevant. Decoder 1105 decodes inputs 1108, 1109 and 1110 and causes its outputs 1112 to become high, and output 1111 to become low. Output 1111 low renders gate 1116 nonconductive, and output 1112 high renders gate 1114 conductive, thus connecting the 7-bit weighting value Bi (on the TOCM bus) to the input of register 1062 thereby adding the weighting value Bi to the value in the BSUM register.

If D2 is less than D1, the inverted output $\overline{A<B}$ of comparator 1090 becomes low, the A>B output becomes low and the A=B output becomes low. Again, the comparator 1106 $\overline{A<B}$ output is irrelevant. Decoder 1105 decodes inputs 1108, 1109 and 1110 causing output 1111 to become high, and output 1112 to become low. Output 1112 low renders gate 1114 nonconductive, and output 1111 high renders gate 1116 conductive which connects the 7-bit weighting value (on the POCM bus) to the input of register 1062, thereby adding the POCM weighting value to the contents of the BSUM register.

Coupling to the input 1107 of decoder 1105 is the $\overline{A<B}$ output of comparator 1106. Comparator 1106 compares the weighting value in the TOCM data word with the weighting value in the POCM data word and causes its $\overline{A<B}$ output to become high when the TOCM weighting value is equal to or greater than the POCM weighting value; otherwise, the $\overline{A<B}$ output is low. If D1 equals D2, comparator 1090 inverted output $\overline{A<B}$ becomes high, output $\overline{A>B}$ becomes low, and output A=B becomes high, and if comparator 1106 output $\overline{A<B}$ is high, decoder 1105 decodes inputs 1107, 1108, 1109, and 1110 to cause output 1112 to become high, and output 1111 to become low. Thus, the 7-bit weighting value on the TOCM bus is added to the value in the BSUM register.

If the output $\overline{A<B}$ of comparator 1106 is low, decoder 1105 decodes inputs 1107, 1108, 1109, and 1110 to cause output 1111 to become high, and output 1112 to become low. Thus, the weighting value on the POCM bus is added to the value in the BSUM register.

During instruction 38, the output of NAND gate 1118 (see FIG. 3B) and control signal PTMSB are checked. If control signal PTMSB is high, indicating that either one or both TOC and POC data words of the presently-indexed chute do not contain a command word, the program counter is incremented to instruction 39. If control signal PTMSB is low, indicating that a command word exists in both TOC and POC, the program counter is incremented to instruction 41.

During instructions 39 through 3C, four NO-OP instructions are executed allowing time for the piping logic to select D1, D2 and the associated weighting values according to the logic discussed above.

During instruction 3D, control signal SBC is caused to become high. SBC high enables accumulator register BSUM to receive the new weighting value total from adder register 1062. The new weighting value total presently in the BSUM register is then copied back into adder register 1062 to be added to the next weighting value selected.

During instruction 3E, the control signal POP from subtracter 1086 is checked. Control signal POP is high if the A and B inputs to substracter 1086 are equal; otherwise, POP is low. If control singal POP is high, the program counter is incremented to instruction 73. If control signal POP is low, the program counter is incremented to the next instruction, 3F.

During instruction 73, control signals TOCM, POCM, and PWRT are caused to become high. Control signal TOCM high causes transfer gate 1054 to become conductive causing the value of the TOCM bus to be copied onto the IBUS. Control signal POCM high causes transfer gate 1056 to become high causing the value of the IBUS to be made available to the pocket memory. Control signal PWRT high causes the IBUS value to be copied into the POC that is indexed by the value in CPTR.

During instruction 74, control signal TOCPTRMC (see FIG. 3A) is caused to become high, causing TOCPTR as addressed by CPTR to increment its count by 1 so that the next data word in the chute is indicated as TOC. Also, control signal BRCMD, an output of the BREG register, is checked. If control signal BRCMD is low, indicating that no command exists in the BREG register, the program counter is decremented to instruction 40. If control signal BRCMD is high, indicating that a command exists in the BREG register, the program counter is incremented to instruction 75. Instruction 75 also increments the program counter to instruction 40.

During instruction 40, the value in CPTR is checked. If the value in CPTR is less than 7, the value in register CPTR is incremented by 1 (control signal CPTRC high) so that the contents of CPTR point to the next chute to be filled with data, and the program counter is decremented to instruction 38. If the value in CPTR equals 7, indicating that chutes 0 through 7 have been processed as described above, the program counter is incremented to instruction 41.

During instruction 3F, control signal SDC is caused to become high. Control signal SDC high enables register DSUM 1059 to receive the new difference value total in register 1060. The new difference value total now in the DSUM register is then copied back into register 1060 to be added to the next difference value, D1 or D2, selected.

During instruction 41, control signal BUSY is caused to become low in preparation for piper synchronization instruction 42.

During instruction 42, the status of control signal READY is checked. As long as control signal READY is low, the program counter is not incremented. When control signal READY is detected as being high, the program counters of all pipers are incremented to instruction 43.

During instruction 43, control signals SD and BRC are caused to become high. Control signal SD high causes transfer gate 1120 to become conductive which causes the contents of register DSUM to be copied onto the IBUS. Control signal BRC high enables the BREG register to receive the contents of the IBUS.

During instruction 44, control signal BUSY is caused to become high which causes READY to become low. READY low inhibits the pipers from entering the NMD processing phase at E10 until the last piper to be enabled has finished transferring its DSUM and BSUM values to the brightness generator.

During instruction 45, the status of control signal ENABLED is checked. As long as control signal ENABLED is low, the program counter is not incremented. When control signal ENABLED is detected as being high, the program counter is incremented to instruction 46.

During instruction 46, control signal OUTE is caused to become high, enabling line driver 1046. Enabling line driver 1046 causes the contents of the BREG register (presently DSUM) to be copied onto the Data Bus.

During instruction 47, control signal SDR and SDC are caused to become high. SDR high sets register 1060 to zero. SDC high causes register DSUM to receive the zero contents of the adder register 1060, thus clearing register DSUM.

During instruction 48, the status of control signal DV is checked. As long as control signal DV is high, the program counter is not incremented. When control signal DV is detected as being low, indicating that the brightness generator has received the DSUM value on the Data Bus, the program counter is incremented to instruction 49.

During instruction 49, control signals SB and BRC are caused to become high. Control signal SB high causes transfer gate 1122 to become conductive causing the contents of register BSUM to be copied onto the IBUS.

Control signal BRC high enables the BREG register to receive the contents of the IBUS.

During instruction 4A, a NO-OP instruction is executed. This instruction is needed for timing with the brightness generator.

During instruction 4B, control signal BUSY is caused to become low, thus allowing other pipers to proceed to instruction 4F, if the presently-enabled piper is the last piper enabled in the piper string (see FIG. 6).

During instruction 4C, control signal CARRY is caused to become high. If the present piper is not the last piper in the piper string (see FIG. 6), then CARRY high causes the next piper in the string to be enabled.

During instruction 4D, control signal OUTE is caused to become low, disabling line driver 1046 and disconnecting the output of BREG from the Data Bus.

During instruction 4E, the status of control signal READY is checked. As long as control signal READY is low, the program counter is not incremented. When control signal READY is detected as being high, the program counters of all the pipers are incremented to instruction 4F.

During instruction 4F, control signal CARRY is caused to become low, thus disabling any pipers below the present piper.

During instruction 50, control signal BUSY is caused to become high, causing control signal READY to become low. READY low holds pipers that have completed NMD processing at instruction 63 until all pipers have finished NMD servicing.

During instruction 51, control signal FNDNMD is caused to become high, and the status of control signal NMD, issued from the priority encoder 1040, is checked. Control signal FNDNMD high causes the priority encoder 1040 to check all TOCs for the presence of an NMD command. If one or more NMD commands are detected, the priority encoder 1040 causes control signal NMD to become high, and causes the value in CPTR to assume the highest chute number of one or more chutes containing NMD commands. If no NMD commands exist, the priority encoder 1040 causes the value in CPTR to become zero. If control signal NMD is high, indicating that an NMD command exists in the chute specified by the value placed in CPTR by the priority encoder 1040, the program counter increments to instruction 52. If control signal NMD is low, indicating that no NMD command exists in any chute, the program counter is incremented to instruction 60.

During instruction 52, control signals TOCM and BRC are caused to become high. Control signal TOCM high causes transfer gate 1054 to become high, thus causing the value on the TOCM bus to be copied onto the IBUS. Control signal BRC high enables BREG to receive the contents of the IBUS.

During instruction 53, the status of control signal ENABLED is checked. As long as control signal ENABLED is low, the program counter is not incremented. When control signal ENABLED is detected as being high, the program counter is incremented to instruction 54.

During instruction 54, control signal OUTE is caused to become high. Control signal OUTE high enables line driver 1046 which causes the contents of BREG, presently an NMD command, to be copied onto the Data Bus.

During instruction 55, control signal TOCPTRMR is caused to become high. TOCPTRMR high clears the CPTR-indexed TOC pointer register TOCPTR 1032 to zero in preparation for new data to be loaded into the particular chute presently indexed.

The above function is controlled by TOCPTR clearing logic block 1130 (see FIG. 3A). There is one logic block 1130 per chute. The logic block includes dual input OR gate 1050 and dual input AND gate 1131. The output of the OR gate is coupled to the Reset terminal R of TOCPTR 1032. One input of OR gate 1050 is control signal TOCPTRR which can directly reset all the TOCPTR registers. The other input of the OR gate is coupled to the output of AND gate 1131. One input of the AND gate is coupled to the TOCPTRMR control signal while the other input of the AND gate is coupled to the priority encoder output assigned to the chute for which the particular logic block 1130 is assigned. Thus, coincidence of a TOCPTRMR control signal on and the signal at the priority encoder output assigned to each chute, for example, output 7 for chute number 7 (see FIG. 3A), causes the corresponding TOCPTR to be reset. The priority encoder output assigned to each chute is indexed by CPTR.

During instruction 56, the status of control signal DV is checked. As long as control signal DV is high, the program counter is not incremented. When control signal DV is detected as being low, indicating that the microcomputer 1010 has received the NMD command jsut copied onto the Data Bus, the program counter is incremented to instruction 57.

During instruction 57, control signal OUTE is caused to become low. Control signal OUTE low disables line driver 1046, thus disconnecting BREG from the Data Bus.

During instruction 58, the status of control signal DV is checked, while simultaneously control signal CTS is caused to become low, and control signals BUS and BRC are caused to become high. Control signal CTS low causes the microcomputer 1010 to place a data word on the Data Bus in response to an NMD command. Control signal BUS high causes gate 1048 to become conductive, thus causing the contents of the Data Bus to be copied onto the IBUS. Control signal BRC high enables BREG to receive the contents of the IBUS. When control signal DV is detected as being low, indicating that the microcomputer 1010 has valid data on the Data Bus, control signals BR, TOCM, and CWRT are caused to become high. Control signal BR high causes transfer gate 1084 to become conductive, thus causing the contents of BREG to be copied onto the IBUS. Control signal TOCM high causes gate 1054 to become conductive, thus causing the contents of the IBUS to be copied onto the TOCM bus. Control signal CWRT high enables the chute, as selected by the value in CPTR (see FIG. 3A), to receive the data contained on the TOCM bus. Also, on detection of control signal DV low, the program counter is incremented to instruction 59.

During instruction 59, control signal BRCMD, issued by the BREG register, is checked. If control signal BRCMD is low, indicating that register BREG does not contain a command, the program counter is decremented to instruction 58, and instruction 58 is repeated. Simultaneously with the checking of control signal BRCMD, control signal TOCPTRMC is caused to become high. Control signal TOCPTRMC high increments the CPTR-selected TOCPTR pointer register by 1 (see FIG. 3A). If control signal BRCMD is detected as being high, the program counter is incremented to instruction 5A.

During instruction 5A, control signal TOCPTRMR is caused to become high. TOCPTRMR high clears the CPTR-selected TOCPTR register.

During instruction 5B, the program counter is decremented to instruction 51.

During instruction 60, control signal BUSY is caused to become low in preparation for piper synchronization at E11.

During instruction 61, control signal CARRY is caused to become high to enable the next piper, if any, to process NMD commands.

During instruction 62, control signals SBR and SBC are caused to become high. Control signal SBR high causes the contents of register 1062 to be cleared to zero. Control signals SBC high causes register BSUM to receive the contents of the register 1062, thus clearing register BSUM.

During instruction 63, the status of control signal READY is checked. As long as control signal READY is low, the program counter is not incremented. When control signal READY is detected as being high, the program counters of all pipers are incremented to instruction 64.

During instruction 64, control signal CARRY is caused to become low to disable subsequent pipers in preparation for another minimum MIN determination.

During instruction 65, control signals MIN and MRC are caused to become high. Control signal MIN high causes gate 1079 to become conductive allowing the value MIN at output 1037 to be copied onto the IBUS. Control signal MRC high enables the MINREG register to receive the contents of the IBUS.

III. BRIGHTNESS GENERATOR MODULE a. General Description

The brightness generator module 1018 (see FIG. 1) of the data processing means 1012 implements the criterion value calculation portion of the piping method. The brightness generator calculates a criterion value called "brightness" B for each data base entry against which a query is piped, and returns the largest brightness value computed to microcomputer 1010. Brightness is the final normalized value that is a measure of the degree of match between a query and an entry.

The brightness generator utilizes both summation data provided by its associated pipers, i.e., the sum-of-difference values DSUM and the associated sum-of-weighting values BSUM from each piper, and certain variables (to be explained later) supplied by the microcomputer 1010 in order to solve a brightness equation. The brightness generator includes registers, a head-only memory and logic blocks (to be explained later) that execute the solution of a brightness equation as well as piper control, determination of an exact match condition, and internal brightness generator control.

A brightness calculation logic block (FIG. 10A) calculates a brightness B based upon piper-supplied DSUM and BSUM data. The exact logic block (FIG. 10C) detects when certain parameters of a query/entry pair indicate an exact match, i.e., a brightness equal 1. The brightness generator control logic block 1134 (see FIG. 12) decodes the internal Read-Only Memory ROM 1147 contained brightness generator program control instructions and issues control signals to the various brightness generator logic blocks in accordance with the control program and an external clock. In addition the brightness generator controls the data flow to and from the pipers and synchronizes piper activity in response to control signals from microcomputer 1010.

1. BRIGHTNESS CALCULATION

The brightness calculation is accomplished by a logic block 1132 that calculates a brightness value for each DSUM and BSUM received from the pipers. The logic block (see FIG. 10A) includes an 8-word by 8-bit multiplier 1168, a 6-bit shift register 1169, an exponent register EXP 1171, table lookup ROM 1184, and an intermediate adder register 1179 required for exponent manipulation. The brightness calculation is stored in a register BOLD 1200 (FIG. 10A) at the end of each piping cycle. At the completion of a piping cycle, the value in BOLD, along with the associated position value stored in a register POS 1202 (see FIG. 10B) is transferred to external microcomputer 1010. The value in BOLD represents the largest value of brightness calculated for a particular entry, the POS contains the position of the query relative to the entry at which such highest brightness was obtained.

2. BRIGHTNESS EQUATION

The brightness generator logic block 1132 solves the following brightness equation:

$$B = (QS(QS-M) - SSD)(M+SSB)(LCF)/QS^3$$

or $$B = (WR1 - SSD)(M + SSB)(WR2)$$

where:
- QS = query size;
- ES = entry size;
- M = the number of events in the query for which at least one corresponding event type is not found in the entry;
- SSD = the sum of DSUM's supplied by all active pipers;
- WR1 = QS(QS−M)
- WR2 = LCF/QS$^3$
- SSB = the sum of BSUM supplied by all active pipers;
- LCF = length correction factor equal to [MIN(QS,ES)]/[MAX(QS,ES)]

3. BRIGHTNESS CALCULATION MATHEMATICAL OPERATIONS

The following describes the number of word formats used in the brightness calculation, the transformation required between formats, and the basic sequence of operation used to multiply numbers. Because of the range of values encountered in solving the brightness equation, and the finite number of bit positions available to hold a given number, numbers within the brightness generator are represented in both fixed point and floating point formats. Fixed point format is used for all addition and subtraction operations and for multiplication where the product will not exceed 16 significant bits (i.e., 16-bit accuracy will be retained). A normalized floating point format with an 8-bit mantissa is used for the potentially small quantities such as 1/QS$^3$ in order to retain 8 significant bits, and for multiplications where the result cannot be contained in 16 bits.

FIXED POINT FORMAT

There are three fixed point formats. FIG. 7A shows a fixed point format where the binary point position is to the right of the 0 bit position. This format is used for the quantities QS, ES, MIN, WR1-SSD, M and POS.

Figure 7B:
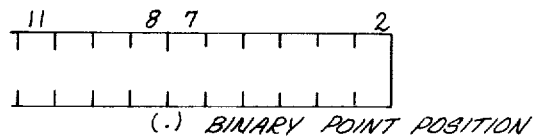

FIG. 7B shows a fixed point format wherein the binary point position is between the 7th and 8th bit positions. This format is used for BSUM only.

FIG. 7C shows a fixed point format wherein the binary point position is between the 13th and 14th bit positions. This format is used for the brightness value.

FLOATING POINT FORMAT

Figure 7D:
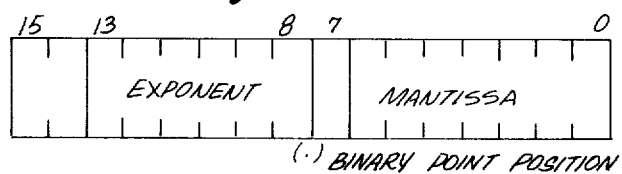

FIG. 7D shows a floating point format wherein the binary point position is between the 7th and 8th bit positions. This format uses the standard notation of fractional mantissa and associated exponent to the base 2 that properly locates the binary point. All floating point numbers are "normalized", meaning that the MSB of the mantissa is adjusted so as to occupy bit position 7, the first bit position to the right of the assumed binary point. The exponent is an unsigned binary number with a range of +31 to −32 in 2's complement notation.

4. FIXED AND FLOATING POINT TRANSFERS AND TRANSFORMATIONS

Figure 7E:
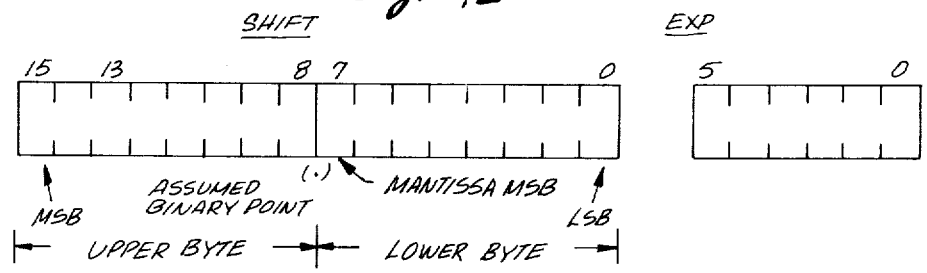

A shift register, SHIFT, 1169 in conjunction with exponent register EXP 1171 is used to transform fixed point numbers into normalized floating point format, normalize products of floating point multiplications, and to convert floating point products to fixed point format. The register SHIFT 1169 (see FIGS. 10A and 10B) has the capability to shift the bits contained therein to the left or right. Numbers shifted to the left add zeros at the least significant bit LSB (rightmost) bit position. Numbers shifted to the right add zeros at the most significant bit MSB (leftmost) bit position, and lose any bits shifted out of a register at the LSB position. FIG. 7E shows a representation of the words used in the SHIFT and EXP registers. The format shown in FIG. 7E is the assumed format when a floating point number is stored in SHIFT 1169. For fixed point numbers, the binary point is assumed to be to the far right of bit zero, and the value in EXP is set to zero. After a floating point product or fixed point number to be normalized is placed in SHIFT, the shift logic checks to see if the upper byte equals zero. If it does not, the logic shifts all bits in SHIFT simultaneously to the right, one bit position at a time, until the upper byte equals zero. This will result in bit position 7 containing a binary 1, the requisite for normalization to retain the magnitude of the number. Each right shift also causes the quantity in EXP to be increased by 1, i.e., an 8-bit shift right adds 8 to the value in EXP. If the upper byte is initially zero, the logic checks to see if there is a 1 bit at bit position 7. If not, and the lower byte is not zero, it shifts the existing bits simultaneously left, one bit position at a time, until bit position 7 contains a binary 1, thus normalizing the number. Each left shift also causes the quantity in EXP to be decreased by 1, i.e., a 7-bit shift left adds −7 to the value in EXP.

When a floating point number is transferred from another register into SHIFT, the value in the lower byte of the register (mantissa) is placed in the lower byte of SHIFT, and the value in the upper byte of the register (exponent) is added algebraically to EXP. In a fixed point transfer into SHIFT, the upper and lower byte values in the register are placed in the upper and lower bytes of SHIFT, respectively, and EXP is set to zero.

When a floating point number is transferred from SHIFT to another register, the value in the lower byte of SHIFT is placed in the lower byte of the receiving register, and the value in EXP is placed in the upper byte of the receiving register. When a fixed point number is transferred from SHIFT to another register, the values in the upper and lower bytes of SHIFT are transferred to the upper and lower bytes, respectively, of the receiving register.

5. FIXED AND FLOATING POINT MULTIPLICATION

The registers involved in multiplication are shown in FIG. 8. MULT 1168 is an 8 times 8 bit multiplier whose combinatorial output, A*B, reflects the stabilized product of inputs A and B three clock cycles following any change in A or B. Note that MULT handles the quantities A and B as whole numbers. The proper binary point placement for floating point multipliers is automatically tracked by algebraically adding the floating point exponents in EXP, along with fixed quantity adjustments for binary point offsets when required. The lower 8 bits of SHIFT are used as input A to MULT. The following steps describe the techniques for multiplying two numbers:

1. EXP is cleared (initialized to zero by a high control signal EXR).

2. The first number is placed in SHIFT and normalized, if required. If the number is in fixed point format, and a fixed-to-floating point transformation is specified, +8 is added to EXP to preserve the original binary point relationship (except for a quantity (M+SSB), since BSUMs are received with their binary points properly located for transfer to SHIFT (see FIGS. 7A–E). If the number is in floating point format, the exponent associated with the number is added to EXP.

3. The first number is transferred from SHIFT to the multiplicand register, MPC 1204.

4. The second number is placed in SHIFT and normalized, if required. If the number is in fixed point format, and a fixed-to-floating point transformation is specified, +8 is added to EXP to preserve the original binary point relationship (except for a quantity (M+SSB), since BSUMs are received with their binary points properly located for transfer to SHIFT (see FIGS. 7A–E). If the number is in flaoting point format, the exponent associated with the number is added to EXP.

5. After three or more clock cycles have passed, the stabilized product of A and B is transferred from MULT to SHIFT, and normalized, if required. If the product is a floating point mantissa, −8 is added to EXP to preserve the original binary point relationship.

6. The product is transferred from SHIFT to a designated register after transformation to fixed or floating point format, as required. The value in EXP is also transferred to the exponent field if the number transferred is in floating point format.

6. BRIGHTNESS GENERATOR CONTROL SIGNALS

For a better overall understanding of the operation of the brightness generator, reference should be made to Table 8 containing a description of the control signals influenced by the operation of the brightness generator.

The brightness generator initiates each data exchange between the microcomputer 1010 and the pipers 1016-1 through 1016-16 (see FIG. 1) by setting a control signal ENT (see FIG. 12) on and waiting for an ENR on response from the microcomputer. If the pipers are expecting data (discussed in the Piper Description), the brightness generator generates a CTS on signal (after receiving ENR on). Upon receipt of an answering DV on signal, the piper and brightness generator copy data from the Data Bus. Each succeeding transfer in a series of data transfers is initiated by a CTS on signal from the pipers until all data transfers have been made. At such time that the pipers provide data to the microcomputer, the brightness generator or pipers place such data on the Data Bus and the brightness generator generates a DV on signal to cause the data from the Data Bus to be copied into the microcomputer.

The brightness generator controls and synchronizes the piper functioning through the use of control signals RESET GO, DV, and the READY signals as follows:

RESET

The brightness generator turns control signal RESET on for at least two instruction cycles each time the brightness generator receives a POR (Power On Reset) on signal; when the brightness generator detects an EOF command in place of ES and M data; and if the value in register 1206 (see FIG. 10B) equals EOF or the brightness value in register BOLD equals 1. The microcomputer puts an EOF command word on the Data Bus whenever the brightness generator is waiting for the ES and M data to reset the pipers and initiate a new piping cycle. CMIN 1206 contains an EOF command whenever the pipers have piped the current query against all of the entries in the stored data base, i.e., the entry file, and a piper reset is required for them to obtain the next query for processing against the entry file. BOLD equals 1 indicates that the pipers have found a query that is an exact match for the current entry so no more piping against the current data base file is required. If the value in CMIN is not an EOF and BOLD is less than 1, then more entries in the current entry file remain to be piped against the query presently held in the pipers, so no reset is required of the pipers.

GO

The brightness generator uses the control signal GO to control those external data transfers that the pipers must implement sequentially, i.e., chute filling, placing MIN values on the Data Bus, transferring DSUM and BSUM piping results to the brightness generator, transferring NMD commands to the microcomputer, and transferring chute-refilling data to the pipers. For each of the above-described functions, the pipers are ENABLED beginning with piper number 1. Enabling of the remaining pipers is accomplished by the GO signal in conjunction with one or more individual piper COUT signals that are connected in a "look-ahead-carry-enabling circuit" (see FIG. 6). Such a circuit was described under the detailed description of the pipers.

READY (BUSY ON/OFF)

The brightness generator uses the READY control signal to cause the pipers to perform incremental microinstruction sequences in step with the corresponding brightness generator control program. The brightness generator synchronizes the piper functioning by use of its BUSY on (READY off) and the BUSY off (READY on) microinstructions; while it calculates WR2; terminates the chute-filling data transfers between microcomputer 1010 and the pipers; controls the NMD commands and chute-refill data transfers between the microcomputer and the pipers; and calculates the final brightness and the transmittal of such results to the microcomputer. Thus, all pipers commence each processing phase at the same control program instruction that initiates each processing phase. To this end, any BUSY on turns READY off, and the instructions issued by the control program in each piper are those issued between their corresponding READY on instruction. Between the READY on instructions, instruction control in each piper proceeds to the next READY on instruction where piper array resynchronization is achieved. When READY again goes on (all BUSYs off), instruction control in each piper starts exactly at the beginning of the next instruction sequence.

DV

The brightness generator control program generates a DV on (DV low) signal to cause the brightness generator to read piper-provided MIN, DSUM, and BSUM values from the Data Bus, and to signal the microcomputer 1010 to read NMD values from the Data Bus. These DV signals also indicate that the piper-provided values have been read.

7. EXACT CONDITION DETERMINATION LOGIC BLOCK

The exact condition determination logic block consists of combinational logic utilizing the contents of data registers QS 1208, ASB 1210, and M 1212, and registers DDA 1214 (see FIG. 10C), BDA 1216, DZ 1218, and EQE 1220 as inputs. At the completion of SSD and SSB processing (to be explained later), the output of the logic block indicates whether or not the entry and the query are exact matches (i.e., brightness equal to 1). If the exact condition is true, the brightness value (1.0) and associated position is transferred to the microcomputer, and an exit is taken from the brightness determination processing. The following is the logic equation for the exact condition. See FIG. 10C for logic block mechanization of the EXACT equation where:

EXACT = ((QS − ASB = 0) OR BDA = 1)

AND ((DZ = on AND MZ = on) OR DDA = 1)

AND EQE = on

QS − ASB = 0 indicates that all weighting values = 1.0

BDA = 1 indicates that weighting values are to be ignored;

DZ = on AND MZ = on indicates that SSD = 0 and there are no missing events (M);

DDA = 1 indicates that SSD and M are to be ignored;

EQE = on indicates that QS equals ES.

8. BRIGHTNESS GENERATOR MODULE OPERATIONAL SUMMARY

Figure 9:
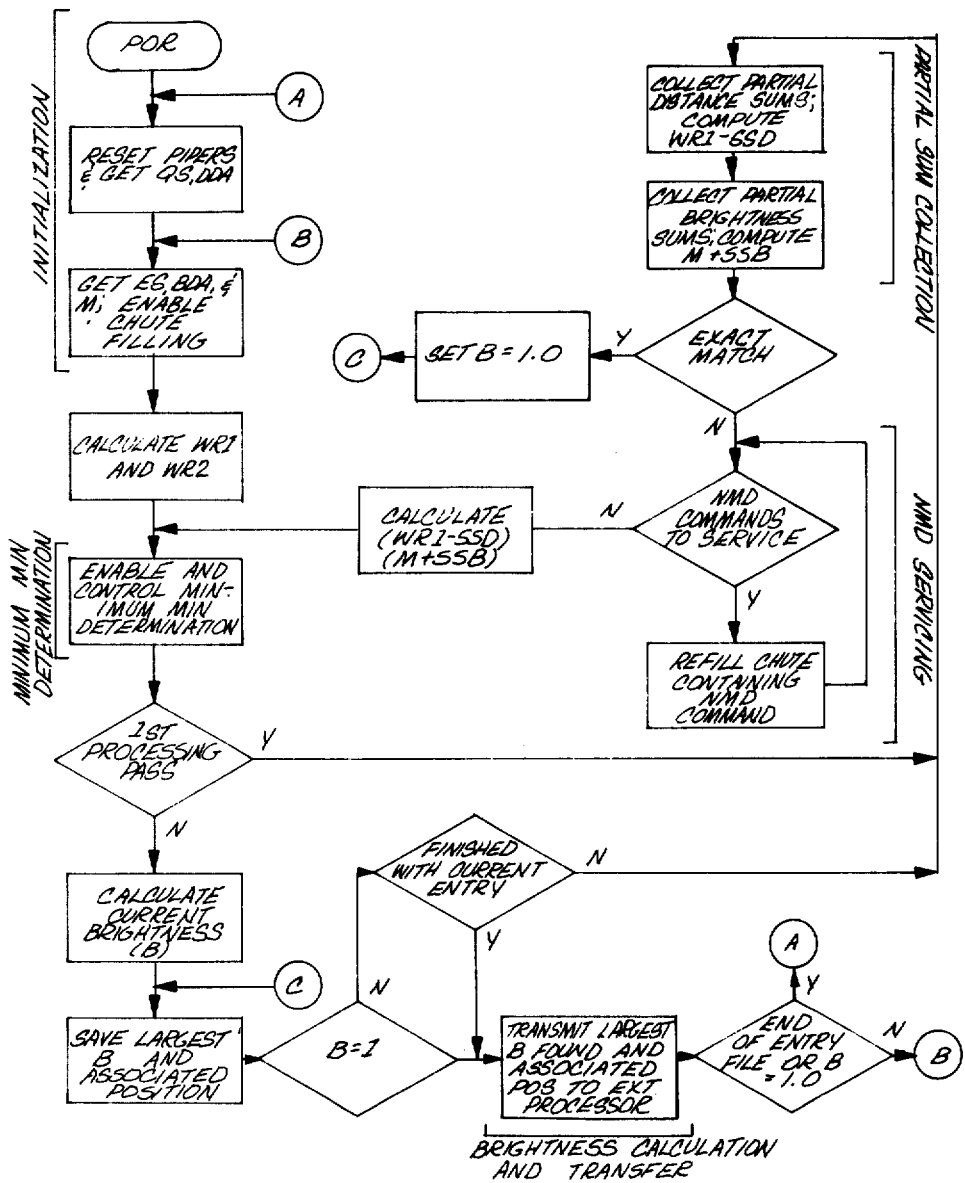
FIG. 9 is a flow diagram illustrating the operation of the brightness generator module of FIG. 1.

Referring now to FIG. 9, there is shown a flow chart of the operational flow of the brightness generator. Briefly, the brightness generator module executes five processing phases, namely, initialization, minimum MIN determination, SSD and SSB collection, NMD servicing, and brightness calculation and transfer.

INITIALIZATION

During initialization, the brightness generator resets the pipers and communicates with the microcomputer 1010 to receive query size, entry size, the number of missing events M, and the DDA (Distance DisAble) and BDA (Brightness DisAble) flags required for the next piping cycle (new query and new entry). The brightness generator enables the pipers to begin chute filling. Concurrent with the pipers filling the chutes, the brightness generator calculates WR1 and WR2 (see discussion of Brightness Equation).

MINIMUM MIN DETERMINATION

During the minimum MIN determination, the brightness generator controls the sunchronization of the pipers and Data Bus access until all piper MIN values have been compared, and the smallest value thus found is stored in each piper's MINREG register and in the brightness generator CMIN register (see FIG. 10B).

SSD AND SSB COLLECTION

The brightness generator checks for the first processing pass for a new QS and ES. If it is the first pass, final brightness calculation processing is bypassed, and the SSD, the sum of all piper DSUMs, and SSB, the sum of all piper BSUMs, collection phase is begun. The brightness generator commences SSD and SSB collection by enabling each piper in turn to place its DSUM and BSUM on the Data Bus. As the DSUMs are collected, the brightness generator subtracts sequentially from WR1 as follows:

WR1 − DSUM1 − DSUM2 − ... − DSUMN.

N = the number of the last active paper. This calculation computes the term WR1 − SSD directly. Similarly, the BSUMs are collected and summed sequentially with M as follows:

M + BSUM1 + BSUM2 + ... + BSUMN.

This calculation computes the term M + SSB directly. This term is also the second term of the brightness equation. The brightness generator detects at this point if the query and entry are an exact match, i.e., brightness equal to 1. If brightness equals 1, control signal EXACT becomes high (true) indicating that the entry and query are identical. Thus, if the EXACT is high, brightness equals 1 at the query/entry position indicated in LMIN 1222 (see FIG. 10B) (to be later explained), and no more calculations need be performed for the current entry/query pair. The brightness generator sets B equal to 1 and exits from the brightness calculation instruction sequence. If EXACT is low (false), the brightness generator continues with normal data processing. At the end of this data processing phase, one pass through the TOC of all active pipers is completed.

NMD SERVICING

In preparation for the next pass, the brightness generator checks all pipers to see if more data must be loaded into any of the chutes, i.e., one or more pipers have NMD commands in one or more TOCs. Upon indication that the pipers have NMD commands to be serviced, the brightness generator is coupled to the microcomputer 1010 and enables the pipers to transmit their NMD commands to the microcomputer and receive chute refill data from the microcomputer.

After all NMD commands have been serviced, the first two terms of the brightness equation are multiplied, i.e., (WR1 − SSD) is multiplied with (M + SSB), and processing control returns to the minimum MIN determination phase to prepare for a subsequent TOC processing pass.

If this is not the first time through the brightness generator processing for the present QS/ES pair, the brightness previously calculated is multiplied by the quantity WR2. The resulting brightness value is then compared with the value calculated on the previous processing pass, if any, for this entry, and the larger of the two brightnesses is stored, in BOLD, and the associated positional value (position equals the MIN value now in LMIN) associated with the collected SSD and SSB values from which the present highest brightness was derived is stored in POS 1202.

BRIGHTNESS CALCULATION AND TRANSFER

A check is now made to determine if all the chute data for every entry being pipes has been processed (i.e., if CMIN 1206 contains a command word), and thus the value is the largest brightness found. If so, this brightness value and associated position of best degree of match between the query and the entry are sent to the microcomputer. Otherwise, processing control returns to the collection of DSUM and BSUM associated with the next position of the query relative to the entry.

Subsequent to the highest brightness and associated position of best match of a query relative to an entry have been sent to the microcomputer, the brightness generator determines if the entry just piped was the last entry in the entry file, or if the brightness equals 1. If the last entry was the last in the entry file (CMIN equals EOF), processing control returns to the initialization phase to receive the QS and ES for a new query and entry. If it is not the last entry in the entry file, but the brightness was equal to 1, processing control in the brightness generator also is returned to the initialization phase. If it is not the end of an entry file and the brightness does not equal 1, the brightness generator control program initiates the pipers to receive a new ES and associated data for piping against the same query.

9. BRIGHTNESS GENERATOR MODULE OVERVIEW

Figure 10A:
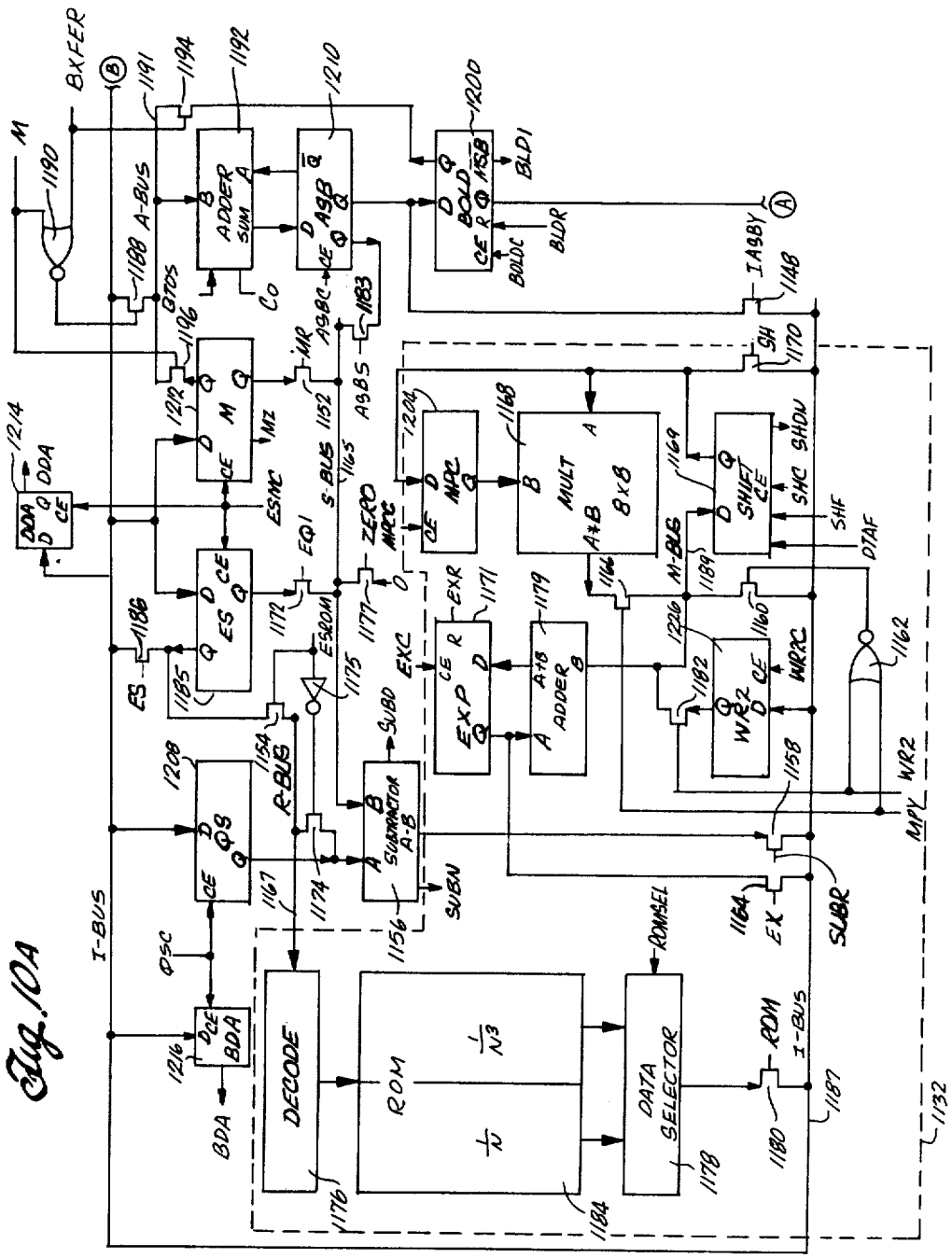
Figure 11C:
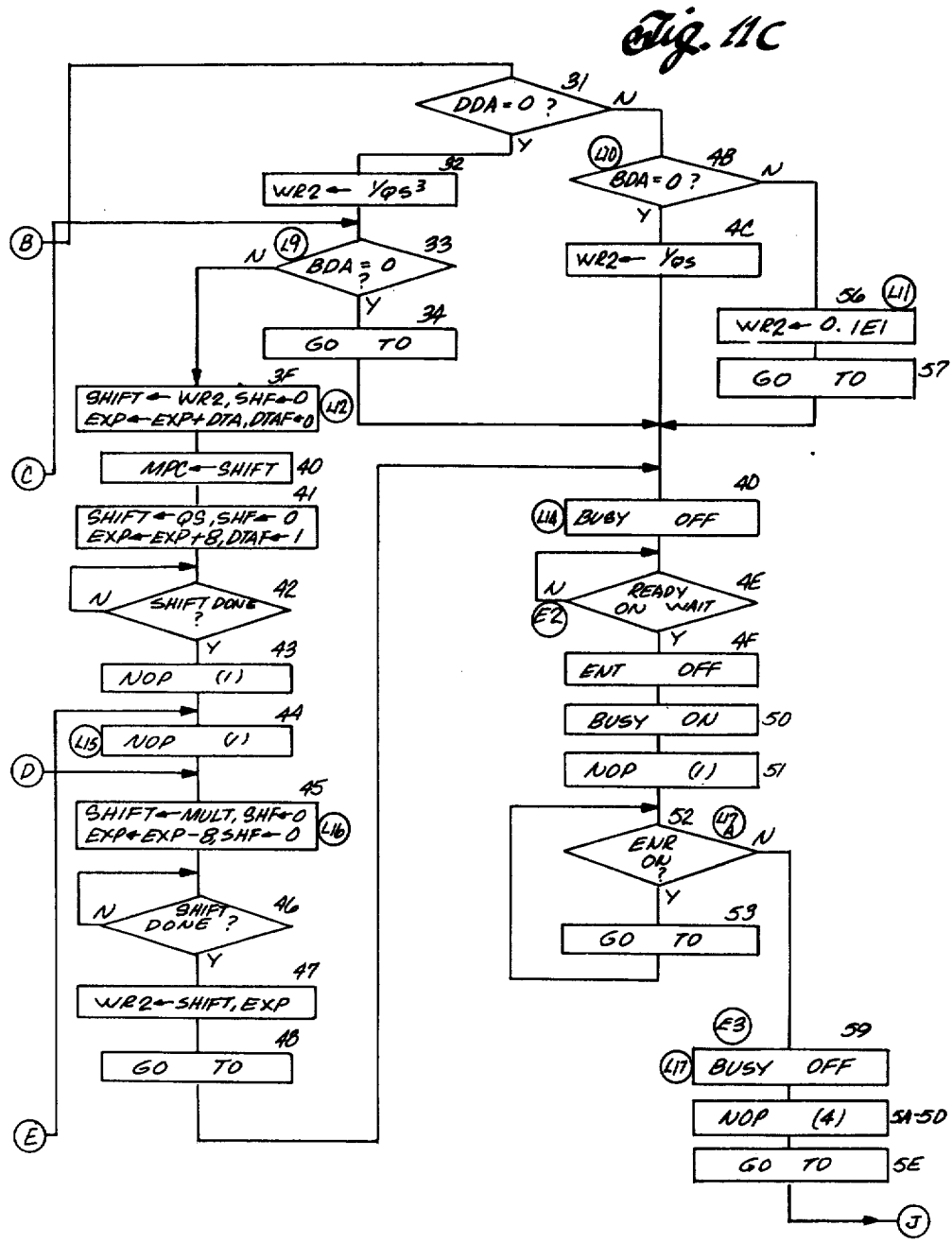
Figure 11D:
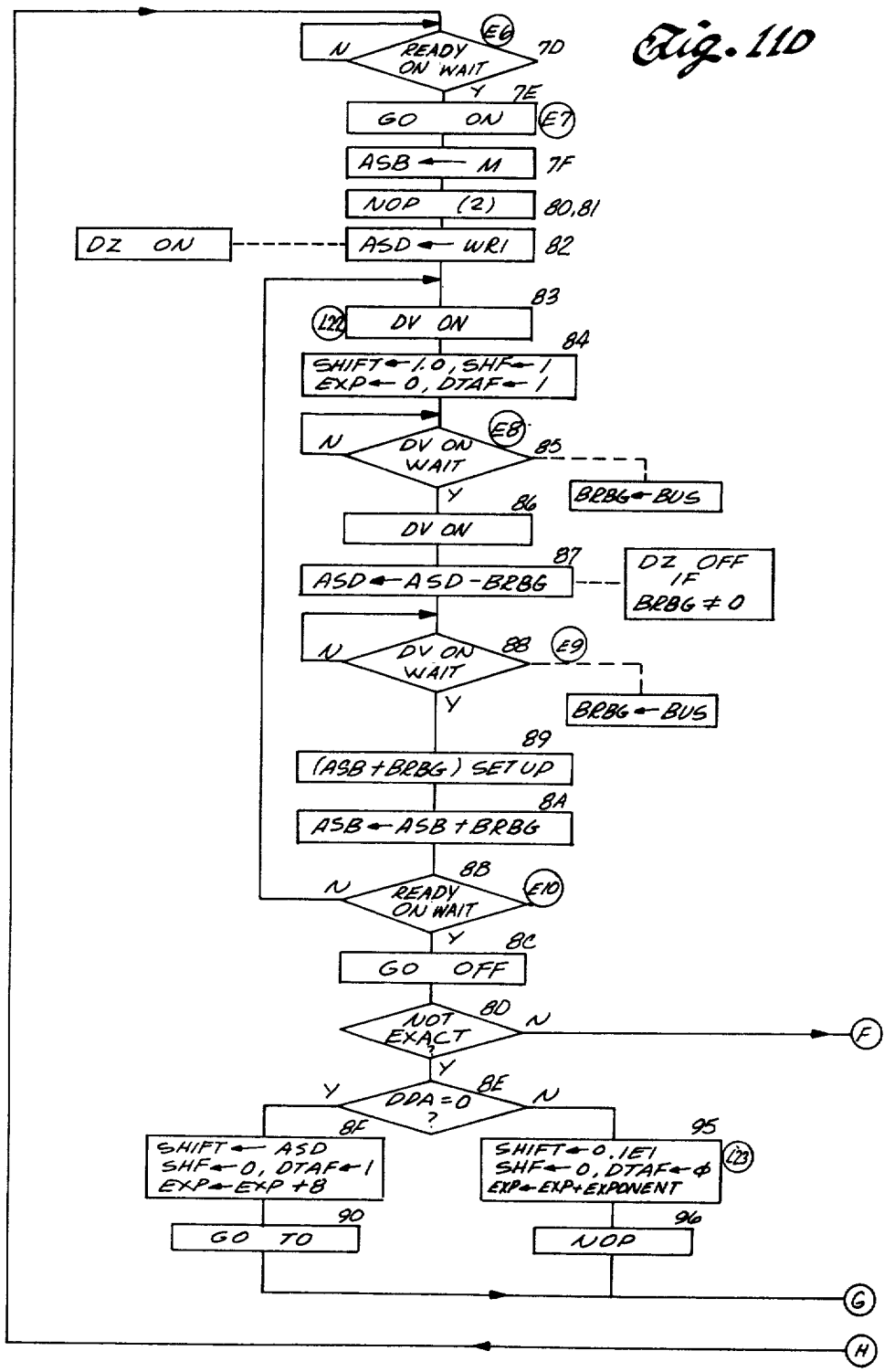
Figure 11F:
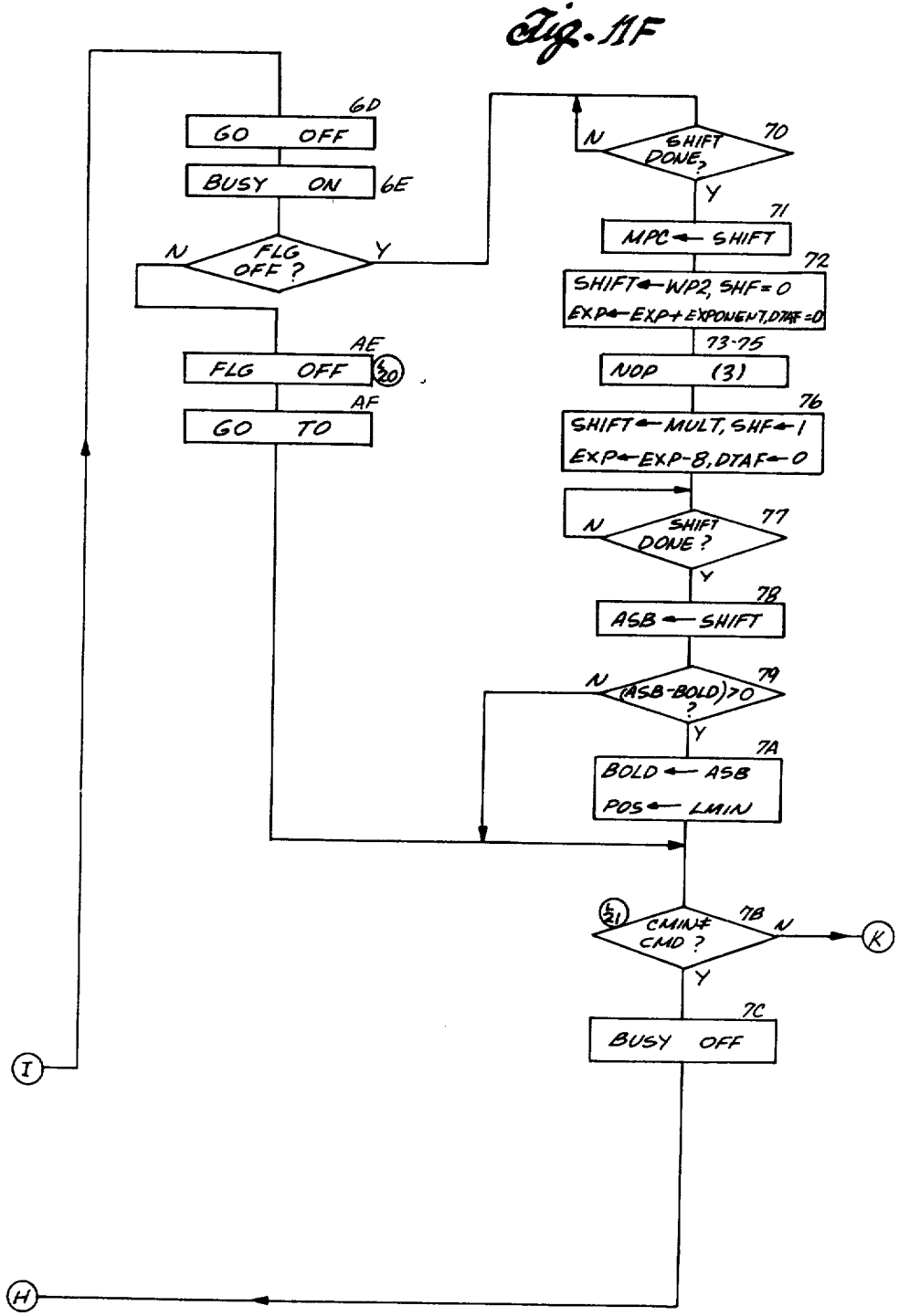

Prior to a detailed discussion of the brightness generator in terms of the instruction sequence and effect on the brightness generator hardware components, a more general operational overview utilizing the block diagram of FIGS. 10A and 10B and flow diagrams of FIGS. 11A through 11F is appropriate. The brightness generator control signal instructions referred to in the following sections are stored in ROM 1147 of the brightness generator program controller 1140 (see FIG. 12). It should be noted that the numbers (not encircled) adjacent the function blocks shown in FIG. 11A through FIG. 11F refer to the instruction number executed by such function block. See Table 6 for the brightness generator instruction numbers and corresponding instruction. Reference should also be made to Table 3 for the definition of the control signals and functions thereof referred to below.

As discussed, the brightness generator executes five independent operational functions. Each of the functions are briefly discussed below with reference to the flow charts shown in FIGS. 11A through 11F.

INITIALIZATION

The initialization phase is executed during brightness generator control program instructions 00-0C and 2B-2D, see Table 6. Upon receipt of a Power On Reset POR on signal from the microcomputer 1010, brightness generator program control returns to the POR function block (see FIG. 11A) where the program counter is set to zero, RESET is turned on to reset the pipers, OUTE is turned off to disconnect the bus output, and ENT is turned off to terminate any communication with the external processor. Next, GO is turned off to lock out piper enabling, and program control proceeds to instruction 00.

Non-POR initialization processing begins at instruction 01 after a complete entry file has been piped, an exact match has been found, or the microcomputer 1010 has initiated a reset by sending an EOF command in place of ES and DDA data. At location L2, the brightness generator control program generates three RESET on signals to reset the pipers. The control program then turns BUSY off to release the READY line, sets FLG (see FIG. 10C) to indicate an initial chute processing pass for a new piping cycle, and clears the final brightness register, BOLD, to receive new brightness values. The control program turns ENT on to couple to the microcomputer so that the pipers can receive a new QS and ES pair and associated chute data. An ENR on is received from the microcomputer to establish such coupling with the microcomputer. Then, on each instruction cycle at location E1, the control program generates a CTS on signal to indicate that it is ready to receive QS and BDA data, transfers existing Data Bus data to register BRBG 1224 (see FIG. 10B), and checks for a DV on signal from the microcomputer. When the signal is detected, indicating that the microcomputer has QS and BDA data on the Data Bus; the control program, having transferred the data from the Data Bus to BRBG as it detected the DV on, takes the YES branch from instruction E1 and transfers the data from BRBG into register QS 1208, see FIG. 10A, and one-bit flag register BDA. At the next DV on wait instruction at location L4, the control program generates another CTS on signal to indicate that it is ready for ES, DDA, and M data, and transfers bus contents and checks for a DV on. When DV on is received, indicating that the requested data is now on the Data Bus (and now also in BRBG), the control program checks for an EOF command in BRBG. If an EOF is detected, indicating that the microcomputer is forcing a reset of the piping array, the control program turns ENT off to initiate a microcomputer disconnect. When an ENR off is received from the microcomputer, indicating that the disconnect is complete, processing control returns to location L2 to initiate a new piping cycle.

If BRBG does not contain an EOF, the control program: turns GO on to enable the pipers to begin chute filling; transfers the ES data to register ES; transfers DOA data to one-bit flag register DDA; and transfers the M data to register M.

The brightness generator uses the remaining chute filling time to calculate WR1 and WR2. First, the control program clears EXP (sets the contents of EXP to zero), then calculates QS-M and multiplies the result by QS to obtain WR1. The control program then turns BUSY on to prevent the pipers from advancing beyond the piper and the brightness generator synchronization point at location E2 in case their chute filling is complete before the brightness generator has completed its task, and stores the calculated quantity in register WR1.

The control program now calculates WR2 as follows: The control program causes QS and ES to be compared in subtractor 1156. If ES=QS, the SUB0 output of subtracter 1156 is set to zero. The output SUB0 is coupled to the brightness generator program controller logic block 1140 (see FIG. 12), and as a result, flag EQE is caused to become on (high), otherwise, EQE is caused to become off (low).

As shown in Table 5, the control program calculates one of 12 quantities determined by the status of flags DDA and BDA and the result of the comparison. The resultant quantity, calculated in accordance with the brightness equation, is placed in register WR2 1226 (see FIG. 10A). The control program then turns BUSY off to release the pipers for their next processing sequence (locations E2 to E3), and the brightness generator enters the READY on wait state at location E2 to await resynchronization with the pipers (all piper BUSYs off).

When the READY on is received by the brightness generator, the control program initiates a decouple from the microcomputer (since all piper chutes are now filled and the pipers require use of the Data Bus during minimum MIM determination), turn BUSY on to hold the pipers at instruction E3 until the decouple is complete, and waits for a responding ENR off from the microcomputer. When the ENR off is received, completing the decouple, the control program turns BUSY off to release the pipers to begin minimum MIN determination. The control program causes the transfer of the contents of CMIN into LMIN. This last instruction is excecuted on the first processing pass for timing reasons only; the instruction's purpose on passes 2 and beyond is described in the section on NMD command servicing. The control program next commences minimum MIN determination processing.

MINIMUM MIN DETERMINATION

The minimum MIN determination phase is executed during instructions 65-6C. Between locations E3 and E4, a currently-enabled piper will have placed its MIN value on the Data Bus, and the other pipers (not enabled) will be waiting at location E4 to compare their MIN value to the value on the Data Bus. The brightness generator control program generates a DV on signal to initiate these comparisons, and then tests for the presence of its own DV on signal while simultaneously transferring existing Data Bus data to BRBG 1224. When the brightness generator detects its DV signal on, the control program causes the transfer of the enabled piper's MIN value, already in BRBG 1224 to CMIN 1206, see FIG. 10B. The output Q of BRBG 1224 is coupled to the data input D of register CMIN 1206. Control signal LMINC is coupled to the Chip Enable CE input of CMIN. Transfer of data from BRBG to CMIN occurs when the control program causes LMINC to go on, thereby enabling CMIN to copy the data from BRBG. The control program checks the READY control signal. If READY is off, indicating that the pipers have not finished minimum MIN determination, the control program loops back to generate another DV on signal. At this time, the next enabled piper, if any, whose MIN value is less than the previously-enabled piper's MIN value, has its MIN on the Data Bus for comparison, and the brightness generator control program reads this next value into CMIN 1206. This process continues until all pipers have compared their MIN values and have copied the smallest MIN value found in their MINREG register. This latter value is now also in CMIN. READY then goes on at location E5 to allow the pipers and brightness generator to begin the next processing sequence.

The brightness generator control program next moves the product of (WR1−SSD) and (M+SSB) at A*B output of multiplier MULT 1168, see FIG. 10A, into register SHIFT in preparation for the final multiplication by WR2 (meaningful only on the second and subsequent chute processing passes); turns BUSY on and GO off to cause the pipers to wait at locations E6 and E7 for DSUM and BSUM collection or (if the piping cycle is done) at location E1A for chute refilling; and checks the status of flag FLG. If FLG is on, indicating that this is the first chute processing pass for the current ES/QS pair, the control program causes FLG to go off; bypasses final brightness calculation; and checks the value in CMIN. If CMIN contains a non-command (bit 15=0), indicating that more data remains to be piped in the chutes (always the case on first pass, except for the special circumstance when only a command is loaded into the chutes), the brightness generator control program turns BUSY off and enters the READY on wait state at location E6, and processing proceeds. If CMIN does contain a command (bit 15=1), processing proceeds as described in the section describing the brightness calculation.

SSD AND SSB COLLECTION

The SSD and SSB collection phase is executed during instructions 7D-96. When READY goes on, indicating that all pipers have finished piping the data in the present TOC and have determined their current DSUM and BSUM values, the control program turns GO on to cause the pipers to put their DSUM and BSUM values sequentially on the Data Bus. The control program next transfers the value in register M 1212 into register ASB 1210, and the value in register WR1 1226 into ASD 1228, see FIG. 10A and FIG. 10B, in preparation for subtracting the DSUM values from WR1 and adding the BSUM values to M as they are received, see discussion on initialization. Flag DZ is also set on in this instruction. This flag is used to determine if SSD equals zero after all DSUM values have been received.

The control program now generates a DV on signal to synchronize piper processing at location E8, and zeros the contents of register EXP.

The control program responds at its DV on signal at location E8 and transfers a DSUM value on the Data Bus into BRBG. It subsequently generates another DV on signal in preparation to read a BSUM value from the Data Bus. The control program next causes the subtraction of the DSUM value just transferred from the Data Bus from the value WR1 contained in ASD 1228. If any DSUM value is not equal to zero, flag DZ is cleared to indicate that SSD for the current chute processing pass is not zero.

The control program responding to a DV on signal at location E9, transfers a BSUM value from the Data Bus and causes this value to be added to the contents of register ASB, which contains M, the missing events value.

As each piper sequentially places its DSUM and BSUM values on the Data Bus, each such piper turns it BUSY off, enables the next piper in the piper string, see FIG. 6, (CARRY on), and waits at location E10 for the other pipers to complete their DSUM and BSUM value transfer. The brightness generator control program now checks the status of the READY signal at location E10. If READY is off, the brightness generator control program loops back to generate another DV on signal to initiate retrieval of the next DSUM/BSUM pair from the next piper. This loop is repeated until all active pipers have copied their DSUM and BSUM values onto the Data Bus, at which time READY at location E10 goes on, and the brightness generator control program turns GO off to prevent piper enabling. Since each iteration of the above-described loop substracts a DSUM value from ASD and adds a BSUM value to ASB, the value remaining in ASD is WR1-SSD, and the value remaining in ASB is M+SSB.

The control program next checks for the EXACT condition being false (i.e., EXACT low/off). The EXACT condition is determined by logic (see FIG.

10C) that detects exact matches between query and entry, using parameters known at this point. As previously described, an exact match is detected when three specific conditions are met:

condition 1: flag EQE is on (QS=ES);
condition 2: flag DDA is on or flag DZ is on (DSUM is zero) and flag MZ is on (no missing events);
condition 3: QS-ASB is equal to zero (for a query, all brightness values equals 1) or flag BDA is on.

If EXACT condition is true (i.e., EXACT high/on), indicating an exact match between query and entry as defined above, the control program places a 1.0 in BOLD 1200, and stores the value in LMIN 1222 (the position at which the exact match has been detected) into POS 1202, see FIG. 10B. Processing then continues as described in the brightness calculation section.

If EXACT condition is false (not an exact match), the control program checks the status of flag DDA. If DDA is on, the WR1−SSD portion of the brightness equation is not utilized and a 1.0 is transferred into SHIFT. If DDA is low, the contents of ASD (i.e., WR1−SSD), is transferred into SHIFT. The brightness generator then checks the status of the READY signal to see if any piper requires NMD command servicing. If so, READY is off, and the brightness generator enters MND servicing processing. Otherwise, GO is turned on to enable piper minimum MIN determination and processing proceeds.

NMD COMMAND SERVICING

The NMD Command Servicing is executed during instructions 9D-AA. If READY is off at location E11, indicating that at least one piper has entered its NMD loop and requires one or more NMD commands to be serviced, the brightness generator control program couples the brightness generator to the microcomputer. When coupling is effected, the brightness generator control program turns GO on to enable the next piper in turn to send its NMD(s) to the microcomputer. Next, it turns BUSY on. This holds any non-NMD containing pipers at location E11 until the brightness generator control program can achieve a decoupling from the microcomputer. As long as NMDs remain to be serviced, the piper(s) involved will also keep READY off to hold the other pipers at location E11.

The control program next generates a DV on signal for two successive instruction cycles to cause the microcomputer to read an NMD command from the Data Bus, and to cause the piper sending the NMD to decouple from the Data Bus and generate a CTS on signal to tell the microcomputer that it is ready for chute refill data. The control program then waits for a DV on signal from the microcomputer (the extra instruction cycle DV signal and intervening NO-OP prevents the brightness generator from responding to its own DV signal). When a DV on signal is received from the microcomputer, indicating that it has chute refill data on the Data Bus for a piper, the control program checks if the chute word transferred from the Data Bus to BRBG at location E14 contains a command (bit 15=1), designating the end of chute data. If the chute word does not contain a command, the control program loops back to location L26 to wait for the next chute data word from the microcomputer. When a command is detected in the chute data word, the control program initiates a decouple from the microcomputer and turns GO off to inhibit piper enabling in preparation for another minimum MIN determination. It is necessary for the piper to determine another MIN value since the data in the TOC containing the current MIN value will have been moved to the corresponding POC and a new TOC value will now exist in the TOC. Also, NMD servicing may have added new chute data. Both changes will change the data input to the MIN finding logic block 1029 of one or more pipers, see FIG. 3A. When the decouple is complete, the control program turns BUSY off to release the pipers at location E11 to initiate minimum MIN determination (assuming that all pipers are finished with NMD servicing), and checks the status of the READY signal.

If READY if off, indicating that at least one piper still needs NMD servicing, the control program enters the NMD loop once more. Otherwise, the control program turns GO on to enable the first piper to begin minimum MIN determination, and checks the status fo flag BDA. If BDA is low, processing proceeds directly to the calculation of (WR1−SSD)(M+SSB) (see brightness equation). If BDA is on, indicating that the M+SSB term is not to be utilized (see section on SSD and SSB collection), the control program loads a 1.0 in register ASB to replace the previously-calculated M+SSB. The control program next causes the transfer of the contents of register SHIFT, which presently contains the value WR1−SSD, into MPC 1204 (see FIG. 10A). The control program then causes the multiplication of the value in MPC by the M+SSB value in register ASB. The value in CMIN 1206 is transferred into LMIN 1222, preserving the position at which the brightness for the current processing pass is being calculated. The control program now enters the MIN loop again, and processing proceeds as described in the Minimum MIN Determination section.

NORMALIZED BRIGHTNESS CALCULATION AND TRANSFER

The normalized brightness calculation and transfer is executed during instructions 6F-7A. If the brightness generator control program finds flag FLG off, indicating that the present pass is not the first processing pass for the current piping cycle, the control program waits for SHIFT to indicate that it has normalized (see section entitled Fixed and Floating Point Transfers and Transformations) the product of WR1−SSD and M+SSB. When SHIFT has finished the required normalization, the control program transfers the contents of SHIFT into MPC, and then multiplies, in MULT, the transferred contents of SHIFT by the previously-calculated WR2. The result, the brightness for the current chute processing pass, is then transferred to register ASB. The current brightness value in ASB is then compared with the brightness calculated on the previous chute processing pass (stored in BOLD). If the current brightness is larger than the previous brightness, the current brightness is transferred to BOLD, replacing the previous brightness value. The value in LMIN, the position at which the current brightness has been calculated, is then transferred to POS. If the current brightness is less than or equal to the previously-calculated brightness, the control program retains the previous brightness and position, discarding the just-calculated quantities.

The control program now checks the value in CMIN. If it is other than a command, indicating that the chutes still contain data to be processed, the control program proceeds to collect the next SSD and SSB for the next chute processing pass. If CMIN contains a command, indicating that all data in the chutes ahve been processed, the control program turns BUSY off, in preparation for the next piping cycle, and transfers the contents of BOLD and POS into BRBG in preparation for placing them on the Data Bus. The control program then couples the brightness generator with the microcomputer. The control program then places the contents of BRBG (brightness and position) on the Data Bus and generates a DV on signal to cause the microcomputer to read the Data Bus. The control program then decouples the brightness generator from the Data Bus. When the decouple is complete, the control program checks the contents of CMIN again. If the command it contains is an EOF, indicating that no more data remains to be piped against the current query, processing control returns to location L2, and a new initialization processing cycle begins.

If the command in CMIN is not an EOF, then the control program checks the brightness value in BOLD. If it is 1.0 (exact match), indicating that no more piping needs to be done against the present data base entry file, processing control also returns to location L2 so that the pipers will be reset for a new piping cycle.

If the final brightness value is less than 1.0, BOLD is set to zero and the brightness generator is coupled to the microcomputer for piper chute filling in preparation for piping the next entry against the present query. The brightness generator then returns to instruction L4 to receive the new ES, DDA, and M data and begin a new piping cycle.

B. DETAILED DESCRIPTION OF THE BRIGHTNESS GENERATOR

Detailed operation of the brightness generator and controlling instruction code program is better understood by referring to FIGS. 10A and 10B and Table 6.

Referring now to FIGS. 10A and 10B, there is shown in detailed block diagram the brightness generator 1018. The brightness generator includes table lookup Read-Only Memory ROM 1184 for calculating the value of the reciprocal of a quantity (1/N) as well as the reciprocal of a quantity cubed ($1/N^3$). The ROM 1184 is coupled to the R-BUS 1167 by means of a ROM decode 1176, and the output of the ROM is coupled to the I-BUS 1187 through data selector 1178 and ROM transfer gate 1180. Coupled to the I-BUS is a seven-bit register QS 1208 containing the value of QS. Also coupled to the I-BUS are seven-bit registers ES 1185 and M 1212 containing therein the value of ES and M respectively. The I-BUS is coupled to the R-BUS through the series connection of transfer gates 1186 and 1154. The R-BUS is coupled to the A input of subtracter 1156 through transfer gate 1174. The control electrode of transfer gate 1154 is coupled directly to the ESROM control signal while the control electrode of transfer gate 1174 is coupled to the ESROM control signal through inverter 1175. The B input of subtracter 1156 is coupled directly to the S-BUS 1165.

The output of register ES is coupled to the S-BUS through transfer gate 1172. The output of the M register is also coupled to the S-BUS through transfer gate 1152. Connected to the S-BUS through transfer gate 1177 is a constant value word that is equal to zero. The control electrode of transfer gate 1177 is connected to control signal ZERO such that a high on ZERO causes the quantity zero to be copied into the B input of substracter 1156. The output of subtracter 1156 is coupled to the I-BUS through transfer gate 1158. The output of register SHIFT 1169 is connected to the A input of eight-bit multiplier 1168 and to the I-BUS through transfer gate 1170. The register SHIFT output Q is also coupled to the input of the 8-bit register MPC 1204. The output Q of register MPC is applied to the B input of multiplier 1168. The A*B output of the multiplier 1168 is applied to the M-BUS 1189 through transfer gate 1166. The M-BUS 1189 is coupled to the I-BUS through transfer gate 1160. The M-BUS is also coupled to the B input of adder 1179. The A input of adder 1179 is coupled to the I-BUS through transfer gate 1164. The output of adder 1179 is applied to the input of exponent register EXP 1171, and the output of register EXP is applied to the input of adder register 1179. The input of register WR2 is coupled to the I-BUS. The output of register WR2 is coupled to the M-BUS through transfer gate 1182. The input of register SHIFT is coupled to the M-BUS. The Data Bus is coupled to the D1 input of register BRBG 1224. The output of register BRBG is coupled to the B input of subtracter 1143. The A input of subtracter 1143 is coupled to the I-BUS through transfer gate 1145. The output Q of subtracter 1143 is coupled to the input of register ASD through transfer gate 1141. The output Q of register ASD is coupled to the A input of subtracter 1143. The I-BUS is coupled directly to the input of register WR1. The output Q of register WR1 is coupled to the input of register ASD through transfer gate 1300. The control electrode of transfer gate 1300 is coupled to the ASDWR1 control signal while the control electrode of transfer gate 1141 is coupled to control signal ASDWR1 through inverter 1181.

The B input of adder 1192 is connected to the A-BUS 1191. The A-BUS 1191 is connected to the I-BUS through transfer gate 1188. The output of adder 1192 is coupled to the input of register ASB 1210. The output of register ASB is coupled to the A input of adder 1192. One output of register ASB 1210 is also coupled to the input of register BOLD and to the S-BUS through transfer gate 1183. Also coupled to the input of register BOLD through transfer gate 1148 is the I-BUS. The output of register BOLD is coupled to the B-BUS 1193 which in turn is coupled to the D2 input of the BRBG register. The inverted output of register BOLD, that is, $\overline{Q}$, is coupled to the A-BUS 1191 through transfer gate 1194.

The output of BRBG is coupled to the Data Bus through line driver 1142, and to the I-BUS 1187 through transfer gate 1150. The output of BRBG is also coupled to the input of register CMIN 1206. The output Q of register CMIN is coupled to the input of register LMIN 1222, and the output of register LMIN is coupled to the input of register POS. The output of the register POS 1202 is coupled to the B-BUS 1193.

C. DETAILED DESCRIPTION OF THE BRIGHTNESS GENERATOR INSTRUCTION PROGRAM

Figure 12:
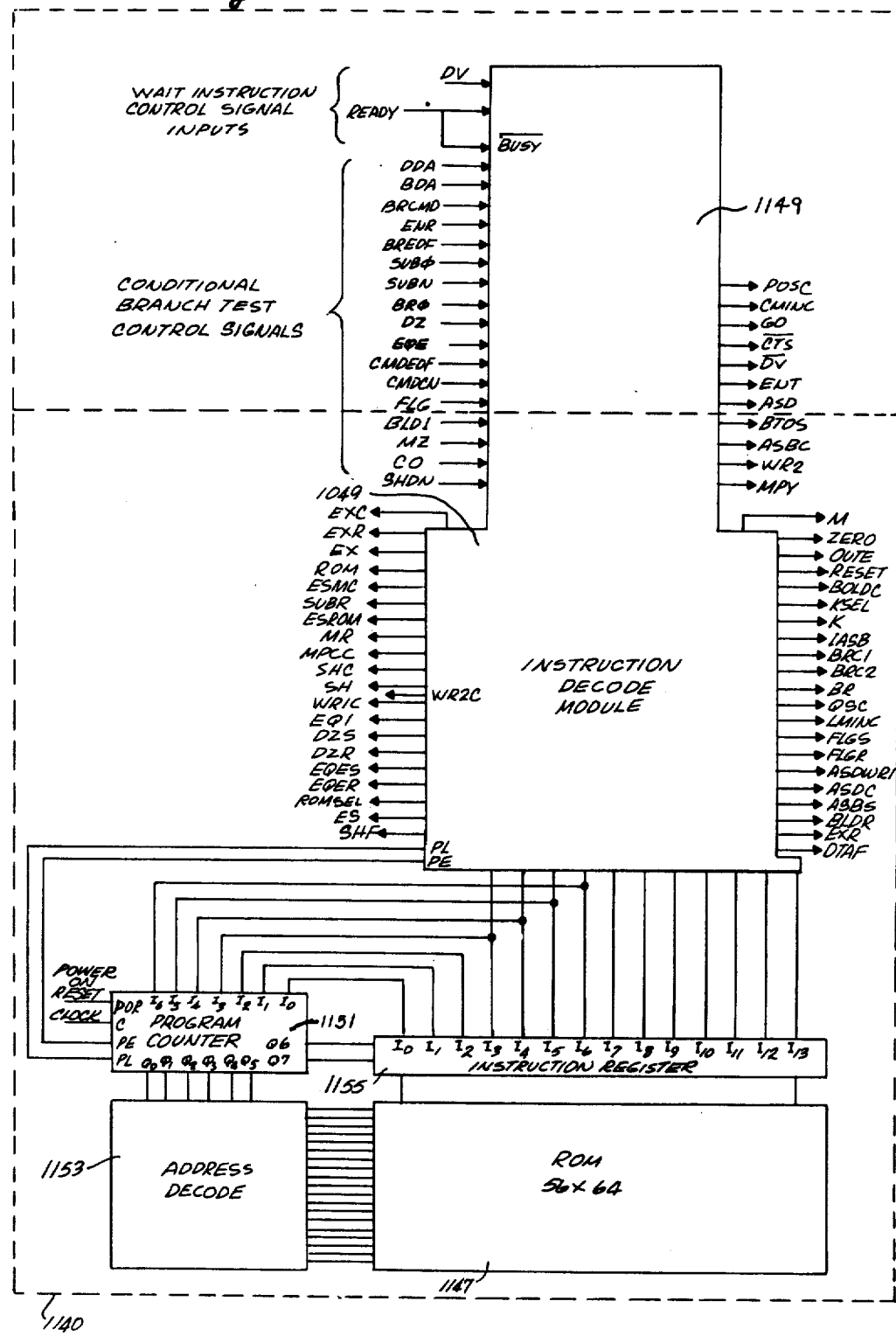
FIG. 12 is a block diagram of the program controller for the brightness generator.

The control logic block that issued the control signals that execute the operation of the brightness generator is shown in FIG. 12. The control logic block 1140 includes a 56×64 Read-Only Memory ROM 1147 for storing instructions associated with a brightness generator control program. The program counter 1151 stores the address of the instruction location of an instruction stored in the ROM 1147. The program counter 1151 is advanced by means of an external clock signal coupled to the Clock input terminal C of the program counter.

In the present embodiment, an external clock operating at 5 MHZ clock rate is used.

The program counter 1151 is enabled or disabled by a Program counter Enable PE control signal from the instruction decode module 1149. Upon receipt of each clock pulse, the program counter 1151 advances by 1 in hexadecimal order to the next instruction number. The advance occurs, however, only if control signal PE is not low. Control signal PE is low whenever a READY on wait, DV on wait, or ENABLED wait instruction is currently in the instruction register 1155, and the appropriate external control signal READY, DV or ENABLED input to the instruction decode module 1149 is off. Otherwise, control signal PE is high and the program counter advances by 1. The wait instructions and the external control signals are explained during the detailed description of the brightness generator operation.

If the Parallel Load PL control signal is high at the same time that the PE control signal is high and a clock pulse arrives, the program counter 1151 does not advance by 1. Instead, it loads the address present on its input address lines 0–6 directly into its counter registers in order to execute jump instructions. These seven address lines are connected to bits 0–6 of the instruction register. Control signal PL is high (jump instructions are executed) whenever a conditional or nonconditional jump instruction is currently in the instruction register 1155 and the appropriate test control signal input to the instruction decode module is high. The jump instructions and test control signals are explained during the detailed description of the brightness generator operation. A Power On Reset POR control signal is coupled to the POR input terminal of the program counter 1151. A POR control signal is issued by the microcomputer and causes the brightness generator program counter to reset to the 00 instruction. A POR signal overrides all other signals to the program counter.

The address decoder 1153 is coupled between the program counter 1151 ad the ROM 1147. The address decoder decodes the 6-bit program counter output, i.e., Q0 through Q5 (see FIG. 12) and causes the four instructions whose location in the ROM is decoded by decoder 1153 to appear in the instruction register 1155, which is 56 bits wide, and thus, accommodates four 14-bit instructions. Address lines Q6 and Q7 from the program counter 1151 select one of the four instructions for execution. The instruction decode module 1149 is coupled to the instruction register 1155 and decodes the instruction contained therein as selected by the eight address lines of the program counter 1151. The outputs (see FIG. 12) of the instruction decode 1149 are the control signals that control the various hardware elements that execute the brightness generator operation. The high or low state of each control signal is set in accordance with the states specified by each instruction decoded from instruction register 1155.

A Power On Reset POR pulse originating in the microcomputer causes the program counter in the brightness generator controller to be reset to 00. The POR pulse also causes control signal ENT to become low. Control signal RESET high causes the program counter in all the active pipers to be reset to 00. Control signal OUTE low disables line driver 1142, thus decoupling the output of BRBG register from the Data Bus. Control signal ENT low causes the microcomputer to decouple its data output from the Data Bus. Resetting the program counter to 00 initiates brightness generator operation.

In the following description of instruction interpretation, control signals not described as high are low, regardless of their state during the previous instruction. The eight exceptions to this are control signals BUSY, OUTE, GO, ENT, ENR, FLG, EOE, and DZ. Once made high or low, they remain in that state during subsequent instructions until a second instruction specifically changes their state. Instructions are numbered in the hexadecimal (base 16) notation.

During instruction 00, control signal GO is caused to become low. When control signal GO is low, all pipers are maintained in a disable state. This instruction concludes brightness generator initialization. The brightness generator logical operation is considered to start (or restart) normally with instruction 01 for a new piping cycle with a new query against a new data base entry file, or with instruction 0B for the same query piped against a new entry of the same data base entry file.

During instructions 01, 02, and 03, control signal RESET is caused to become high. Control signal RESET high causes the pipers to institute reset processing by causing all piper program counters to be reset to instruction 00 (see description of piper processing). Piper reset causes the pipers to receive new QS, PW, and piping array data from the microcomputer.

During instruction 04, control signal BUSY is caused to become low. If all piper BUSY control signals are low, instruction 04 causes control signal READY to become high.

Busy high indicates that a particular piper or the brightness generator is still executing a particular processing phase (a sub-group of instructions that produce a specified intermediate result). When a piper or the brightness generator finishes a processing phase, the corresponding BUSY control signal is set low. Concurrently, the status of control signal READY is checked. As long as any other piper or the brightness generator is executing the previous processing phase, the control signal BUSY, controlled by such piper or the brightness generator, will be high thereby causing READY to remain low, consequently preventing the waiting pipers or the brightness generator from commencing the next processing phase. At such time that the final piper or the brightness generator completes the previous processing phase and causes its control signal BUSY to become low, the READY control signal becomes high, and all of the pipers and the brightness generator commence executing the next processing phase at the same time. Thus, control signal BUSY through its effect on control signal READY porvides processing phase synchronization. (Control signal DV provides synchronization of instruction execution within a processing phase, when required). Processing phase synchronization takes place at each READY on (high) wait instruction, for example, at instruction 4E.

During instruction 05, control signal FLG is caused to become high causing a logical 1 to be stored in the FLG register. The status of control signal FLG is tested during instruction 6F.

During instruction 06, control signal BLDR is caused to become high. Control signal BLDR high causes the register BOLD to be cleared (all bits set to zero). Instructions 07 and 08 signal the microcomputer 1010 to initiate data transmittal to the pipers necessary to begin a new piping cycle.

During instruction 07, control signal ENT (transmit enable) is caused to become high. Control signal ENT high causes microcomputer 1010 to couple its output to the Data Bus and to cause control signal ENR (receive enable) to become high.

During instruction 08, the status of control signal ENR is checked. As long as control signal ENR remains low, the program counter remains at instruction 08. When control signal ENR is detected as being high, indicating that the microcomputer is connected to the Data Bus, the program counter is incremented to instruction 09.

During instruction 09, the status of control signal DV (data valid) is checked; control signal CTS is caused to become low; and control signal BRC1 is caused to become high. As long as control signal DV remains high at each iteration of instruction 09, the program counter is inhibited from incrementing to the next instruction. Control signal CTS low causes the microcomputer to place a data word containing new QS and BDA data, on the Data Bus. Control signal BRC1 high causes the data (bit pattern) on the Data Bus to be copied into the BRBG register at each iteration of the instruction. When control signal DV is detected as being low, indicating that valid data from the microcomputer exists on the Data Bus, the program counter is incremented to instruction 0A. Note that the final iteration of instruction 09 has copied the Data Bus data into the register BRBG.

During instruction 0A, control signals BR and QSC are caused to become high. Control signal BR high causes gate 1150 to become conductive, allowing the value in the register BRBG to be copied onto the I-BUS. Control signal QSC high enables the QS register to receive bits 8 through 14 of the I-BUS and the BDA register to receive bit 7 of the I-BUS.

During instruction 0B, the status of control signal DV is checked while control signal CTS is caused to become low, and control signal BRC1 is caused to become high, as described for instruction 09. CTS low indicates that the brightness generator is ready to receive new ES, DDA, and M data.

During instruction 0C, the status of control signal BREOF, generated by the BRBG register, is checked. If control signal BREOF is high, indicating that the BRBG register contains an EOF command as a result of instruction 0B, the program counter is incremented to instruction 2B there terminating the current piping cycle before any piper chutes are loaded. If BREOF is low, indicating that the BRBG register contains data or a command other than an EOF, the program counter is incremented to instruction 0D thereby initiating piper chute filling.

During instruction 0D, control signal GO is caused to become high. Control signal GO high enables the pipers to begin chute filling (see description of piper instruction 17 in description detailed piper operation). Piper enabling is used for those instruction sequences that must be performed by each piper serially, rather than simultaneously.

During instruction 0E, control signals BR and ESMC are caused to become high. Control signal BR high causes gate 1150 to become conductive, allowing the value in the BRBG register to be copied onto the I-BUS. Control signal ESMC high simultaneously enables the ES register to receive bits 8-14 of the I-BUS; the M register to receive bits 0-6 of the I-BUS; and register DDA to receive bit 7 of the I-BUS.

During the following instructions that cause a transfer of data into register SHIFT and register EXP, the state of control flags SHF and DTAF are set according to the required data transformations of register SHIFT. The state of the SHF and DTAF flags is shown in the brightness generator flow diagram. During instructions 0F and 10, control signals MR, SUBR, and SHC are caused to become high. Control signal MR high causes the value in register M to be copied onto the S-BUS, which is connected directly to the B input of subtracter 1156. Since the output of register QS is connected directly to the A input of subtracter 1156, the A-B output of the subtracter equals to quantity QS-M. Control signal SUBR high causes gate 1158 to become conductive, thereby copying the A-B output of subtracter 1156 onto the I-BUS. Since control signals MPY and WR2 are both low, the output of NOR gate 1162 is high, maintaining gate 1160 conductive. Gate 1160 conductive causes the value on the I-BUS to be copied onto the M-BUS. Control signal SHC high enables register SHIFT to receive the data on the M-BUS. This instruction occurs twice to allow time for the output of subtracter 1156 to stabilize.

During instruction 11, control signal MPCC is caused to become high. Control signal MPCC high enables the MPC register to receive the value in register SHIFT. The output of register MPC provides the B input to multiplier MULT 1168. This instruction is always the first step in multiplying two numbers.

During instruction 12, control signals ZERO, SUBR, and SHC are caused to become high. Control signal ZERO high causes a zero to be copied onto the S-BUS and thus to the B input of subtracter 1156. Since the output of register QS is directly connected to the A input of subtracter 1156, the value at the A-B output of subtracter 1156 is the value in register QS. Control signal SUBR high causes gate 1158 to become conductive, thus causing the A-B output of subtracter 1156 to be copied onto the I-BUS. Since control signals MPY and WR2 are both low, gate 1160 is conductive, as described in the description of instruction 0F, causing the value on the I-BUS to be copied onto the M-BUS. Control signal SHC high enables register SHIFT to receive the value on the M-BUS.

During instructions 13 and 14, NO-OP (no operation) instructions are executed. These instructions, together with instruction 15, use three clock periods, the time required for the A*B output of MULT 1168 to stabilize. The A*B output of MULT equals the value in the MPC register (input B) multiplied by the value in register SHIFT (input A).

During instruction 15, control signal BUSY is caused to become high, thus, causing the READY control signal to become low synchronizing piper processing at location E1 (brightness generator instruction 4E and piper instruction 22).

Instruction 16 transfers the result of the multiplication during instructions 0F through 12 back into the register SHIFT. During instruction 16, control signals MPY and SHC are caused to become high. Control signal MPY high simultaneously causes the output of NOR gate 1162 to become low, making gate 1160 nonconductive, and causing gate 1166 to become conductive, allowing the A*B output of MULT to be copied onto the M-BUS. Control signal SHC high enables register SHIFT to receive the value on the M-BUS. This completes the calculation of quantity WR1 in the brightness generator.

During instruction 17, control signals SH and WR1C are caused to become high. Control signal SH high causes gate 1170 to become conductive, allowing the value in register SHIFT to be copied onto the I-BUS. Control signal WR1C enables the WR1 register to read and copy the value on the I-BUS.

The multiple logic paths implemented by instructions 18 through 27, 30 through 4C, and 56 through 57 cause to be calculated, as appropriate, one of the 12 values for WR2 shown in Table 10. These values depend on the status of flags DDA and BDA, and the relative magnitudes of ES and QS. All reciprocal values of ES, QS, $ES^3$, and $QS^3$ are obtained from ROM 1184 as decoded "table lookup" items. The other intermediate calculations and final WR2 value are obtained by multiplication in MULT. The register SHIFT converts data values between fixed point and floating point formats, as required by flags SHF, DTAF, and exponent register EXP.

During instruction 18, control signal EQ1 is caused to become high, and the status of control signal SUBN and SUB0 outputs from subtracter 1156 are checked. Control signal EQ1 high causes gate 1172 to become conductive, which allows the value in register ES to be copied onto the S-BUS. The S-BUS is connected directly to the B input of subtracter 1156, and the output of register QS is connected directly to the A input of subtracter 1156, thus the subtracter output equals the quantity QS-ES. If control signal SUBN is high, indicating that the subtraction results are less than zero (i.e., the quantity ES is greater than the quantity QS), control signal EQER is caused to become high; resetting flag register EQE to zero, causing output signal, EQE, to become high. If control signal SUBN is low, indicating that the quantity QS is equal to or greater than the quantity ES, the program counter is incremented to instruction 30.

During instructions 19 and 1A, control signals ESROM and ROMSEL are caused to become high. Control signal ESROM high causes gate 1174 to become nonconductive and gate 1154 to become conductive, decoupling the output of register QS from the R-BUS and connecting the output of register ES to the R-BUS. Simultaneously, ROM decode module 1176 outputs the ROM address of the registers containing the value $1/ES^3$ and 1/ES. Control signal ROMSEL high causes ROM data selector 1178 to select the 1/N output of the ROM. This instruction is executed twice to allow the ROM selection and decode logic to stabilize.

During instruction 1B, control signals ROM and WR2C are caused to become high. Control signal ROM high causes gate 1180 to become conductive, allowing the output of the data selector 1178 to be copied onto the I-BUS. Control signal WR2C enables the WR2 register to receive the value on the I-BUS.

During instruction 1C, the status of control signal DDA, generated by flag register DDA, is checked. If control signal DDA is high, indicating that the WR1-SSD portion of the brightness equation is not to be used, the program counter is incremented to instruction 33. If control signal DDA is low, indicating that the brightness equation is to use the quantity WR1=SSD, the program counter is incremented to instruction 1D.

During instruction 1D, control signals WR2 and SHC are caused to become high. Control signal WR2 high simultaneously causes the output of NOR gate 1162 to become low, and causes gate 1182 to be conductive, allowing the value in the WR2 register (1/ES) to be copied onto the M-BUS. Control signal SHC high enables the register SHIFT to copy the value on the M-BUS.

During instruction 1E, the value in register SHIFT (1/ES) is copied into the MPC register, as described for instruction 11.

During instruction 1F, control signals ROMSEL, ROM, and SHC high cause the quantity 1/QS to be obtained from the ROM and copied into register SHIFT. Note that with control signal ESROM held low, the ROM decoder 1176 receives QS via gate 1174, which, when decoded, selects 1/QS and 1/QS in ROM 1184.

During instructions 20 and 21, NO-OP (no operation) instructions are executed. The three clock cycles required for these instructions and instruction 22 allow time for the A*B output of multiplier 1168 to stabilize.

During instruction 22, the status of control signal BDA, generated by flag register BDA, is checked. If control signal BDA is high, indicating that the M+SSB portion of the brightness equation is not to be used, the program counter is incremented to instruction 45.

During instruction 23, control signals MPY and SHC are high, and the output A*B of multiplier 1168 is copied into register SHIFT.

During instruction 24, the status of control signal SHDN, generated by register SHIFT, is checked. As long as SHDN is low, indicating that register SHIFT is still shifting data in accordance with flags SHF and DTAF, the program counter is not incremented. When control signal SHDN is detected as being high (shifting finished), the program counter is incremented to instruction 25.

During instruction 25, control signal MPCC is high, and the value in register SHIFT is copied into the MPC register.

During instruction 26, control signals ROMSEL, ROM, and SHC are high, and the quantity 1/QS is copied into register SHIFT. After instruction 27, the program counter=44.

During instruction 2B, control signal ENT is caused to become low (the BRBG register contains an EOF command, see instruction 0C). Control signal ENT low causes the microcomputer to decouple its output from the Data Bus. The microcomputer in turn causes control signal ENR to become low, thus communicating such decoupling to the brightness generator.

During instruction 2C, the status of control signal ENR is checked. If control signal ENR is high, the program counter is incremented to instruction 2D and then to 2C once again. When control signal ENR becomes low, indicating that the microcomputer has decoupled from the Data Bus, the program counter is decremented to instruction 01. At instruction 01, the pipers are reset to commence chute reloading.

The operational loop comprising instructions 0C, 2B, 2C, and 2D is used by the microcomputer to reset the pipers before chute loading begins by substituting an EOF command in place of an ES/DDA/M data word.

During instruction 30, when the quantity ES is not greater than the quantity QS, control signal EQ1 is caused to become high such that the value in register ES is copied into the subtracter 1156. Control signal SUB0, generated by subtracter 1156, is then checked. If control signal SUB0 is high, indicating that the quantity QS equals the quantity ES, control signal EQES is caused to become high, setting flag register EQE to 1 ( and thus control signal EQE high). The program counter is then incremented to instruction 31. If control signal SUB0 is low, indicating that the quantities QS and ES are not equal, control signal EQER is caused to become high, resetting flag register EQE to 0 (and thus control signal EQE low), and the program counter is incremented to instruction 37.

During instruction 31, the status of control signal DDA is checked, as described for instruction 1C. If control signal DDA is high, the program counter is incremented to instruction 4B. If control signal DDA is low, the program counter is incremented to instruction 32.

During instruction 32, control signals ROM and WR2C are high, and the quantity $1/QS^3$ is copied from ROM 1184 into the WR2 register. Note that control signal ROMSEL low causes data selector 1178 to select the $1/N^3$ output of the ROM 1184.

During instruction 33, the status of control signal BDA is checked, as described for instruction 22. Control signal BDA high causes the program counter to be incremented to instruction 3F. BDA low causes the program counter to be incremented to instruction 34.

During instruction 34, the program counter is incremented to instruction 4D.

During instruction 37, control signals ES and SHC are high when the quantity QS is greater than the quantity ES (as determined by instructions 18 and 30), and the value in the ES register is copied into register SHIFT. Control signal ES high causes gate 1186 to become conductive, allowing the contents of the ES register to be copied onto the I-BUS. Control signal SHC high enables register SHIFT to receive the value on the I-BUS.

During instruction 38, control signal SHDN (SHIFT register shift status) is checked. SHDN high causes the program counter to increment to instruction 39.

During instruction 39, the value in register SHIFT is copied into the MPC register upon the issuance of a Chip Enable signal (i.e., control signal MPCC high).

During instruction 3A, the status of control signal DDA is checked, as described for instruction 1C. Control signal DDA high causes the program counter to be decremented to instruction 1F. DDA low causes the program counter to be incremented to instruction 3B.

During instruction 3B, control signals ROM and SHC are high, and the quantity $1/QS^3$ is copied into the register SHIFT.

During instruction 3C, the program counter is decremented to instruction 22.

When control signal DBA is high, instruction 3F is executed. During instruction 3F, control signals WR2 and SHC are high, and the value in the WR2 register is copied into register SHIFT.

During instruction 40, control signal MPCC is high, and the value in register SHIFT is copied into register MPC.

During instruction 41, control signals ZERO, SUBR, and SHC are high, and the value in register QS is copied into register SHIFT.

During instruction 42, the status of control signal SHDN is checked. When control signal SHDN becomes high, indicating that register SHIFT has finished its shift operation, the program counter is incremented to instruction 43.

During instructions 43 and 44, two NO-OP instructions are executed. The two clock periods provide adequate time for the A*B output of multiplier 1168 to stabilize (following the execution of either instruction 42 or instruction 27).

During instruction 45, control signals MPY and SHC are high, and the A*B output of multiplier 1168 is copied into register SHIFT.

During instruction 46, control signal SHDN is checked, as described for instruction 42.

During instruction 47, control signals SH, EX, and WR2C are caused to become high. Control signal SH high causes gate 1170 to become conductive, allowing the value in register SHIFT to be copied onto the I-BUS. Control signal EX high causes gate 1164 to become conductive. Gate 1164 conductive allows the value in register EXP to be copied onto the I-BUS. Control signal WR2C enables the WR2 register to receive the value on the I-BUS. Since the output of register SHIFT has been shifted to occupy bits 0–7, and the output of register EXP occupies bits 8–13, the data copied into the WR2 register is in floating point format.

During instruction 48, the program counter is incremented to instruction 4D.

During instruction 4B, the status of control signal BDA is checked, as described for instruction 22. If control signal BDA is high, the program counter is incremented to instruction 56. Instruction 56 uses control signals KSEL, K, and WR2C high to cause a constant equal to 1.0 in floating point format to be copied from the KROM 1144 into register WR2. Note that KSEL high selects the floating point 1.0, whereas KSEL low selects the fixed point 1.0 in the KROM 1144. Instruction 57 causes the program counter to be decremented to instruction 4D. The control program increments to instruction 56 only when control signal BDA is high to cause the constant 1.0 to replace the M+SSB factor of the brightness equation when the factor is not to be used. If control signal BDA is low, the program counter is incremented to instruction 4C.

During instruction 4C, control signals ROMSEL, ROM, and WR2C are high, and the value 1/QS is copied into register WR2.

During instruction 4D, control signal BUSY is caused to become low, signalling the pipers through control signal READY that the brightness generator has finished determination of the WR2 factor of the brightness equation. At this point in program execution, register WR2 contains one of the 12 values indicated in Table 10, as determined by the status of flags DDA and BDA, and the magnitude of ES relative to QS.

During instruction 4E, the status of control signal READY is checked, as previously described. When control signal READY becomes high, indicating that the pipers have completed chute loading, the program counter is incremented to instruction 4F.

During instructions 4F-53, control signal ENT is caused to become low, control signal BUSY is caused to become high, and the program halts until control signal ENR low indicates that the microcomputer output is removed from the Data Bus. Control signal BUSY is caused to become high at this point to keep the pipers from beginning their minimum MIN determination processing phase until the microcomputer has decoupled from the Data Bus. When control signal ENR is detected as low, the program counter is incremented to instruction 59.

During instruction 59, control signal BUSY is caused to become low, thus signalling the pipers via the READY control signal to begin minimum MIN determination.

Four NO-OP instructions are executed during instructions 5A through 5D. This allows four clock periods for the pipers to execute the preliminary instructions for minimum MIN determination and be ready at location E4 for a DV on (low) signal from the brightness generator.

During instruction 64, control signal LMINC is caused to become high. Control signal LMINC high enables register LMIN to receive the value in register CMIN. On a first processing pass when the program counter has been incremented from instruction 5E, instruction 64 serves as a timing step only, since no valid information has yet been copied into register CMIN. During instruction 64, the current minimum MIN value (the MIN value associated with the DSUM and BSUM values to be used to calculate the next brightness value) is copied from register CMIN into register LMIN, as the position value for that brightness value.

During instructions 65 through 6B, the brightness generator initiates and synchronizes minimum MIN determination in the pipers (instructions 65 and 66), stores the MIN value found during any given MIN compare loop (instruction 67), and reiterates instructions 65 through 76 until the minimum value of MIN is found (instruction 6B).

During instruction 6C, control signals MPY and SHC are high, and the A*B output of multiplier 1168 is copied into register SHIFT. After instruction 6C, register SHIFT contains the product of the first two factors of the brightness equation.

During instructions 6D and 6E, piper enabling is halted (control signal GO is caused to become low), and control signal BUSY is caused to become high. This ensures resynchronization of pipers and brightness generator processing at location E6 (see FIG. 5 and FIG. 11) for the transmittal of DSUM and BSUM values to the brightness generator (see piper instructions 42 through 4F).

During instruction 6F, the status of control signal FLG, generated by the FLG register 1230, is checked. Control signal FLG high indicates that the brightness generator and pipers are executing the first brightness calculation. The program counter is incremented to instructions AE and AF, where control signal FLGR causes control signal FLG to become low, and the program counter is incremented to instruction 7B, bypassing the last phase of brightness calculation. Control signal FLG low indicates that the brightness generator and pipers are in a second or subsequent processing pass, and that DSUM and BSUM values have been collected and processed. The program counter is incremented to instruction 70 in order to complete brightness calculation.

During instruction 70, the status of control signal SHDN is checked. Control signal SHDN high indicates that register SHIFT has completed the required data word bit shifting initiated by instruction 6C. The program counter is incremented to instruction 71.

During instruction 71, control signal MPCC is high, and the value in register SHIFT is copied into register MPC. This transfer places the product of the first two factors of the brightness equation at the B input of MULT 1168.

During instruction 72, control signals WR2 and SHC are high, and the value in register WR2 is copied into register SHIFT. This transfer places the third factor of the brightness equation; namely, WR2, calculated to be one of the 12 values in Table 5, at the A input of MULT 1168.

During instructions 73 through 75, NO-OP instructions are issued to allow the output of MULT 1168 to stabilize.

During instruction 76, control signals MPY and SHC are high, and the A*B output of MULT 1168 is copied into register SHIFT.

When the shifting required by instruction 76 is detected as being complete (instruction 77), the resultant value in register SHIFT is the brightness value for the current piper chute processing pass.

The brightness value in register SHIFT is copied into the ASB register as follows. During instruction 78, control signals SH, BTOS, and ASBC are caused to become high. Control signal SH high causes gate 1170 to become conductive, allowing the value in register SHIFT to be copied onto the I-BUS. The I-BUS is connected to the A-BUS through gate 1188. This gate is normally held conductive by the output of NOR gate 1190 in the absence of either a control signal M or BXFER being high. Thus, since control signals M and BXFER are both low for this instruction, the value on the I-BUS is copied onto the A-BUS. Note that the A-BUS accepts bits 2 through 11 of the I-BUS, thereby truncating the two least significant (unused) bits of the brightness value copied from register SHIFT. Control signal BTOS high causes the B input of adder 1192 to be presented at the adder output A+B (with the addition function inhibited). Control signal ASBC enables the ASB register to receive the A+B output of adder 1192.

During instructions 79 and 7A, the brightness just calculated for the completed chute processing pass, now in the ASB register, is compared to the largest brightness previously found (in register BOLD), and the larger of the two brightness values is retained in register BOLD. Thus, during instruction 79, control signal BXFER is caused to become high. Control signal BXFER high causes gate 1194 to become conductive, thus allowing the complement of the value in register BOLD to be copied onto the A-BUS and thus appear at the B input of adder 1192. Concurrently, control signal BXFER causes the output of NOR gate 1190 to become low, causing gate 1188 to become nonconductive, thus decoupling the I-BUS from the A-BUS. If the addition of the value in register ASB and the complement of the value in register BOLD (i.e., ASB-BOLD) results in a carry bit at bit position 9, true if (and only if) the value in ASB is greater than the value in BOLD, the newly-calculated brightness is greater than any previously-calculated brightness. Consequently, control signal CO, generated by adder 1192, is caused to become high. CO high causes the program counter to be incremented to instruction 7A, which causes the value in register BOLD to be replaced with that in register ASB. If control signal CO is low, indicating that the brightness value in register BOLD is equal to or greater than the brightness value in register ASB, the program counter is incremented to instruction 7B, thus, preserving the brightness value in register BOLD.

During instruction 7A, control signals BOLDC and POSC are caused to become high. Control signal BOLDC high enables register BOLD to receive the output of register ASB. Control signal POSC high enables register POS to receive the value in register LMIN. Register POS now contains the position (MIN) value associated with the just-calculated brightness value.

The B-BUS 1193 in turn is directly connected to the D2 input of register BRBG, see FIG. 10B.

During instruction 7B, control signal CMDCN, generated by register CMIN, is checked. Control signal CMDCN high indicates that a command word exists in register CMIN, and that all data in the piper's chutes have been processed. The program counter is incremented to instruction B3 in preparation for transmitting the highest brightness found and associated position to the microcomputer. Control signal CMDCN low indicates that more noncommand word data remains to be processed, and the program counter is incremented to instruction 7C to continue each processing.

During instruction 7C, control signal BUSY is caused to become low. This allows control signal READY to become high at location E6 (instruction 7D), as previously described, causing the pipers to begin transferring their DSUM and BSUM values to the brightness generator.

During instruction 7D (a READY on wait instruction), control signal READY high indicates that the pipers have completed their piping processing phase (piper instructions 37 through 41), and the program counter is incremented to instruction 7E to begin DSUM and BSUM value collection.

During instruction 7E, control signal GO is caused to become high, enabling each piper in sequence to transmit its DSUM and BSUM values to the brightness generator.

During instruction 7F, control signals M, BTOS, and ASBC are caused to become high. Control signal M high causes gate 1196 to become conductive, allowing the value in register M to be copied onto the A-BUS 1191. Control signal M also causes the output of NOR gate 1190 to become low, causing gate 1188 to become nonconductive and decoupling the I-BUS from the A-BUS. This latter action precludes interference between the value on the I-BUS and the value in register M 1212. The M value is copied into register ASB in preparation for the sequential addition of the BSUMs from the pipers during instructions 89 and 8A.

During instructions 80 and 81, NO-OP instructions are executed to coordinate timing with the just-enabled piper in sending its DSUM and BSUM to the brightness generator.

During instruction 82, control signals ASDWR1, ASDC, and DZS are caused to become high. Control signal ASDWR1 high causes gate 1300 to become conductive, and gate 1141 to become nonconductive, allowing the value in register WR1 to be copied onto the D-BUS, while simultaneously decoupling the A-B output of subtractor 1143 from the D-BUS 1195. The quantity in register WR1 was previously calculated during instructions 0F through 17. Control signal ASDC high enables register ASD to receive the value in register WR1. The value in register WR1 is copied into register ASD in preparation for the sequential subtraction of the DSUMs from pipers at instruction 87. Control signal DZS high causes a binary 1 to be placed into register DZ, thus making its output control signal, DZ, high. This control signal is used in determining the value of control signal EXACT at instruction 8D.

During instruction 83, control signal DV is caused to become low. The purpose of this signal is to synchronize the brightness generator and piper operation at location E8 (instruction 85).

During instruction 84, control signals K, SHC, EX, and EXR are used to store the quantity 1.0 into register SHIFT and a zero in register EXP. This instruction clears register EXP initializing both EXP and SHIFT for the receipt of new data values.

During instruction 85, the status of control signal DV is checked. Concurrently, control signal BRC1 high causes the value on the Data Bus to be copied into register BRBG. The value currently on the Data Bus is the DSUM value of the currently-enabled piper (see piper instructions 43 through 47). The brightness generator detects whether its control signal DV is on. DV on indicates that the currently-enabled piper's DSUM is on the Data Bus and thus now in register BRBG. The program counter is next incremented to instruction 86.

During instruction 86, control signal DV is again caused to become low in order to synchronize the brightness generator and piper operation at location E9 (instruction 88).

During instruction 87, control signal ASDC high enables register ASD to receive the contents of the D-BUS 1195. The D-BUS contains the A-B output of subtracter 1143. At the A input of subtracter 1143, at instruction 86, was the value in register ASD, namely, WR1 (see instruction 82). At the B input of 1143, at instruction 86, was the value in register BRBG. Thus, after instruction 87, register ASD contains the quantity WR1 minus the DSUM of the currently-enabled piper minus the DSUMs of previously-enabled pipers. The quantity in register ASD is placed at input A of subtracter 1143 in preparation for the subtraction of the next DSUM value. When the last piper in the string containing chute data has had its DSUM subtracted from the value in register ASD, the calculation of the first factor of the brightness generator, WR1-SSD is accomplished. During instruction 87, control signal BRO, generated by the BRBG register, is checked. Control signal BRO low indicates that the quantity in register BRBG is not zero. Control signal DZR is thus caused to become high, replacing the binary 1 in register DZ with a 0. In turn, control signal DZ, generated by the register DZ, is caused to become low. At the end of DSUM collection, if all DSUM values received from the pipers were zero, control signal DZ will be high as set in instruction 82. Control signal DZ is a combinatorial input (see FIG. 10C) to the EXACT determination logic circuit.

During instruction 88, the status of control signal DV is checked. This instruction detects the synchronizing DV low control signal generated at instruction 86, and simultaneously uses control signal BRC1 to enable register BRBG to receive the value on the Data Bus. At this point in the synchronized processing of the pipers and the brightness generator, the Data Bus contains the BSUM value of the currently-enabled piper.

During instruction 89, control signal BR high is used to cause the value in register BRBG (BSUM from the currently-enabled piper) to be copied onto the I-BUS through gate 1150. The contents of register BRBG are simultaneously copied onto the A-BUS through gate 1188, which is held conductive by the output of NOR gate 1190. Instruction 89 causes the value in register BRBG to be present at the B input of adder 1192, where it is summed with the current value in register ASB present at the A input of adder 1192.

During instruction 8A, control signal ASBC is high, and thus enables register ASB to receive the A+B output of adder 1192. Register ASB now contains M plus the BSUM of the currently-enabled piper plus the BSUMs of any previously-enabled pipers. When the last piper in the string (see FIG. 6) containing chute data has had its BSUM added to the value in register ASB, the second factor of the brightness equation, M+SSB, is calculated. After instruction 8A, the new value in register ASB is present at input A of adder 1192 ready to be added to the next BSUM value collected during the next execution of instruction 88.

During instruction 8B, the status of control signal READY is checked. READY low indicates that at least one piper is waiting at location E8 with its DSUM value on the Data Bus. The program counter is decremented to instruction 83, and instructions 83 through 8A are executed to collect that piper's DSUM and BSUM values, and subtracting DSUM from the cumulative value in the ASD register while adding BSUM to the cumulative value in the ASB register. READY high indicates that all pipers with chute data have presented their DSUMs and BSUMs to the brightness generator. The program counter is then incremented to instruction 8C.

During instruction 8C, control signal GO is caused to become low to inhibit piper enabling, causing piper processing to halt at locations E12 and E11, or at location E4 if no pipers having NMD commands to process.

During instruction 8D, the status of control signal EXACT is checked. Control signal EXACT is the output of special combinatorial logic (see FIGS. 10A–10C) whose inputs at this point in brightness generator processing detect if the query and data entry being compared are exact matches. Exact matches (i.e., brightness equal to 1.0) are detected with the combinatorial logic. An exact match occurs between a query and entry when both have the same number of events (the quantity ES equals the quantity QS), and when each contains the same event types in the same order (i.e., M=0 and all DSUMs=0), and when all weighting factors are equal to 1 (BSUM=QS). Under these conditions, the status of the control signal input to the EXACT logic are determined as follows. The value M (missing events) equals 0, causing control signal MZ to be high, all collected DSUMs will equal zero (causing control signal DZ to be high), and ES will be equal to QS, causing control signal EQE to be high. Additionally, control signal SUB0 will be high, since the value in ASB will equal QS (there are no missing events and a BSUM value of 1.0 is obtained for each QS event). To obtain the SUB0 input to the EXACT logic, instruction 8D causes control signal ASBS to become high, making gate 1183 conductive. This places the value in the ASB register onto the S-BUS and at the B input to subtracter 1156. Thus, if QS=ASB, then SUB0 will be high. If all of these conditions are true (all indicated control signals high), then control signal EXACT is caused to become high, and the program counter is incremented to B1, bypassing further brightness equation processing. Note that control signal DDA or BDA high overrides their respective associated control signals in determining the status of control signal EXACT. If control signal EXACT is detected as being low, indicating a less than exact match between query and entry, the program counter is incremented to instruction 8E.

During instruction 8E, the status of control signal DDA is checked. If control signal DDA high indicates that the WR1-SSD factor of the brightness equation is not to be used, the program counter is incremented to instruction 95. If control signal DDA is low, indicating that WR1-SSD is to be used, the program counter is incremented to instruction 8F.

During instruction 8F, control signals ASD and SHC are caused to become high. Control signal ASD high causes gate 1145 to become conductive, allowing the value in register ASD to be copied onto the I-BUS. Control signal SHC high enables register SHIFT to receive the value on the I-BUS through gate 1160, which is held conductive by the output of NOR gate 1162.

During instruction 90, the program counter is incremented to instruction 97.

During instruction 95, incremented from instruction 8E when DDA=1, control signals KSEL, K, and SHC are set high, thereby copying the value 1.0 (in floating point format) into register SHIFT. Instruction 95 causes the constant 1.0 to replace the factor QR1-SSD of the brightness equation when the factor is not to be used.

Instruction 96 is a NO-OP instruction included for timing purposes.

During instruction 97, the status of control signal READY is checked. READY high indicates that there are no pipers waiting at instruction E12 to process NMD commands, and the program counter is incremented to instruction 98 to initiate the next minimum MIN determination phase in the pipers. If READY is low, the program counter is incremented to instruction 9D in order to initiate NMD processing in the pipers.

During instruction 9D, control signal ENT is caused to become high, causing the microcomputer to couple with the brightness generator and pipers, as previously described.

During inscruction 9E, the status of control signal ENR is checked. When ENR becomes high, indicating that the microcomputer 1010 is ready to exchange data, the program counter is incremented to instruction 9F.

During instruction 9F, control signal GO is caused to become high, which enables the first piper with an NMD command to being NMD processing at location E12.

During instruction A0, control signal BUSY is caused to become high, causing control signal READY to become low, and thereby causing any pipers not requiring NMD servicing (or that have completed NMD servicing) to wait at location E11 until NMD processing for all pipers is completed.

During instruction A1, a NO-OP command is executed for timing purposes.

During instructions A2 and A3, control signal DV is caused to become low, synchronizing piper operation at location E13 and causing the microcomputer to copy the value on the Data Bus (at this point an NMD command from a piper) into its input register.

Again, the NO-OP command at instruction A4 is for timing. Its positioning between instructions A2 and A3, and instruction A4 does not allow the brightness generator to respond to its own control signal DV, but rather, wait for the DV control signal issued by the microcomputer in response to the CTS control signal issued by the piper whose NMD command the microcomputer has just received. The interposition of instruction A4 has this effect due to the sequential logic through which the received DV signal passes. This logic causes the internal received DV signal to become low (true) one clock period after the external DV signal becomes low (true) and to return to the high (false) state at the beginning of the next clock period regardless of the status of the external DV signal. Thus, the internal DV signal goes low during instruction A3 and then returns high during instruction A4 and is thus high (false) during instruction A5.

During instruction A5, the status of control signal DV is checked while, simultaneously, control signal BRC1 high is used to enable register BRBG to receive the value on the Data Bus. As long as control signal DV remains high, the program counter remains at instruction A5 for each iteration of the instruction. Control signal DV low indicates that the microcomputer has data on the Data Bus in response to the previous control signal CTS low from the currently-enabled piper, and the program counter is incremented to instruction A6.

During instruction A6, control signal BRCMD, generated by register BRBG, is checked. BRCMD high indicates that register BRBG contains a command and is thus the last data word of the current NMD chute refill. The program counter is incremented to instruction A7 to terminate the chute refill loop. If register BRBG contains other than a command (indicating that at least one more chute refill data word remains to be sent by the microcomputer to the currently-enabled piper), the program counter is decremented to instruction A5 to wait for the next control signal DV low from the microcomputer and to copy the accompanying data word into register BRBG.

During instruction A7, control signal ENT is caused to become low. ENT low causes the microcomputer to decouple from the Data Bus.

During instruction A8, control signal GO is caused to become low. Control signal GO low prevents the next piper, or the same piper, with an NMD command, from being enabled, i.e., holds its internal control program at location E12, until communication is reestablished with the microcomputer and the next NMD command is transmitted by the pipers.

During instruction A9, the status of control signal ENR is checked. As long as control signal ENR is high, the program counter increments to instruction AA and then back to instruction A9 to repeat the interrogation of control signal ENT. When control signal ENT is found to be low, indicating that the microcomputer has decoupled from the Data Bus, the program counter is incremented to instruction AB.

During instructions AB and AC, control signal BUSY is caused to become low, causing control signal READY to become high when all pipers have finished NMD command processing. This releases any pipers waiting at location E11 to reenter the minimum MIN determination processing phase. The program counter then decrements to instruction 97.

During instruction 97, the status of control signal READY is checked once again. If pipers remain with NMD commands to service, their BUSY control signals will be high, holding control signal READY low, and the brightness generator reenters the NMD command processing loop at instruction 9D, as described above. If there are no pipers with NMD commands to service, all BUSYs are low, making READY high, and the program counter is incremented to instruction 98. During instruction 98, control signal GO is caused to become high, enabling piper number 1, and thereby causing it to place its MINREG (see FIG. 3B) register contents on the Data Bus to initiate the first step in the new phase of minimum MIN determination (piper control program instructions 2F through 34).

During instructions 99 through 9A, and 61 through 63, the brightness generator returns to brightness equation processing. If control signal BDA is low (instruction 99), the program counter is incremented directly to the next brightness equation multiplication step. If control signal BDA is high, indicating that the M+SSB factor of the brightness equation is not to be used, the constant 1.0 is caused to be copied into register ASB by means of control signals K, BTOS, and ASBC being high (instruction 61). The constant 1.0 replaces the value of M+SSB determined during instructions 86 through 8B. Next to the value in register SHIFT, containing either WR1-SSD or the constant 1.0, as determined during instructions 8E through 90 and 95, is copied into register MPC for presentation at the B input of MULT 1168 by means of control signal MPCC being high (instruction 62). The value in register ASB is next copied into register SHIFT to be later placed at the A input of MULT 1168 (instruction 63). Three clock periods later, the output of MULT 1168 contains the product of the first two factors of the brightness equation, (WR1-SSD) (M-SSB), as determined by the DSUM and BSUM values received from the pipers and the status of control signals DDA and BDA.

Processing now continues with instructions 64 through 7B, as previously described. These instructions multiply the product of the first two brightness equation factors by the third factor, WR2.

During instruction B3, when a command word is found to be in register CMIN, control signal BUSY is caused to become low as an initiating step to prepare for a new chute processing pass.

During instruction B4, control signal BRC2 is caused to become high. Control signal BRC2 high enables the register BRBG to receive the data presented at its D2 input. Bits 0 through 7 of this input are connected directly to the output of register POS, which contains the position of query-to-entry at which the brightness value in register BOLD was calculated (see instructions 78 through 7A). Bits 8 through 14 of the D2 input are connected directly to the output of register BOLD, which contains the highest of the brightnesses calculated in the previous chute processing passes. After instruction B4, this highest brightness and associated position are ready to be transferred to the microcomputer.

To transfer the brightness and position, the brightness generator is coupled to the microcomputer via instructions B5 and B6. The instructions B7 through BB accomplish the transfer as follows. First, the register BRBG output is copied onto the Data Bus using control signal OUTE high (instruction B7). Next, control signal DV is caused to become low for two clock periods to signal the microcomputer that data exists on the bus (instructions B8 and B9). The DV control signal causes the microcomputer to enable it to receive the value on the Data Bus. Instruction BA next causes control signal ENT to become low to initiate the decoupling of the microcomputer from the Data Bus. The extra DV signal during instruction B9, and instruction BA allows two clock periods for the microcomputer to copy the contents of the Data Bus. Instruction BB uses control signal OUTE low to cause the brightness and position information to be decoupled from the Data Bus.

During instruction C2, the status of control signal CMDEOF, generated by register CMIN, is checked. If control signal CMDEOF is high, indicating that the piping data just processed included the last data in the entry file being piped, the program counter is decremented to instruction 01 to begin a new piping cycle. If CMDEOF is low, indicating that more data remains in the current entry file to pipe, the program counter is incremented to instruction C3.

During instruction C3, the status of control signal BLD1, generated by register BOLD, is checked. Control signal BLD1 high indicates that the brightness value is 1.0 (as determined by control signal EXACT), and therefore that no more data in the current entry file need be processed. The program counter is then also decremented to instruction 01. If control signal BLD1 is low, indicating a brightness of less than 1.0, the program counter is incremented to instruction C4.

During instruction C4, register BOLD is cleared to zero using control signal BLDR high. This initializes the register for a new cycle of chute processing and brightness calculation.

During instructions C5 and C6, communication is established with the microcomputer using control signals ENT and ENR high. This sets the stage for piper chute reloading and the reception of new ES, DDA, and M values in preparation for the next piping cycle.

Instruction C7 causes the program counter to be decremented to instruction 0B to begin a new piping cycle that retains the previous QS and PW values.

D. SUMMARY OF THE PREFERRED EMBODIMENT

In summary, there has been disclosed a method utilizing a plurality of processing means such as the processing means 1016. Each processing means comprises a plurality of data stores, for example chutes or storage locations in chute memory 1014. For each data store, there is a corresponding temporary store, for example, a pocket or storage location in the pocket memory 1034. The method determines a particular criterion value, i.e., brightness, and an associated positional value, i.e., the value stored in POS 1202. The criterion value and the associated positional value indicate the degree of match between the juxtaposition of a plurality of event types of a query and a plurality of corresponding event types of a stored data base entry. The method utilizes a priorly-formed array of data values, for example see the data values in Table 2A. Each data value represents the number of event positions between the occurrence of an event type in the query and the occurrence of a corresponding event type in the stored data base. A group of one or more data values is provided for each of a plurality of different query event types. Each different group is stored in a different data store with the data values thereof arranged in a monotonic order from the first end, for example see Table 2A. The method includes the following steps:

Designate in each processing means a data value in each of a plurality of data stores as a first data value, for example, at FIG. 5, instruction 1F, all the TOCPTR registers are set so that they point to the smallest data value in each chute, i.e., the top-of-chute. This is done for each of the data stores in each of the data processing means.

Detect in each processing means at least one of the designated first data values having a predetermined magnitude relative to the other designated first data values in such processing means. For example, during FIG. 5, instructions 1C through 26, the data value at the top of each data store is compared with the data value at the top of each of the other data stores using a MIN logic block 1036 that is coupled to each data store. Once the data store, that is, the storage location in the chute memory is detected, the smallest data value is then copied from the output MINOUT of the MIN finding logic block 1029 onto the IBUS, and subsequently into the MINREG register, (see FIGS. 3A and 3B).

Determining from among the detected values for all of the processing means that detected value which has a predetermined magnitude relative to the others and provide a corresponding determined value. In this regard, during FIG. 5, instructions 68-6E and 2F-34, the MIN value, i.e., the detected value, in each processing means is compared with the MIN value of a next processing means, and the minimum value of such two MIN values is returned to each processing means and placed in their MINREG registers. The foregoing process is repeated, and the value just determined is compared with the value in the BREG register, i.e., BREG presently contains the MIN value of the corresponding processing means, and the minimum value therebetween is returned and copied into the MINREG register of the data processor just tested. At the conclusion of the testing of all processing means, the smallest of the MIN values determined in each processing means will appear in the MINREG register of each processing means.

Storing in each processing means the at least one detected data value in the temporary store which corresponds to the data store in which such detected data value is detected. In this regard, during FIG. 5, instruction 3E, the data value at the top of each data store is compared with the data value in the MINREG register, and during instruction 73, if the values compared during instruction 3E are found to be equal, the data value at the top of the data store is copied onto the IBUS and subsequently to the corresponding pocket POC or storage location in the pocket memory.

Forming in each processing means for each of the individual data stores thereof a first distance value which represents the algebraic difference between the determined data value and the designated data value in such data store. By way of example, during FIG. 5, instructions 38-41 and 73-75, the MINREG register in combination with subtractor 1086 are used to form the algebraic difference, D1, between the detected data value and the data value at the top-of-chute.

Forming in each processing means for each of the individual data stores thereof a second distance value, D2, representing the algebraic difference between the determined data value and a data value in the temporary store corresponding to such individual data store. In this regard, during FIG. 5, instructions 38-41 and 73-75, the MINREG register in combination with subtracter 1088 and the pocket memory 1034 are used to form the algebraic difference between the detected data value in a particular data store and the data value in the corresponding pocket.

Selecting for each processing means for each of the individual data stores a distance value from the corresponding first and second distance values, the selected distance value having a predetermined magnitude relative to the other. To this end during FIG. 5, instructions 38-41 and 73-75, the values D1 and D2 for each particular data store are compared in comparator 1090.

Form in each processing means for a detected data value a sum-of-distance value representing the sum of the absolute values of the selected distance values formed therefrom. In this regard, during FIG. 5, instructions 38-41 and 73-75, the adder register 1060 in combination with subtracter 1088 and subtracter 1086 are used to sum the absolute values of the selected distance values. In this regard, the distance values sequentially determined are in effect summed into the DSUM register 1059.

Designate in each processing means a new data value in the data value store containing the at least one detected data value, and repeating the aforementioned steps using the new data value as a designated data value. In this regard, during FIG. 5, instructions 73 and 74, the TOCPTR register for the data store in which the detected data value was stored, i.e., the smallest data value, is incremented by 1 so that the next data value in the data store is indicated as a new designated data value in the data store.

The determined data values and the corresponding sum-of-distance values provided in each processing means during the aforementioned steps are utilized for deriving such criterion value and positional value. The criterion values are compared to detect the largest criterion value. The actual comparison is accomplished utilizing registers ASB and BOLD, see FIG. 10A.

Additionally, during the step of utilizing, a positional value is provided. The positional value, which is also the detected data value used in the steps discussed above, is stored in register POS (see FIG. 10B).

In each processing means, the data value in the groups are arranged in the monotonic order with the smallest data value as a first data value, and the step of detecting comprising the step of detecting the smallest data value of the first data values. To this end, the output MINOUT of the MIN finding logic block 1029 detects the smallest data value of the first data values.

The step of determining comprises the step of determining the smallest of the designated first data values. To this end, during FIG. 5, instructions 68-6E and 2F-34, the MIN value in each processing means is compared with the MIN value of the other processing means. At the conclusion of the comparison, of all processing means, the smallest value of the MIN determined in each processing means will appear in the MINREG register of each processing means.

The step of selecting comprises the step of selecting the smallest of the first and second distance values. In this regard, comparator 1090 in combination with subtractor 1088 and subtractor 1086 are used to compare the first and second distance values and select the smallest value therefrom.

Each data processor has a store for a pipewidth value PW, and the method includes for each processing means the additional step of detecting a predetermined relation between each algebraic difference used in the step of forming a sum-of-distance value and a value in the pipewidth store. To this end, the selected first or second distance value, i.e., D1 or D2 respectively, is compared in comparator 1092 with the value in the pipewidth value store PW to detect the predetermined relationship therebetween. Operative upon the last step, detection is made to such predetermined relation as to a particular algebraic difference for substituting a predetermined value for such algebraic difference when forming such a sum-of-distance value. To this end, during FIG. 5, instructions 38-41 and 73-75, if the value PW is greater than either the selected first or second distance value, the quantity QS or query size is substituted for the first or second selected distance value.

In each processing means if the formed first distance value represents a value of zero for a particular data store, the designated data value is stored in the temporary store corresponding to such data store, and the next data value in such data store is designated as the first data value. To this end, during FIG. 5, instruction 74, the TOCPTR register is incremented by 1 so that the next data value in the data store is indicated as a first data value. The data processing means includes a store for a positional value wherein for a determined data value a positional value corresponding to the determined data value is stored in the positional value store. To this end, the determined data value is stored in the positional value store POS.

In each processing means, a weighting value is stored in the data store in association with each of said data values, and the method includes the step of combining the weighting values that are associated with the data values that are used in the step of forming a sum-of-distance value and thereby form a sum-of-weighting value. To this end, during FIG. 5, instructions 38-41 and 73-75, adder register 1062 in combination with comparator 1106 and the pocket memory are used in forming a sum-of-weight value in a BSUM register 1061.

In each processing means for each temporary store and corresponding data store which have a data value in the temporary store and a designated first data value of the corresponding group, the method includes the steps of detecting if the distance values formed from the data value in the temporary store and the designated data value of the corresponding group are equal. To this end, comparator 1090 in combination with the pocket memory, MINREG register, and subtracters 1086 and 1088 detect if the first and second distance values are equal. Operative upon the last step, selection is made from the two weighting values that are associated with the two data values which are associated with the two distance values detected to be equal, that weighting value which has a predetermined magnitude relative to the other. To this end, comparator 1106 in combination with the pocket memory select that weighting value which has a predetermined magnitude relative to the other. The selected weighting value is then utilized in the step of combining the weighting values. To this end, adder register 1062 and BSUM register 1061 are used in combining the weighting values.

The step of selecting from the two weighting values comprises the step of selecting the largest weighting value of the two weighting values. In this regard, comparator 1106 is used in the selection of the largest weighting value of the two weighting values.

For a determined data value, the sum-of-distance value and the corresponding sum-of-weighting value formed in each processing means are combined to form a criterion value. In this regard, during FIG. 11, instructions OD-77, register ABS 1210 in combination with adder register 1192, multiplier 1168 and register SHIFT 1169 (see FIG. 10A) are used to form a criterion value.

The processing means includes a store BOLD for a criterion value and for a determined data value, the sum-of-distance value and a corresponding sum-of-weighting value formed in each processing means are combined to form a criterion value. The criterion value replaces a priorly-formed criterion value in the criterion value store if such newly-formed criterion value has a predetermined relation to the value in the criterion value store. To this end, during FIG. 11, instruction 79, the value in the criterion value store is compared with the newly-formed criterion value.

The value in the criterion value store is replaced with the newly-formed criterion value when the newly-formed criterion value exceeds the value in the criterion value store. To this end, during FIG. 11 and instruction 7A, the newly-formed criterion value in register ASB replaces a priorly-formed criterion value in register BOLD. The data processing means includes a store for a positional value, and the value in the positional value is replaced with the positional value corresponding to the detected data value used in forming a criterion value having the predetermined relation to the value in the criterion value store. To this end, during FIG. 11 and instruction 7A, the detected data value stored in register LMIN corresponding to the newly-formed criterion value is transferred into the positional value store POS.

The step of utilizing comprises the step of forming a criterion value B as follows:

Evaluating the equation:

$$B = (QS(QS - M) - SSD)(M + SSB)\frac{MIN(QS,ES)}{MAX(QS,ES)} \cdot \frac{1}{QS^3}$$

Where:

QS = the plurality of events of a query,
ES = the plurality of events of a stored data base entry,
M = the number of events in the query for which at least one corresponding event type is not found in the query,
SSD = is the total of the sum-of-distance values of the data processing means,
SSB = is the total of the sum-of-weighting values of the data processing means,
MAX(QS,ES) = is the larger of QS and ES, and
MIN(QS,ES) = is the smaller of QS and ES.

In this regard, the equation is solved during FIG. 11, instructions OD-78 using the registers and functional blocks shown in FIG. 10A.

The recited steps are repeated until all data values in the data stores and all the processing means have been processed in accordance with the method.

IV. APPENDIX A

| Table No. | Index of Tables |
|---|---|
| 1A | Example of a Layered Data Base |
| 1B | Query-to-Entry Positions and Chute Data Generation |
| 1C | Package Sequence Query |
| 1D | Zero Position of Package Query to Data Base Entry |
| 1E-1D | Package Query Event Number Chute Data Generation |
| 2A-2N | Chute/Pocket Processing Passes 1 through 14 |
| 3 | Terms and Definitions of Control Signals and Registers Used in the Data Processing Means |
| 4 | Piper Instruction Code Program |
| 5 | WR2 Calculation Variable Values vs. DDA and BDA Flags |
| 6 | Brightness Generator Instruction Code Program |

TABLE 1A
EXAMPLE OF A LAYERED DATA BASE

| | | | |
|---|---|---|---|
| SENTENCE LAYER | ENTRY | 1 | 2 |
| | EVENTS | 1 2 3 4 | 1 2 3 4 5 |
| | EVENT TYPE | 1 2 3 4 | 5 6 2 7 8 |
| WORD LAYER | ENTRY | 1  2  3  4  5  6  7  8 | |
| | EVENT | 1 2 3 4 1 2 1 2 3 1 2 3 4 1 2 3 1 2 3 1 2 3 4 1 2 3 4 5 6 7 | |
| | EVENT TYPE | THIS IS THE TIME ONE DAY LIKE ANOTHER | |

TABLE 1C

| PACKAGE SENTENCE QUERY | | |
|---|---|---|
| 1 | 2 | 3 |
| 1/.5 | 6/.8 | 3/.7 |
| 4/.6 | | 8/.5 |

TABLE 1B
QUERY-TO-ENTRY POSITIONS AND CHUTE DATA GENERATION

| ENTRY EVENT: | 1 | 2 | 3 | 4 | 5 |
|---|---|---|---|---|---|
| ENTRY EVENT TYPES: | 32 | 2 | 1 | 8 | 1 |
| QUERY EVENT: | 1 | 2 | 3 | 4 | |
| QUERY EVENT TYPES: | 2 | 8 | 13 | 1 | |

```
                    1   2   3   4   5
                   32   2   1   8   1                         POSITION   CHUTE DATA
   2    8   13     1   .   .   .   .   .   .   .   .   .        -3       CHUTE 1*      1
        2    8    13   1   .   .   .   .   .   .   .   .        -2
             2     8  13   1   .   .   .   .   .   .   .        -1       CHUTE 2**     2
                   2   8  13   1   .   .   .   .   .   .         0
                       2   8  13   1   .   .   .   .   .         1       CHUTE 3***   -1    1
                           2   8  13   1   .   .   .   .         2
                               2   8  13   1   .   .             3
                                   2   8  13   1   .             4       POSITIONS TO BE
                                                                         PROCESSED:
                                                                         -1, 1, and 2
```

*QUERY EVENT TYPE 2
**QUERY EVENT TYPE 8
***QUERY EVENT TYPE 1

TABLE 1D
ZERO POSITION OF PACKAGE QUERY TO DATA BASE ENTRY

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY | | | | | | | | | | | | |

TABLE 1D-continued

ZERO POSITION OF PACKAGE QUERY TO DATA BASE ENTRY

| EVENT TYPES: | 1 | 5 | 37 | 26 | 8 | 3 | 2 | 18 | 21 | 110 | 360 | 87 |
|---|---|---|---|---|---|---|---|---|---|---|---|---|
| PACKAGE QUERY EVENT TYPES: | 21/.6 | 21/.7 | 3/.4 | 110/.2 | 7/.9 | 20/.5 | 110/.1 | 21/.9 | 345/.2 | 19/.7 | 360/.6 | |
| | 8/.5 | 360/.8 | 52/.3 | 360/.5 | 23/.2 | 25/.8 | 360/1 | 36/.2 | 91/.5 | 109/1 | 87/1 | |
| | 95/.6 | 52/.4 | 21/.5 | 19/.8 | 108/.1 | 54/.1 | | 230/.5 | 105/.2 | 7/.9 | 109/.8 | |
| | 101/.1 | 13/.9 | 360/.8 | 109/.8 | | 202/.4 | | 9/.9 | 135/.6 | 10/.5 | 93/1 | |
| | 321/.9 | | 19/.7 | | | | | | 250/.1 | 11/.8 | | |
| | | | 31/.2 | | | | | | | | | |

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | 7 | 205 | 89 | 118 | 130 | 230 | 321 | 345 |

TABLE 1E

PACKAGE QUERY EVENT NUMBER 1 CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | (8) | 4 | 52 | 18 | (21) | 110 | 360 | 87 |

(21/.6) ─ (9 − 1 = 8)
(8/.5) ─ (5 − 1 = 4)

PACKAGE QUERY EVENT TYPES: 95/.6, 101/.1, 321/.9

PIPER 1 CHUTE 1 DATA: 4/.5  8/.6

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | 7 | 205 | 89 | 118 | 130 | 230 | 321 | 345 |

TABLE 1F

PACKAGE QUERY EVENT NUMBER 2 CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | (52) | 18 | (21) | 110 | (360) | 87 |

(21/.7) ─ (9 − 2 = 7)
(360/.8) ─ (11 − 2 = 9)
(52/.4) ─ (7 − 2 = 5)

PACKAGE QUERY EVENT TYPES: 13/.9

PIPER CHUTE 2 DATA: 5/.4  7/.7  9/.8

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | 7 | 205 | 89 | 118 | 130 | 230 | 321 | 345 |

TABLE 1G

PACKAGE QUERY EVENT NUMBER 3 CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | (3) | (2) | 18 | (21) | 110 | (360) | 87 |

(3/.4) ─ (6 − 3 = 3)
(52/.3) ─ (7 − 3 = 4)
(21/.5) ─ (9 − 3 = 6)
(360/.8) ─ (11 − 3 = 8)

(13 − 3 = 10) ─ 19/.7
31/.2

PIPER 1 CHUTE 3 DATA: 3/.4  4/.3  6/.5  8/.8  10/.7

TABLE 1G-continued
PACKAGE QUERY EVENT NUMBER 3
CHUTE DATA GENERATION

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | (19) | 36 | 109 | 6 | 7 | 205 | 89 | 118 | 130 | 230 | 321 | 345 |

TABLE 1H
PACKAGE QUERY EVENT NUMBER 4
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | (110) | (360) | 87 |

PACKAGE QUERY EVENT TYPES:
- (110/.2) — (10 − 4 = 6)
- (360/.5) — (11 − 4 = 7)
- (13 − 4 = 9) — (19/.8)
- (15 − 4 = 11) — (109/.8)

PIPER 1 CHUTE 4 DATA: 6/.2  7/.5  9/.8  11/.8

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | (19) | 36 | (109) | 6 | 7 | 205 | 89 | 118 | 130 | 230 | 321 | 345 |

TABLE 1I
PACKAGE QUERY EVENT NUMBER 5
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

PACKAGE QUERY EVENT TYPES:
- 7/.9 — (17 − 5 = 12)
- 23/.2
- 108/.1

PIPER 1 CHUTE 5 DATA: 12/.9

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | (7) | 205 | 89 | 118 | 130 | 230 | 321 | 345 |

TABLE 1J
PACKAGE QUERY EVENT NUMBER 6
NO MATCHING ENTRY EVENTS

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

PACKAGE QUERY EVENT TYPES (at column 6):
- 20/.5
- 25/.8
- 54/.1
- 202/.4

TABLE 1J-continued

PACKAGE QUERY EVENT NUMBER 6

NO MATCHING ENTRY EVENTS

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | 7 | 205 | 89 | 118 | 130 | 230 | 321 | 345 |

NO MATCHING EVENTS: M = M + 1

TABLE 1K

PACKAGE QUERY EVENT NUMBER 7

CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | (110) | (360) | 87 |

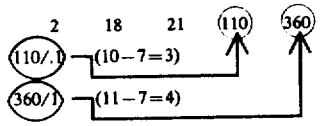

(110/.1) ―(10−7=3)
(360/.1) ―(11−7=4)

PIPER 1 CHUTE 6 BATA: 3/.1  4/1

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | 7 | 205 | 89 | 118 | 130 | 230 | 231 | 345 |

TABLE 1L

PACKAGE QUERY EVENT NUMBER 8

CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | (21) | 110 | 360 | 87 |

(21/.9) ―(9−8=1)
(14−8=6) (36/.2)
(230.5) ―(22−8=14)
9/.9

PACKAGE QUERY EVENT TYPES: PIPER 1 CHUTE 7 DATA: 1/.9  6/.2  14/.5

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | (36) | 109 | 6 | 7 | 205 | 89 | 118 | 130 | (230) | 321 | 345 |

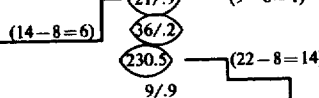

TABLE 1M

PACKAGE QUERY EVENT NUMBER 9

CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

PACKAGE QUERY EVENT TYPES:
- (345/.2) ⟶ (24−9=15)
- 91/.5
- 105/.2
- 135/.6
- 250/.1

PIPER 1 CHUTE 8 DATA: 15/.2

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | 7 | 205 | 89 | 118 | 130 | 230 | 321 | (345) |

TABLE 1N

PACKAGE QUERY EVENT NUMBER 10

CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

PACKAGE QUERY EVENT TYPES:
- (13−10=3) ⟶ (19/.7)
- (15−10=5) ⟶ (109/1)
- (16−10=7) ⟶ (7/.9)
- 10/.5
- 11/.8

PIPER 2 CHUTE 1 DATA: 3/.7 5/1 7/.9

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | (19) | 36 | (109) | 6 | (7) | 205 | 89 | 118 | 130 | 230 | 321 | 345 |

TABLE 10

PACKAGE QUERY EVENT NUMBER 11
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | (360) | (87) |

PACKAGE QUERY EVENT TYPES:

(11−11=0) 360/.6
(15−11=4) 87/1
(12−11=1) 109.8
93/1

PIPER 2 CHUTE DATA: 0/.6  1/1  14/.8

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | (109) | 6 | 7 | 205 | 89 | 118 | 130 | 230 | 321 | 345 |

TABLE 2A

CHUTE/POCKET PROCESSING PASS: 1

| CHUTE/POCKET (CPTR) | POCKETS | 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|
| PIPER 1 | | | | | | | | | | | | | | | | | | |
| 1 | EOC | 4/.5 | 8/.6 | EOC | | | | | | | | | | | | | | (UNDERSCORE INDICATES CURRENT TOP-OF-CHUTE) |
| 2 | EOC | 5/.4 | 7/.7 | 9/.8 | EOC | | | | | | | | | | | | | |
| 3 | EOC | 3/.4 | 4/.3 | 6/.5 | 8/.8 | 10/.7 | EOC | | | | | | | | | | | |
| 4 | EOC | 6/.2 | 7/.5 | 9/.8 | 11/.8 | EOC | | | | | | | | | | | | |
| 5 | EOC | 12/.9 | EOC | | | | | | | | | | | | | | | |
| 6 | EOC | 3/.1 | 4/1 | EOC | | | | | | | | | | | | | | |
| 7 | EOC | 1/.9 | 6/.2 | 14/.5 | EOC | | | | | | | | | | | | | |
| 8 | EOC | 15/.2 | EOC | | | | | | | | | | | | | | | |
| PIPER 2 | | | | | | | | | | | | | | | | | | |
| 1 | EOC | 3/.7 | 5/1 | 7/.9 | EOC | | | | | | | | | | | | | (UNDERSCORE INDICATES CURRENT TOP-OF-CHUTE) |
| 2 | 0/.6 | 0/.6 | 1/1 | 4/.8 | EOD | | | | | | | | | | | | | |
| 3 | EOC | EOC | | | | | | | | | | | | | | | | |
| 4 | EOC | EOC | | | | | | | | | | | | | | | | |
| 5 | EOC | EOC | | | | | | | | | | | | | | | | |
| 6 | EOC | EOC | | | | | | | | | | | | | | | | |
| 7 | EOC | EOC | | | | | | | | | | | | | | | | |
| 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 0 | MINREG = 0 | CANDIDATE BRIGHTNESS (BOLD) = .127995 |
| CPTR = 12345678 | CPTR = 123 | CANDIDATE POSITION (LMIN) = 0 |
| TOCPTR 1 = 1 | TOCPTR 1 = 1 | SELECTED CRITERION BRIGHTNESS (B) = .127995 |
| TOCPTR 2 = 1 | TOCPTR 2 = 12 | SELECTED POSITION (POS) = 0 |
| TOCPTR 3 = 1 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = 1 | TOCPTR 6 = 1 | BDA = 0 |
| TOCPTR 7 = 1 | TOCPTR 7 = 1 | |
| TOCPTR 8 = 1 | TOCPTR 8 = 1 | |
| D1 = 4 3 3 6 12 3 1 15 | D1 = 3 0 | |
| D2 = - - - - - - - - | D2 = - - | |
| DSUM = 4+5+3+6+11+3+1+11=44 | DSUM = 3+0=3 | |
| BSUM = .5+.4+.4+.2+.9+.1+.9+.2=3.6 | BSUM = .7+.6=1.3 | A dash (-) in D1 or D2 indicates that chute (or pocket) contained a command value and thus no difference was formed. |
| QS = 11 | QS = 11 | |
| PW = 9 | PW = 9 | |

TABLE 2B

CHUTE/POCKET PROCESSING PASS: 2

| CHUTE/POCKET (CPTR) | POCKETS | \multicolumn{16}{c}{CHUTES} | CHUTE DATA WORDS (TOCPTR) |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| PIPER 1 | | | | | | | | | | | | | | | | | | |
| 1 | EOC | <u>4/.5</u> | 8/.6 | EOC | | | | | | | | | | | | | | (UNDERSCORE INDICATES CURRENT TOP-OF-CHUTE) |
| 2 | EOC | <u>5/.4</u> | 7/.7 | 9/.8 | EOC | | | | | | | | | | | | | |
| 3 | EOC | <u>3/.4</u> | 4/.3 | 6/.5 | 8/.8 | 10/. | EOC | | | | | | | | | | | |
| 4 | EOC | <u>6/.2</u> | 7/.5 | 9/.8 | 11/.8 | EOC | | | | | | | | | | | | |
| 5 | EOC | <u>12/.9</u> | EOC | | | | | | | | | | | | | | | |
| 6 | EOC | <u>3/.1</u> | 4/1 | EOC | | | | | | | | | | | | | | |
| 7 | 1/.9 | 1/.9 | <u>6/.2</u> | 14/.5 | EOC | | | | | | | | | | | | | |
| 8 | EOC | <u>15/.2</u> | EOC | | | | | | | | | | | | | | | |
| PIPER 2 | | | | | | | | | | | | | | | | | | |
| 1 | EOC | <u>3/.7</u> | 5/1 | 7/.9 | EOC | | | | | | | | | | | | | (UNDERSCORE INDICATES CURRENT TOP-OF-CHUTE) |
| 2 | 1/1 | 0/.6 | 1/1 | <u>4/.8</u> | EOD | | | | | | | | | | | | | |
| 3 | EOC | EOC | | | | | | | | | | | | | | | | |
| 4 | EOC | EOC | | | | | | | | | | | | | | | | |
| 5 | EOC | EOC | | | | | | | | | | | | | | | | |
| 6 | EOC | EOC | | | | | | | | | | | | | | | | |
| 7 | EOC | EOC | | | | | | | | | | | | | | | | |
| 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 1 | MINREG = 1 | CANDIDATE BRIGHTNESS (BOLD) = .151860 |
| CPTR = *1 2 3 4 5 6 7* 8 | CPTR = *1 2* 3 | CANDIDATE POSITION (LMIN) = 1 |
| TOCPTR 1 = 1 | TOCPTR 1 = 1 | SELECTED CRITERION BRIGHTNESS (B) = .151860 |
| TOCPTR 2 = 1 | TOCPTR 2 = *2* 3 | SELECTED POSITION (POS) = 1 |
| TOCPTR 3 = 1 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = 1 | TOCPTR 6 = 1 | BDA = 0 |
| TOCPTR 7 = *1* 2 | TOCPTR 7 = 1 | |
| TOCPTR 8 = 1 | TOCPTR 8 = 1 | |
| D1 = *3 4 2 3 11 2 0* 14 | D1 = 2 0 | |
| D2 = - - - - - - - - | D2 = - 1 | |
| DSUM = 3+4+2+5+11+2+0+11=38 | DSUM = 2+0=2 | |
| BSUM = .5+.4+.4+.2+.9+.1+.9+.2=3.6 | BSUM = .7+1=1.7 | A dash (-) in D1 or D2 indicates that chute (or pocket) contained a command value and thus no difference was formed. |
| QS = 11 | QS = 11 | |
| PW = 9 | PW = 9 | |

TABLE 2C

CHUTE/POCKET PROCESSING PASS: 3

| CHUTE/POCKET (CPTR) | POCKETS | \multicolumn{16}{c}{CHUTES} | CHUTE DATA WORDS (TOCPTR) |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| PIPER 1 | | | | | | | | | | | | | | | | | | |
| 1 | EOC | <u>4/.5</u> | 8/.6 | EOC | | | | | | | | | | | | | | (UNDERSCORE INDICATES CURRENT TOP-OF-CHUTE) |
| 2 | EOC | <u>5/.4</u> | 7/.7 | 9/.8 | EOC | | | | | | | | | | | | | |
| 3 | 3/.4 | 3/.4 | <u>4/.3</u> | 6/.5 | 8/.8 | 10/.7 | EOC | | | | | | | | | | | |
| 4 | EOC | <u>6/.2</u> | 7/.5 | 9/.8 | 11/.8 | EOC | | | | | | | | | | | | |
| 5 | EOC | <u>12/.9</u> | EOC | | | | | | | | | | | | | | | |
| 6 | 3/.1 | 3/.1 | <u>4/1</u> | EOC | | | | | | | | | | | | | | |
| 7 | 1/.9 | 1/.9 | <u>6/.2</u> | 14/.5 | EOC | | | | | | | | | | | | | |
| 8 | EOC | <u>15/.2</u> | EOC | | | | | | | | | | | | | | | |
| PIPER 2 | | | | | | | | | | | | | | | | | | |
| 1 | 3/.7 | 3/.7 | <u>5/1</u> | 7/.9 | EOC | | | | | | | | | | | | | (UNDERSCORE INDICATES CURRENT TOP-OF-CHUTE) |
| 2 | 1/1 | 0/.6 | 1/1 | <u>4/.8</u> | EOD | | | | | | | | | | | | | |
| 3 | EOC | EOC | | | | | | | | | | | | | | | | |
| 4 | EOC | EOC | | | | | | | | | | | | | | | | |
| 5 | EOC | EOC | | | | | | | | | | | | | | | | |
| 6 | EOC | EOC | | | | | | | | | | | | | | | | |
| 7 | EOC | EOC | | | | | | | | | | | | | | | | |
| 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 3 | MINREG = 3 | CANDIDATE BRIGHTNESS (BOLD) = .170145 |
| CPTR = *1 2 3 4 5 6 7 8* | CPTR = *1 2* 3 | CANDIDATE POSITION (LMIN) = 3 |
| TOCPTR 1 = 1 | TOCPTR 1 = *1* 2 | SELECTED CRITERION |

TABLE 2C-continued

CHUTE/POCKET PROCESSING PASS: 3

| | | |
|---|---|---|
| TOCPTR 2 = 1 | TOCPTR 2 = 3 | BRIGHTNESS (B) = .170145 |
| TOCPTR 3 = *1* 2 | TOCPTR 3 = 1 | SELECTED POSITION (POS) = *1* 3 |
| TOCPTR 4 = 1 | TOCPTR 4 = 1 | M = 1 |
| TOCPTR 5 = 1 | TOCPTR 5 = 1 | ES = 24 |
| TOCPTR 6 = *1* 2 | TOCPTR 6 = 1 | DDA = 0 |
| TOCPTR 7 = 2 | TOCPTR 7 = 1 | BDA = 0 |
| TOCPTR 8 = 1 | TOCPTR 8 = 1 | |
| D1 = 1 2 0 3 9 0 3 12 | D1 = *0* 1 | |
| D2 = - - - - - - 2 -- | D2 = - 2 | |
| DSUM = 1+2+0+3+9+0+2+11=28 | DSUM = 0+1=1 | |
| BSUM = .5+.4+.4+.2+.9+.1+.9+.2=3.6 | BSUM = .7+.8=1.5 | A dash (-) in D1 or D2 indicates that chute |
| QS = 11 | QS = 11 | (or pocket) contained a command value and |
| PW = 9 | PW = 9 | thus no difference was formed. |

TABLE 2D

CHUTE/POCKET PROCESSING PASS: 4

| CHUTE/POCKET (CPTR) | POC-KETS | \
CHUTES |||||||||||||||| CHUTE DATA WORDS (TOCPTR) |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| PIPER 1 | | | | | | | | | | | | | | | | | | |
| | 1 | 4/.5 | 4/.5 | <u>8/.6</u> | EOC | | | | | | | | | | | | | (UNDERSCORE INDICATES CURRENT TOP-OF-CHUTE) |
| | 2 | EOC | <u>5/.4</u> | 7/.7 | 9/.8 | EOC | | | | | | | | | | | | |
| | 3 | 4/.3 | 3/.4 | 4/.3 | <u>6/.5</u> | 8/.8 | 10/.7 | EOC | | | | | | | | | | |
| | 4 | EOC | <u>6/.2</u> | 7/.5 | 9/.8 | 11/.8 | EOC | | | | | | | | | | | |
| | 5 | EOC | <u>12/.9</u> | EOC | | | | | | | | | | | | | | |
| | 6 | 4/1 | 3/.1 | 4/1 | <u>EOC</u> | | | | | | | | | | | | | |
| | 7 | 1/.9 | 1/.9 | <u>6/.2</u> | 14/.5 | EOC | | | | | | | | | | | | |
| | 8 | EOC | <u>15/.2</u> | EOC | | | | | | | | | | | | | | |
| PIPER 2 | | | | | | | | | | | | | | | | | | |
| | 1 | 3/.7 | 3/.7 | <u>5/1</u> | 7/.9 | EOC | | | | | | | | | | | | (UNDERSCORE INDICATES CURRENT TOP-OF-CHUTE) |
| | 2 | 4/.8 | 0/.6 | 1/1 | 4/.8 | <u>EOD</u> | | | | | | | | | | | | |
| | 3 | EOC | EOC | | | | | | | | | | | | | | | |
| | 4 | EOC | EOC | | | | | | | | | | | | | | | |
| | 5 | EOC | EOC | | | | | | | | | | | | | | | |
| | 6 | EOC | EOC | | | | | | | | | | | | | | | |
| | 7 | EOC | EOC | | | | | | | | | | | | | | | |
| | 8 | EOC | EOC | | | | | | | | | | | | | | | |

| PIPER 1 REGISTERS | PIPER 2 REGISTERS | BRIGHTNESS GENERATOR REGISTERS |
|---|---|---|
| MINREG = 4 | MINREG = 4 | CANDIDATE BRIGHTNESS (BOLD) = .190254 |
| CPTR = *12345678* | CPTR = *123* | CANDIDATE POSITION (LMIN) = 4 |
| TOCPTR 1 = *1* 2 | TOCPTR 1 = 2 | SELECTED CRITERION BRIGHTNESS (B) = .190254 |
| TOCPTR 2 = 1 | TOCPTR 2 = *3* 4 | SELECTED POSITION (POS) = *3* 4 |
| TOCPTR 3 = *2* 3 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = *2* 3 | TOCPTR 6 = 1 | BDA = 0 |
| TOCPTR 7 = 2 | TOCPTR 7 = 1 | |
| TOCPTR 8 = 1 | TOCPTR 8 = 1 | |
| D1 = 0 1 0 2 8 0 2 11 | D1 = 1 0 | |
| D2 = - - 1 - - 1 3 -- | D2 = . 3 | |
| DSUM = 0+1+0+2+8+0+2+11=24 | DSUM = 1+0=1 | |
| BSUM = .5+.4+.3+.2+.9+1+.2+.2=3.7 | BSUM = 1+.8=1.8 | A dash (-) in D1 or D2 indicates that a chute |
| QS = 11 | QS = 11 | (or pocket) contained a command value and thus |
| PW = 9 | PW = 9 | no difference was formed. |

TABLE 2E

CHUTE/POCKET PROCESSING PASS: 5

| CHUTE/POCKET (CPTR) | POC-KETS | CHUTES |||||||||||||||| CHUTE DATA WORDS (TOCPTR) |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| PIPER 1 | | | | | | | | | | | | | | | | | | |
| | 1 | 4/.5 | 4/.5 | <u>8/.6</u> | EOC | | | | | | | | | | | | | (UNDERSCORE INDICATES CURRENT TOP-OF-CHUTE) |
| | 2 | 5/.4 | 5/.4 | <u>7/.7</u> | 9/.8 | EOC | | | | | | | | | | | | |
| | 3 | 4/.3 | 3/.4 | 4/.3 | <u>6/.5</u> | 8/.8 | 10/.7 | EOC | | | | | | | | | | |
| | 4 | EOC | <u>6/.2</u> | 7/.5 | 9/.8 | 11/.8 | EOC | | | | | | | | | | | |
| | 5 | EOC | <u>12/.9</u> | EOC | | | | | | | | | | | | | | |

TABLE 2E-continued

CHUTE/POCKET PROCESSING PASS: 5

| | | | | | |
|---|---|---|---|---|---|
| 6 | 4/1 | 3/.1 | 4/1 | EOC | |
| 7 | 1/.9 | 1/.9 | 6/.2 | 14/.5 | EOC |
| 8 | EOC | 15/.2 | EOC | | |
| PIPER 2 | | | | | |
| 1 | 5/1 | 3/.7 | 5/1 | 7/.9 | EOC |
| 2 | 4/.8 | 0/.6 | 1/1 | 4/.8 | EOD |
| 3 | EOC | EOC | | | |
| 4 | EOC | EOC | | | |
| 5 | EOC | EOC | | | |
| 6 | EOC | EOC | | | |
| 7 | EOC | EOC | | | |
| 8 | EOC | EOC | | | |

(UNDERSCORE INDICATES CURRENT TOP-OF-CHUTE)

| PIPER 1 REGISTERS | PIPER 2 REGISTERS | BRIGHTNESS GENERATOR REGISTERS |
|---|---|---|
| MINREG = 5 | MINREG = 5 | CANDIDATE BRIGHTNESS (BOLD) = .198416 |
| CPTR = 12345678 | CPTR = 123 | CANDIDATE POSITION (LMIN) = 5 |
| TOCPTR 1 = 2 | TOCPTR 1 = 23 | SELECTED CRITERION BRIGHTNESS (B) = .198416 |
| TOCPTR 2 = 12 | TOCPTR 2 = 4 | SELECTED POSITION (POS) = 5 |
| TOCPTR 3 = 3 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 2 | TOCPTR 7 = 1 | |
| TOCPTR 8 = 1 | TOCPTR 8 = 1 | |
| D1 = 30117-110 | D1 = 0 - | |
| D2 = 1-1--14-- | D2 = 21 | |
| DSUM = 1+0+1+1+7+1+1+11=23 | DSUM = 0+1=1 | |
| BSUM = .5+.4+.5+.2+.9+1+.2+.2=3.9 | BSUM = 1+.8=1.8 | A dash (-) in D1 or D2 indicates that a chute (or pocket) contained a command value and thus no difference was formed. |
| QS = 11 | QS = 11 | |
| PW = 9 | PW = 9 | |

TABLE 2F

CHUTE/POCKET PROCESSING PASS: 6

| CHUTE/POCKET (CPTR) | POC-KETS | CHUTES | | | | | | | | | | | | | | | CHUTE DATA WORDS (TOCPTR) |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| PIPER 1 | | | | | | | | | | | | | | | | | | |
| 1 | 4/.5 | 4/.5 | 8/.6 | EOC | | | | | | | | | | | | | | |
| 2 | 5/.4 | 5/.4 | 7/.7 | 9/.8 | EOC | | | | | | | | | | | | | |
| 3 | 6/.5 | 3/.4 | 4/.3 | 6/.5 | 3/.8 | 10/.7 | EOC | | | | | | | | | | | |
| 4 | 6/.2 | 6/.2 | 7/.5 | 9/.8 | 11/.8 | EOC | | | | | | | | | | | | |
| 5 | EOC | 12/.9 | EOC | | | | | | | | | | | | | | | |
| 6 | 4/1 | 3/.1 | 4/1 | EOC | | | | | | | | | | | | | | |
| 7 | 6/.2 | 1/.9 | 6/.2 | 14/.5 | EOC | | | | | | | | | | | | | |
| 8 | EOC | 15/.2 | EOC | | | | | | | | | | | | | | | |
| PIPER 2 | | | | | | | | | | | | | | | | | | |
| 1 | 5/1 | 3/.7 | 5/1 | 7/.9 | EOC | | | | | | | | | | | | | |
| 2 | 4/.8 | 0/.6 | 1/1 | 4/.8 | EOD | | | | | | | | | | | | | |
| 3 | EOC | EOC | | | | | | | | | | | | | | | | |
| 4 | EOC | EOC | | | | | | | | | | | | | | | | |
| 5 | EOC | EOC | | | | | | | | | | | | | | | | |
| 6 | EOC | EOC | | | | | | | | | | | | | | | | |
| 7 | EOC | EOC | | | | | | | | | | | | | | | | |
| 8 | EOC | EOC | | | | | | | | | | | | | | | | |

(UNDERSCORE INDICATES CURRENT TOP-OF-CHUTE)

| PIPER 1 REGISTERS | PIPER 2 REGISTERS | BRIGHTNESS GENERATOR REGISTERS |
|---|---|---|
| MINREG = 6 | MINREG = 6 | CANDIDATE BRIGHTNESS (BOLD) = .212706 |
| CPTR = 12345678 | CPTR = 123 | CANDIDATE POSITION (LMIN) = 6 |
| TOCPTR 1 = 2 | TOCPTR 1 = 3 | SELECTED CRITERION BRIGHTNESS (B) = .212706 |
| TOCPTR 2 = 2 | TOCPTR 2 = 4 | SELECTED POSITION (POS) = 6 |
| TOCPTR 3 = 34 | TOCPTR 3 = 1 | M = 1 |
| TOCPTR 4 = 12 | TOCPTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 23 | TOCPTR 7 = 1 | |
| TOCPTR 8 = 1 | TOCPTR 8 = 1 | |
| D1 = 21005-0- | D1 = 1- | |
| D2 = 212--239 | D2 = 12 | |
| DSUM = 2+1+0+0+6+2+0+9=20 | DSUM = 1+2=3 | |

TABLE 2F-continued

CHUTE/POCKET PROCESSING PASS: 6

| | | |
|---|---|---|
| BSUM = .6+.7+.5+.2+.9+1+.2+.2=4.3 | BSUM = 1+.8=1.8 | A dash (-) in D1 or D2 indicates that chute |
| QS = 11 | QS = 11 | (or pocket) contained a command value and |
| PW = 9 | PW = 9 | thus no difference was formed. |

TABLE 2G

CHUTE/POCKET PROCESSING PASS: 7

| CHUTE/POCKET (CPTR) | POC- KETS | CHUTES 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|
| PIPER 1 | | | | | | | | | | | | | | | | | | |
| 1 | 4/.5 | 4/.5 | 8/.6 | EOC | | | | | | | | | | | | | | (UNDERSCORE INDICATES CURRENT TOP-OF-CHUTE) |
| 2 | 7/.7 | 5/.4 | 7/.7 | 9/.8 | EOC | | | | | | | | | | | | | |
| 3 | 6/.5 | 3/.4 | 4/.3 | 6/.5 | 8/.8 | 10/.7 | EOC | | | | | | | | | | | |
| 4 | 7/.5 | 6/.2 | 7/.5 | 9/.8 | 11/.8 | EOC | | | | | | | | | | | | |
| 5 | EOC | 12/.9 | EOC | | | | | | | | | | | | | | | |
| 6 | 4/1 | 3/.1 | 4/1 | EOC | | | | | | | | | | | | | | |
| 7 | 6/.2 | 1/.9 | 6/.2 | 14/.5 | EOC | | | | | | | | | | | | | |
| 8 | EOC | 15/.2 | EOC | | | | | | | | | | | | | | | |
| PIPER 2 | | | | | | | | | | | | | | | | | | |
| 1 | 7/.9 | 3/.7 | 5/1 | 7/.9 | EOC | | | | | | | | | | | | | (UNDERSCORE INDICATES CURRENT TOP-OF-CHUTE) |
| 2 | 4/.8 | 0/.6 | 1/1 | 4/.8 | EOD | | | | | | | | | | | | | |
| 3 | EOC | EOC | | | | | | | | | | | | | | | | |
| 4 | EOC | EOC | | | | | | | | | | | | | | | | |
| 5 | EOC | EOC | | | | | | | | | | | | | | | | |
| 6 | EOC | EOC | | | | | | | | | | | | | | | | |
| 7 | EOC | EOC | | | | | | | | | | | | | | | | |
| 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 7 | MINREG = 7 | CANDIDATE BRIGHTNESS (BOLD) = .230303 |
| CPTR = 12345678 | CPTR = 123 | CANDIDATE POSITION (LMIN) = 7 |
| TOCPTR 1 = 2 | TOCPTR 1 = 3-4 | SELECTED CRITERION BRIGHTNESS (B) = .230303 |
| TOCPTR 2 = 23 | TOCPTR 2 = 4 | SELECTED POSITION (POS) = 7 |
| TOCPTR 3 = 4 | TOCPTR 3 = 1 | M = 1 |
| TOCPTR 4 = 23 | TOCPTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = 10105-78 | D1 = 0 - | |
| D2 = 3211-31- | D2 = 23 | |
| DSUM = 1+0+1+0+5+3+1+8=19 | DSUM = 0+3=3 | |
| BSUM = .6+.7+.8+.5+.9+1+.2+.2=4.9 | BSUM = .9+.8=1.7 | A dash (-) in D1 or D2 indicates that chute |
| QS = 11 | QS = 11 | (or pocket) contained a command value and |
| PW = 9 | PW = 9 | thus no difference was formed. |

TABLE 2H

CHUTE/POCKET PROCESSING PASS: 8

| CHUTE/POCKET (CPTR) | POC- KETS | CHUTES 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|
| PIPER 1 | | | | | | | | | | | | | | | | | | |
| 1 | 8/.6 | 4/.5 | 8/.6 | EOC | | | | | | | | | | | | | | (UNDERSCORE INDICATES CURRENT TOP-OF-CHUTE) |
| 2 | 7/.7 | 5/.4 | 7/.7 | 9/.8 | EOC | | | | | | | | | | | | | |
| 3 | 8/.8 | 3/.4 | 4/.3 | 6/.5 | 8/.8 | 10/.7 | EOC | | | | | | | | | | | |
| 4 | 7/.5 | 6/.2 | 7/.5 | 9/.8 | 11/.8 | EOC | | | | | | | | | | | | |
| 5 | EOC | 12/.9 | EOC | | | | | | | | | | | | | | | |
| 6 | 4/1 | 3/.1 | 4/1 | EOC | | | | | | | | | | | | | | |
| 7 | 6/.2 | 1/.9 | 6/.2 | 14/.5 | EOC | | | | | | | | | | | | | |
| 8 | EOC | 15/.2 | EOC | | | | | | | | | | | | | | | |
| PIPER 2 | | | | | | | | | | | | | | | | | | |
| 1 | 7/.9 | 3/.7 | 5/1 | 7/.9 | EOC | | | | | | | | | | | | | (UNDERSCORE INDICATES CURRENT TOP-OF-CHUTE) |
| 2 | 4/.8 | 0/.6 | 1/1 | 4/.8 | EOD | | | | | | | | | | | | | |
| 3 | EOC | EOC | | | | | | | | | | | | | | | | |
| 4 | EOC | EOC | | | | | | | | | | | | | | | | |
| 5 | EOC | EOC | | | | | | | | | | | | | | | | |
| 6 | EOC | EOC | | | | | | | | | | | | | | | | |

TABLE 2H-continued

CHUTE/POCKET PROCESSING PASS: 8

| | | | |
|---|---|---|---|
| 7 | EOC | EOC | |
| 8 | EOC | EOC | |

| PIPER 1 REGISTERS | PIPER 2 REGISTERS | BRIGHTNESS GENERATOR REGISTERS | |
|---|---|---|---|
| MINREG = 8 | MINREG = 8 | CANDIDATE BRIGHTNESS (BOLD) = .236915 | |
| CPTR = 12345678 | CPTR = 123 | CANDIDATE POSITION (LMIN) = 8 | |
| TOCPTR 1 = 23 | TOCPTR 1 = 4 | SELECTED CRITERION BRIGHTNESS (B) = .236915 | |
| TOCPTR 2 = 3 | TOCPTR 2 = 4 | SELECTED POSITION (POS) = 8 | |
| TOCPTR 3 = 45 | TOCPTR 3 = 1 | M = 1 | |
| TOCPTR 4 = 3 | TOCPTR 4 = 1 | ES = 24 | |
| TOCPTR 5 = 1 | TOCPTR 5 = 1 | DDA = 0 | |
| TOCPTR 6 = 3 | TOCPTR 6 = 1 | BDA = 0 | |
| TOCPTR 7 = 3 | TOCPTR 7 = 1 | | |
| TOCPTR 8 = 1 | TOCPTR 8 = 1 | | |
| D1 = 01014-67 | D1 = - - | | |
| D2 = 4121-42- | D2 = 14 | | |
| DSUM = 0+1+0+1+4+4+2+7=19 | DSUM = 1+4=5 | | |
| BSUM = .6+.8+.8+.8+.9+1+.2+.2=5.3 | BSUM = .9+.8=1.7 | A dash (–) in D1 or D2 indicates that chute | |
| QS = 11 | QS = 11 | (or pocket) contained a command value and | |
| PW = 9 | PW = 9 | thus no difference was formed. | |

TABLE 2I

CHUTE/POCKET PROCESSING PASS: 9

| CHUTE/POCKET (CPTR) | POCKETS | | | CHUTES | | | | | | | | | | | | | CHUTE DATA WORDS (TOCPTR) |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| PIPER 1 | | | | | | | | | | | | | | | | | | |
| 1 | | 8/.6 | 4/.5 | 8/.6 | EOC | | | | | | (UNDERSCORE INDICATES CURRENT TOP-OF-CHUTE) | | | | | | |
| 2 | | 9/.8 | 5/.4 | 7/.7 | 9/.8 | EOC | | | | | | | | | | | |
| 3 | | 8/.8 | 3/.4 | 4/.3 | 6/.5 | 8/.8 | <u>10/.7</u> | EOC | | | | | | | | | |
| 4 | | 9/.8 | 6/.2 | 7/.5 | 9/.8 | <u>11/.8</u> | EOC | | | | | | | | | | |
| 5 | | DOC | <u>12/.9</u> | EOC | | | | | | | | | | | | | |
| 6 | | 4/1 | 3/.1 | 4/1 | EOC | | | | | | | | | | | | |
| 7 | | 6/.2 | 1/.9 | 6/.2 | <u>14/.5</u> | EOC | | | | | | | | | | | |
| 8 | | DOC | <u>15/.2</u> | EOC | | | | | | | | | | | | | |
| PIPER 2 | | | | | | | | | | | | | | | | | | |
| 1 | | 7/.9 | 3/.7 | 5/1 | 7/.9 | EOC | | | | | | (UNDERSCORE INDICATES CURRENT TOP-OF-CHUTE) | | | | | | |
| 2 | | 4/.8 | 0/.6 | 1/1 | <u>4/.8</u> | EOD | | | | | | | | | | | |
| 3 | | EOC | EOC | | | | | | | | | | | | | | |
| 4 | | EOC | EOC | | | | | | | | | | | | | | |
| 5 | | EOC | EOC | | | | | | | | | | | | | | |
| 6 | | EOC | EOC | | | | | | | | | | | | | | |
| 7 | | EOC | EOC | | | | | | | | | | | | | | |
| 8 | | EOC | EOC | | | | | | | | | | | | | | |

| PIPER 1 REGISTERS | PIPER 2 REGISTERS | BRIGHTNESS GENERATOR REGISTERS | |
|---|---|---|---|
| MINREG = 9 | MINRG = 9 | CANDIDATE BRIGHTNESS BOLD = .231405 | |
| CPTR = 12345678 | CPTR = 123 | CANDIDATE POSITION (LMIN) = 9 | |
| TOCPTR 1 = 3 | TOCPTR 1 = 4 | SELECTED CRITERION BRIGHTNESS (B) = .236915 | |
| TOCPTR 2 = 34 | TOCPTR 2 = 4 | SELECTED POSITION (POS) = 8 | |
| TOCPTR 3 = 5 | TOCPTR 3 = 1 | M = 1 | |
| TOCPTR 4 = 34 | TOCPTR 4 = 1 | ES = 24 | |
| TOCPTR 5 = 1 | TCOPTR 5 = 1 | DDA = 0 | |
| TOCPTR 6 = 3 | TOCPTR 6 = 1 | BDA = 0 | |
| TOCPTR 7 = 3 | TOCPTR 7 = 1 | | |
| TOCPTR 8 = 1 | TCOPTR 8 = 1 | | |
| D1 = -0103-56 | D1 = - - | | |
| D2 = 1212-53- | D2 = 25 | | |
| DSUM = 1+0+1+0+3+5+3+6=19 | DSUM = 2+5=7 | | |
| BSUM = .6+.8+.8+.8+.9+1+.2+.2=5.3 | BSUM = .9+.8=1.7 | A dash (–) in D1 or D2 indicates that chute | |
| QS = 11 | QS = 11 | (or pocket) contained a command value and | |
| PW = 9 | PW = 9 | thus no difference was formed. | |

TABLE 2J

CHUTE/POCKET PROCESSING PASS: 10

| CHUTE/POCKET | POC- | CHUTES | CHUTE DATA WORDS |
|---|---|---|---|

TABLE 2J-continued

CHUTE/POCKET PROCESSING PASS: 10

| (CPTR) | POCKETS | 1 | 2 | 3 | 4 | 5 | 6 | 7 | 8 | 9 | 10 | 11 | 12 | 13 | 14 | 15 | 16 | (TOCPTR) |
|---|---|---|---|---|---|---|---|---|---|---|---|---|---|---|---|---|---|---|
| PIPER 1 | | | | | | | | | | | | | | | | | | |
| | 1 | 8/.6 | 4/.5 | 8/.6 | EOC | | | | | | | | | | | | | (UNDERSCORE INDICATES TOP-OF-CHUTE) |
| | 2 | 9/.8 | 5/.4 | 7/.7 | 9/.8 | EOC | | | | | | | | | | | | |
| | 3 | 10/.7 | 3/.4 | 4/.3 | 6/.5 | 8/.8 | 10/.7 | EOC | | | | | | | | | | |
| | 4 | 9/.8 | 6/.2 | 7/.5 | 9/.8 | 11/.8 | EOC | | | | | | | | | | | |
| | 5 | EOC | 12/.9 | EOC | | | | | | | | | | | | | | |
| | 6 | 4/1 | 3/.1 | 4/1 | EOC | | | | | | | | | | | | | |
| | 7 | 6/.2 | 1/.9 | 6/.2 | 14/.5 | EOC | | | | | | | | | | | | |
| | 8 | EOC | 15/.2 | EOC | | | | | | | | | | | | | | |
| PIPER 2 | | | | | | | | | | | | | | | | | | |
| | 1 | .7/.9 | 3/.7 | 5/1 | 7/.9 | EOC | | | | | | | | | | | | (UNDERSCORE INDICATES CURRENT TOP-OF-CHUTE) |
| | 2 | 4/.8 | 0/.6 | 1/1 | 4/.8 | EOD | | | | | | | | | | | | |
| | 3 | EOC | EOC | | | | | | | | | | | | | | | |
| | 4 | EOC | EOC | | | | | | | | | | | | | | | |
| | 5 | EOC | EOC | | | | | | | | | | | | | | | |
| | 6 | EOC | EOC | | | | | | | | | | | | | | | |
| | 7 | EOC | EOC | | | | | | | | | | | | | | | |
| | 8 | EOC | EOC | | | | | | | | | | | | | | | |

| PIPER 1 REGISTERS | PIPER 2 REGISTERS | BRIGHTNESS GENERATOR REGISTERS |
|---|---|---|
| MINREG = 10 | MINREG = 10 | CANDIDATE BRIGHTNESS (BOLD) = .225895 |
| CPTR = *1 2 3 4 5 6 7* 8 | CPTR = *1 2* 3 | CANDIDATE POSITION (LMIN) = 10 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = *5* 6 | TOCPTR 3 = 1 | M = 1 |
| TOCPTR 4 = 4 | TOCPTR 4 = 1 | ES = 24 |
| TOCPTR 5 = 1 | TOCPTR 5 = 1 | DDA = 0 |
| TOCPTR 7 = 3 | TOCPTR 7 = 1 | |
| TOCPTR 8 = 1 | TOCPTR 8 = 1 | |
| D1 = - - 0 1 2 - 4 5 | D1 = - - | |
| D2 = 2 1 2 1 - 6 4 - | D2 = 3 6 | |
| DSUM = 2+1+0 1+2+6+4+5=21 | DSUM = 3+6=9 | |
| BSUM = .6+.8+.7+.8+.9+1+.5+.2=5.5 | BSUM = .9+.8=1.7 | A dash (-) in D1 or D2 indicates that chute (or pocket) contained a command value and thus no difference was formed. |
| QS = 11 | QS = 11 | |
| PW = 9 | PW = 9 | |

TABLE 2K

CHUTE/POCKET PROCESSING PASS: 11

| CHUTE/POCKET (CPTR) | POCKETS | 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|
| PIPER 1 | | | | | | | | | | | | | | | | | | |
| | 1 | 8/.6 | 4/.5 | 8/.6 | EOC | | | | | | | | | | | | | (UNDERSCORE INDICATES CURRENT TOP-OF-CHUTE) |
| | 2 | 9/.8 | 5/.4 | 7/.7 | 9/.8 | EOC | | | | | | | | | | | | |
| | 3 | 10/.7 | 3/.4 | 4/.3 | 6/.5 | 8/.8 | 10/.7 | EOC | | | | | | | | | | |
| | 4 | 11/.7 | 6/.2 | 7/.5 | 9/.8 | 11/.8 | EOC | | | | | | | | | | | |
| | 5 | DOC | 12/.9 | EOC | | | | | | | | | | | | | | |
| | 6 | 4/1 | 3/.1 | 4/1 | EOC | | | | | | | | | | | | | |
| | 7 | 6/.2 | 1/.9 | 6/.2 | 14/.5 | EOC | | | | | | | | | | | | |
| | 8 | EOC | 15/.2 | EOC | | | | | | | | | | | | | | |
| PIPER 2 | | | | | | | | | | | | | | | | | | |
| | 1 | 7/.9 | 3/.7 | 5/1 | 7/.9 | EOC | | | | | | | | | | | | (UNDERSCORE INDICATES CURRENT TOP-OF-CHUTE) |
| | 2 | 4/.8 | 0/.6 | 1/1 | 4/.8 | EOD | | | | | | | | | | | | |
| | 3 | EOC | EOC | | | | | | | | | | | | | | | |
| | 4 | EOC | EOC | | | | | | | | | | | | | | | |
| | 5 | EOC | EOC | | | | | | | | | | | | | | | |
| | 6 | DOC | EOC | | | | | | | | | | | | | | | |
| | 7 | EOC | EOC | | | | | | | | | | | | | | | |
| | 8 | EOC | EOC | | | | | | | | | | | | | | | |

| PIPER 1 REGISTERS | PIPER 2 REGISTERS | BRIGHTNESS GENERATOR REGISTERS |
|---|---|---|
| MINREG = 11 | MINREG = 11 | CANDIDATE BRIGHTNESS (BOLD) = .220248 |
| CPTR = *1 2 3 4 5 6 7* 8 | CPTR = *1 2* 3 | CANDIDATE POSITION (LMIN) = 11 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = 6 | TOCPTR 3 = 1 | M = 1 |

TABLE 2K-continued

CHUTE/POCKET PROCESSING PASS: 11

| | | |
|---|---|---|
| TOCPTR 4 = 6 5 | TOCPTR 4 = 1 | ES = 2 4 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = - - - 0 1 - 3 4 | D1 = - - | |
| D2 = 3 2 1 2 - 7 5 - | D2 = 4 7 | |
| DSUM = 3+2+1+0+1+7+3+4=21 | DSUM = 4+7=11 | |
| BSUM = .6+.8+.7+.8+.9+1+.5+.2=5.5 | BSUM = .9+.8=1.7 | A dash (-) in D1 or D2 indicates that chute |
| QG = 11 | QS = 11 | (or pocket) contained a command value and |
| PW = 9 | PW = 9 | thus no difference was fromed |

TABLE 2L

CHUTE/POCKET PROCESSING PASS: 12

| CHUTE/POCKET (CPTR) | POCKETS | \multicolumn{16}{c}{CHUTES} | CHUTE DATA WORDS (TOPCPTR) |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| PIPER 1 | | | | | | | | | | | | | | | | | | |
| 1 | 8/.6 | 4/.5 | 8/.6 | EOC | | | | | | | | | | | | | | (UNDERSCORES INDICATE CURRENT TOP-OF-CHUTE) |
| 2 | 9/.8 | 5/.4 | 7/.7 | 9/.8 | EOC | | | | | | | | | | | | | |
| 3 | 10/.7 | 3/.4 | 4/.3 | 6/.5 | 8/.8 | 10/.7 | EOC | | | | | | | | | | | |
| 4 | 11/.7 | 6/.2 | 7/.5 | 9/.8 | 11/.8 | EOC | | | | | | | | | | | | |
| 5 | 12/.9 | 12/.9 | EOC | | | | | | | | | | | | | | | |
| 6 | 4/1 | 3/.1 | 4/1 | EOC | | | | | | | | | | | | | | |
| 7 | 6/.2 | 1/.9 | 6/.2 | _14/.5_ | EOC | | | | | | | | | | | | | |
| 8 | EOC | _15/.2_ | EOC | | | | | | | | | | | | | | | |
| PIPER 2 | | | | | | | | | | | | | | | | | | |
| 1 | 7/.9 | 3/.7 | 5/1 | 7/.9 | EOC | | | | | | | | | | | | | (UNDERSCORE INDICATES CURRENT TOP-OF-CHUTE) |
| 2 | 4/.8 | 0/.6 | 1/1 | 4/.8 | EOC | | | | | | | | | | | | | |
| 3 | EOC | EOC | | | | | | | | | | | | | | | | |
| 4 | EOC | EOC | | | | | | | | | | | | | | | | |
| 5 | EOC | EOC | | | | | | | | | | | | | | | | |
| 6 | EOC | EOC | | | | | | | | | | | | | | | | |
| 7 | EOC | EOC | | | | | | | | | | | | | | | | |
| 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 12 | MINREG = 12 | CANDIDATE BRIGHTNESS (BOLD) = .206405 |
| CPTR = _1 2 3 4 5 6 7 8_ | CPTR = _1 2 3_ | CANDIDATE POSITION (LMIN) = 12 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = 6 | TOCPTR 3 = 1 | M = 1 |
| TOCPTR 4 = 5 | TOCPTR 4 = 1 | ES = 24 |
| TOCPTR 5 = _1 2_ | TOCPTR 5 = 1 | DDA = 0 |
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = - - - - 0 - 2 3 | D1 = - - | |
| D2 = 4 3 2 1 - 8 6 - | D2 = 5 8 | |
| DSUM = 4+3+2+1+0+8+2+3=23 | DSUM = 5+8=13 | A dash (-) in D1 or D2 indicates that chute |
| BSUM = .6+.8+.7+.7+.9+.1+.5+.2=5.4 | BSUM = .9+.8=1.7 | (or pocket) contained a command value and |
| QS = 11 | QS = 11 | thus no difference was formed. |
| PW = 9 | PW = 9 | |

TABLE 2M

CHUTE/POCKET PROCESSING PASS: 13

| CHUTE/POCKET (CPTR) | POCKETS | \multicolumn{16}{c}{CHUTES} | CHUTE DATA WORDS (TOCPTR) |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| PIPER 1 | | | | | | | | | | | | | | | | | | |
| 1 | 8/.6 | 4/.5 | 8/.6 | EOC | | | | | | | | | | | | | | (UNDERSCORES INDICATE CURRENT TOP-OF-CHUTE) |
| 2 | 9/.8 | 5/.4 | 7/.7 | 9/.8 | EOC | | | | | | | | | | | | | |
| 3 | 10/.7 | 3/.4 | 4/.3 | 6/.5 | 8/.8 | 10/.7 | EOC | | | | | | | | | | | |
| 4 | 11/.7 | 6/.2 | 7/.5 | 9/.8 | 11/.8 | EOC | | | | | | | | | | | | |
| 5 | 12/.9 | 12/.9 | EOC | | | | | | | | | | | | | | | |
| 6 | 4/1 | 3/.1 | 4/1 | EOC | | | | | | | | | | | | | | |
| 7 | 6/.2 | 1/.9 | 6/.2 | 14/.5 | EOC | | | | | | | | | | | | | |

TABLE 2M-continued

CHUTE/POCKET PROCESSING PASS: 13

```
    8       EOC   15/.2  EOC
PIPER 2
    1       7/.9  3/.7   5/1   7/.9  EOC         (UNDERSCORE INDICATES CURRENT
    2       4/.8  0/.6   1/1   4/.8  EOC                  TOP-OF-CHUTE)
    3       EOC   EOC
    4       EOC   EOC
    5       EOC   EOC
    6       EOC   EOC
    7       EOC   EOC
    8       EOC   EOC
```

| PIPER 1 REGISTERS | PIPER 2 REGISTERS | BRIGHTNESS GENERATOR REGISTERS |
|---|---|---|
| MINREG = 14 | MINREG = 14 | CANDIDATE BRIGHTNESS (BOLD) = .172934 |
| CPTR = 1 2 3 4 5 6 7 8 | CPTR = 1 2 3 | CANDIDATE POSITION (LMIN) = 13 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = 6 | TOCPTR 3 = 1 | M = 1 |
| TOCPTR 4 = 5 | TOCPTR 4 = 1 | ES = 24 |
| TOCPTR 5 = 2 | TOCPTR 5 = 1 | DDA = 0 |
| TOCPTR 6 = 3 | TOCPTR 6 = 1 | BDA = 0 |
| TOCPTR 7 = 3 4 | TOCPTR 7 = 1 | |
| TOCPTR 8 = 1 | TOCPTR 8 = 1 | |
| D1 = - - - - - - 0 1 | D1 = - - | |
| D2 = 6 5 4 3 2 10 8 - | D2 = 7 10 | |
| DSUM = 6+5+4+3+2+10+0+1=31 | DSUM = 7+10=17 | A dash (-) in D1 or D2 indicates that chute |
| BSUM = .6+.8+.7+.7+.9+.1+.5+.2=5.4 | BSUM = .9+.8=1.7 | (or pocket) contained a command value and |
| QS = 11 | QS = 11 | thus no difference was formed. |
| PW = 9 | PW = 9 | |

TABLE 2N

CHUTE/POCKET PROCESSING PASS: 14

| CHUTE/POCKET (CPTR) | POC-KETS | \multicolumn{16}{c}{CHUTES} | CHUTE DATA WORDS (TOCPTR) |
|---|---|---|---|

```
CHUTE/POCKET   POC-                         CHUTES                              CHUTE DATA WORDS
   (CPTR)      KETS  1     2     3     4     5     6     7   8   9  10 11 12 13 14 15 16    (TOCPTR)
PIPER 1
   1                 8/.6  4/.5  8/.6  EOC                                             (UNDERSCORES INDICATE CURRENT
   2                 9/.8  5/.4  7/.7  9/.8  EOC                                              TOP-OF-CHUTE)
   3                10/.7  3/.4  4/.3  6/.5  8/.8  10/.7 EOC
   4                11/.7  6/.2  7/.5  9/.8  11/.8 EOC
   5                12/.9 12/.9  EOC
   6                 4/1   3/.1  4/1   EOC
   7                14/.5  1/.9  6/.2  14./5 EOC
   8                15/.2 15/.2  EOC
PIPER 2
   1                 7/.9  3/.7  5/1   7/.9  EOC         (UNDERSCORE INDICATES CURRENT
   2                 4/.8  0/.6  1/1   4/.8  EOD                  TOP-OF-CHUTE)
   3                 EOC   EOC
   4                 EOC   EOC
   5                 EOC   EOC
   6                 EOC   EOC
   7                 EOC   EOC
   8                 EOC   EOC
```

| PIPER 1 REGISTERS | PIPER 2 REGISTERS | BRIGHTNESS GENERATOR REGISTERS |
|---|---|---|
| MINREG = 15 | MINREG = 15 | CANDIDATE BRIGHTNESS (BOLD) = .150620 |
| CPTR = 1 2 3 4 5 6 7 8 | CPTR = 1 2 3 | CANDIDATE POSITION (LMIN) = 15 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = 6 | TOCPTR 3 = 1 | M = 1 |
| TOCPTR 4 = 5 | TOCPTR 4 = 1 | ES = 24 |
| TOCPTR 5 = 2 | TOCPTR 5 = 1 | DDA = 0 |
| TOCPTR 6 = 3 | TOCPTR 6 = 1 | BDA = 0 |
| TOCPTR 7 = 4 | TOCPTR 7 = 1 | |
| TOCPTR 8 = 1 | TOCPTR 8 = 1 | |
| D1 = - - - - - - - 0 | D1 = - - | |
| D2 = 7 6 5 4 3 11 1 - | D2 = 8 11 | |
| DSUM = 7+6+5+4+3+11+1+0=37 | DSUM = 8+11=19 | A dash (-) in D1 or D2 indicates that chute |
| BSUM = .6+.8+.7+.7+.9+.1+.5+.2=5.4 | BSUM = .9+.8=1.7 | (or pocket) contained a command value and |
| QS = 11 | QS = 11 | thus no difference was formed. |

TABLE 2N-continued

CHUTE/POCKET PROCESSING PASS: 14

| PW = 9 | PW = 9 |
|---|---|

TABLE 3

| TERM | DEFINITION |
|---|---|
| ASB | Register in which brightness partial sums (BSUMs) are collected from the pipers and added to the number of missing events, M, as they are received to produce the quantity M + SSB (where SSB = BSUM1 + ... + BSUMN). Also used to store current brightness score. |
| ASD | Register in which distant partial sums (DSUMs) are collected from the pipers and subtracted from WR1 as they are received to produce the quantity WR1 − SSD (where SSD = DSUM1 + DSUM2 + ... + DSUMN). |
| BCF | Brightness Correction Factor. A factor used in the brightness equation to correct the brightness obtained for a current query/entry pair by the average prior brightness value associated with the piping of the query on the previous level. |
| BDA | Brightness Disable Flag. When set by the external processor, indicates that the (M + SSB)/QS portion of the brightness equation is to be set to 1.0. |
| Bi | Brightness value register whose content is to be summed in BSUM. Output of piping logic block. |
| BOLD | Register containing the largest brightness value thus far found on any chute processing pass of a given piping cycle. When all chutes have been processed, contains the largest brightness obtainable for a given query/entry pair; i.e., the brightness corresponding to the position of best fit of query and entry. |
| BREG | Interface register for both incoming and outgoing information on the data bus. |
| BRIGHTNESS (B) | One of two fields in a chute data word; specifically, bits 8–14. |
| BSUM | Sum-of-brightnesses register (10 bits). |
| BUSY | An internal signal that, when on, holds the common RDY line off, thus preventing any array pipers from entering their next operational phase until the "slowest" piper or the brightness generator has finished its present processing segment. |
| CARRY | An internal signal set when a piper wishes to enable other pipers in the system; i.e., works in conjunction with LAST to control COUT. |
| CHUTE ARRAY | A set of eight memories called chutes. Each chute contains 16 words of 16 bits each. The chute is addressed by CPTR, and each word within the chute is addressed by TOCPTR. |
| CHUTE PROCESSING | The sequence of microinstructions required to obtain a brightness |

TABLE 3-continued

| TERM | DEFINITION |
|---|---|
| PASS | score for one set of top-of-chute values at a given relative position of query-to-entry. |
| CI1, CI2, CI3 (CARRY IN) | Three input signals which, when all three are on, fulfills the necessary preconditions for a piper enabled condition. |
| CMIN | Register CMIN contains the current MIN value as determined by the minimum MIN determination processing and stored in the MINREG register of all active pipers. This value represents the relative position of query-to-entry associated with the current set of top-of-chute values. |
| COMMAND (CMD) | A chute or bus data word with bit 15 = 1. There are four such command words. EOC (End-of-Chute), EOD (End-of-Data), EOF (End-of-File) and NMD (Need-More-Data). |
| COUT (CARRY OUT) | An enabling signal sent from one piper to subsequent pipers "below" it on the data bus. COUT = CARRY.LAST. |
| CPTR (CHUTE POINTER) | A register used to address the chute array. CPTR holds the number of the chute being accessed; i.e., 0–7. |
| CTS (CLEAR TO SEND) | A signal that indicates to the external processor that the piping array is ready for more data. |
| DDA | Distance Disable Flag. When set by the external processor, indicates that the $(WR1 - SD)/QS^2$ portion of the brightness equation is to be set to 1.0. |
| Di | Difference value register, whose content is to be summed in DSUM. Output of piping logic block. |
| DISCONNECT | An acknowledgement that a logical communication link no longer exists between the external processor and the piping array; i.e., the external processor will not use the bus while a disconnect is in force. This frees the bus for communication between the pipers and the brightness generator. A disconnect is achieved when both the ENT and ENR lines are off. |
| DISTANCE (D) | One of two fields in a chute data word; specifically, bits 0–7. |
| DSUM | Sum-of-distances determined by each piper for the current set of top-of-chute values in relation to the current MIN value. |
| DTAF | A signal that indicates in which mode, fixed or floating, a quantity is to be transferred into shift register SHIFT. DTAF = 0 indicates a floating mode transfer; DTAF = 1 indicates a fixed mode transfer. |
| DV (DATA VALID) | A signal line connected to all elements of the piping array and the external processor that, when turned on by the brightness |

TABLE 3-continued

| TERM | DEFINITION |
|---|---|
| | generator or external processor, signals the elements waiting for the DV on signal that valid data exists on the bus, or that data which the waiting element has placed on the bus has been read. |
| DZ | A flag that, when set indicates, that the sum of all DSUM values received from the pipers is zero; i.e., SSD = 0. |
| ENABLED | An internal piper state. A piper is said to be enabled with all CARRY IN inputs (CI1, CI2, CI3) are on, and its CARRY is off. |
| E1-E14 | Corresponding points in the microinstruction sets of both the brightness generator and the pipers where piping array processing is resynchronized after a period of asynchronous operation. |
| E1-E14 | Corresponding points in the microinstruction sets of both the brightness generator and the pipers where piping array processing is resynchronized after a period of asynchronous operation. |
| ENR ON (RECEIVE ENABLE) | An input from the external processor to the brightness generator indicating that the external processor is prepared to send data to, or received data from, the piping array (opposite of the disconnect condition). |
| ENT ON (TRANSMIT ENABLE) | An output from the brightness generator to the external processor to signal the external processor to establish communication by sending an ENR ON in response. |
| EOC (END-OF-CHUTE) | A command word that, when encountered at the top of a chute, indicates that no more data exists in a particular chute. |
| EOD (END-OF-DATA) | A command word that signals the end of a chute data for a particular data base entry. |
| EOF (END-OF-FILE) | A command word that signals the end of data base entries for a particular piping cycle. |
| EQE | A flag that, when set, indicates that ES = QS. |
| ES | Entry size; the number of events that make up the data base entry currently being piped. |
| EXACT | A signal that, when TRUE, indicates that the current query and entry being piped are exact matches. |
| EXP | Exponent Register. Contains the adjusted algebraic sum of the exponents of the two factors of a floating point product. Correctly locates the binary point of a floating point number. |
| EXTERNAL PROCESSOR | A software-controlled computer system that supplied chute data to the pipers, receives brightness and position data from the brightness generator, and controls piping array initialization. |
| FLG | A flag that, when set, indicates that the chute processing pass just completed was the first pass for a particular piping cycle. |
| GO | An output used by the brightness generator to activate "look ahead" enabling of the pipers. |
| LAST | An internal flag which, when on, indicates that this is the last piper in line holding valid chute data (see COUT). |
| LCF | Length Correction Factor. A factor used in brightness equation that corrects the brightness obtained by the ratio of query-to-entry length. |
| LMIN | A register used to hold the CMIN value used in the just-completed chute processing pass. |
| L1-L16 | Points in the piper logic design designating the first microinstruction following an entry point in the logic flow where processing control reenters the microinstruction sequence from a processing loop or a return. |
| L1-L37 | Points in the brightness generator logic diagram designating the first microinstruction following an entry point in the logic flow where processing control reenters the microinstruction sequence from a processing loop or a return. |
| M | The number of missing events; i.e., the number of events in the query that are not in the entry. Also the name of the register containing the quantity M. |
| MIN | See CMIN. |
| MINREG | A register holding the MIN value established by minimum MIN determination processing as being the smallest MIN value existing in the piping array (i.e., across all active pipers) on a given chute processing pass. |
| MPC | Multiplicand Register. Holds one of two numbers (input B) to be multiplied in MPX. |
| MPX | Eight-bit by eight-bit multiplier. |
| MULT | Output of MPX containing the product of the values in MPC and the lower eight bits of SHIFT. |
| NMD (NEED-MORE-DATA) | A command word indicating that more chute data exists in the external processor for a particular chute. When sent to the external processor, results in more chute data being sent for the chute containing the NMD. |
| PARTIAL BRIGHTNESS SUM | The sum-of-brightness (BSUM) for one chute processing pass in a given piper. |
| PARTIAL DISTANCE SUM | The sum-of-distances (DSUM) for one chute processing pass for a given piper. |
| PIPING CYCLE | The piping array microinstruction sequence required to determine the position of best fit of a particular query and entry, along with the concomitant brightness score. Consists of one or more chute processing passes. |
| POCKET MEMORY | An eight-word memory. Each word, called a pocket, is associated with a particular chute of the chute array. Each pocket is 16 bits wide. |
| POP FLAG | An internal indicator set by the piping logic indicating that the top-of-chute being |

TABLE 3-continued

| TERM | DEFINITION |
|---|---|
| | examined by the piping logic must be "popped", or transferred, into its corresponding pocket. |
| POS | Register containing the position of best fit for a given query and entry. |
| POSITION | The relative position of an entry vis-a-vis a query at which a brightness is being determined from the associated top-of-chute values on a given chute processing pass. |
| POR | Power On Reset. Resets the piping array for a new piping cycle. |
| PW (PIPEWIDTH) | A seven-bit binary constant used by the piping logic. |
| QS | Query Size. The number of events in a query. |
| RDY (READY) | A line which, when off, indicates that at least one piper or the brightness generator has not completed a particular processing sequence (see BUSY). |
| RST (RESET) | A line which, when turned on by the brightness generator, forces all pipers to reinitialize and disables all piper bus output drivers. |
| SHIFT | A shift register used with EXP for changing the data to fixed or floating point formats. The lower eight bits serve as the A input to MPX. |
| SHF | A flag that, when set, indicates that data in the SHIFT/EXP register set will be adjusted to the floating point format and transferred out as such; otherwise, the data will be adjusted to fixed point format and transferred out as such. |
| SSB | The sum-of-brightness (BSUMs) sent by the pipers. This quantity does not exist independently in the machine except by implication in register ASB as the quantity M + SSB. |
| SSD | The sum-of-distances (DSUMs) sent by the pipers. This quantity does not exist independently in the brightness generator except by implication in register ASD as the quantity WR1 − SSD. |
| TOCPTR (TOP-OF-CHUTE POINTER) | A counter register associated with each chute that indicates the location of the current top-of-chute within each chute. |
| TOP-OF-CHUTE (TOC) | The word in each chute currently being addressed by the TOCPTR associated with that chute. The complete address of a particular TOC is TOC(TOCPTR)(CPTR). |
| TOP-OF-CHUTE VALUES | Those values at a given position (MIN) used to derive DSUM and BSUM in a given piper on a particular chute processing pass. |
| OUTE | An internal signal that, when on, connects bus register BREG to the bus (tristate output). |
| WR1 | A brightness equation term equal to QS(QS − M). |
| WR2 | A brightness equation term equal to $LCF/QS^3$ as modified by the effect of flags DDA and BDA. |

TABLE 4

PIPER INSTRUCTION CODE PROGRAM

| INSTRUCTION NUMBER | SUBROUTINE ENTRY POINT | INSTRUCTION | |
|---|---|---|---|
| 0000 | L1: | CLR | CPTR |
| 0001 | | CLR | CARRY |
| 0002 | | CLR | BUSY |
| 0003 | | WAIT | DVBREG |
| 0004 | | MOVE | QS,BREG |
| 0005 | L2: | CLR | ALLTOC |
| 0006 | | CLR | LAST |
| 0007 | L3: | MOVE | POCTOC,EOC |
| 0008 | | SUM | CPTR |
| 0009 | | MOVE | POCTOC,EOC |
| 000A | | SUM | CPTR |
| 000B | | MOVE | POCTOC,EOC |
| 000C | | SUM | CPTR |
| 000D | | MOVE | POCTOC,EOC |
| 000E | | SUM | CPTR |
| 000F | | MOVE | POCTOC,EOC |
| 0010 | | SUM | CPTR |
| 0011 | | MOVE | POCTOC,EOC |
| 0012 | | SUM | CPTR |
| 0013 | | MOVE | POCTOC,EOC |
| 0014 | | SUM | CPTR |
| 0015 | | MOVE | POCTOC,EOC |
| 0016 | | CLR | CPTR |
| 0017 | | WAIT | ENABLE |
| 0018 | | SETF | BUSY |
| 0019 | L4: | WAIT | DVTOC |
| 001A | | JPNC | BRCMD,L4 |
| 001B | | JPNC | CPTR7,L4 |
| 001C | | JPNC | BREOD,L5 |
| 001D | | SETF | LAST |
| 001E | L5: | SETF | CARRY |
| 001F | | CLR | ALLTOC |
| 0020 | | NOOP | |
| 0021 | | CLR | BUSY |
| 0022 | | WAIT | RDY |
| 0023 | | CLR | CARRY |
| 0024 | | CLR | CPTR |
| 0025 | | CLR | SD |
| 0026 | | CLR | SB |
| 0027 | | MOVE | MINREG,MIN |
| 0028 | | MOVE | BREG,MINREG |
| 0029 | | WAIT | RDY |
| 002A | | GOTO | L6 |
| 002B | | NOOP | |
| 002C | | NOOP | |
| 002D | | NOOP | |
| 002E | | NOOP | |
| 002F | L7: | WAIT | DVBREG |
| 0030 | | JPNC | BRLEMR,L8 |
| 0031 | | CLR | BUSY |
| 0032 | | SETF | CARRY |
| 0033 | | MOVE | MINREG,BREG |
| 0034 | L9: | JPNC | RDY,L7 |
| 0035 | | CLR | CARRY |
| 0036 | | JPNC | MNCMD,L2 |
| 0037 | | SETF | BUSY |
| 0038 | L13: | JPNC | POCM,L10 |
| 0039 | | NOOP | |
| 003A | | NOOP | |
| 003B | | NOOP | |
| 003C | | NOOP | |
| 003D | | SUM | SB |
| 003E | | JPNC | POPOFF,L11 |
| 003F | | SUM | SD |
| 0040 | L12: | JPNC | CPTR7,L13 |
| 0041 | L10: | CLR | BUSY |
| 0042 | | WAIT | RDY |
| 0043 | | MOVE | BREG,SD |
| 0044 | | SETF | BUSY |
| 0045 | | WAIT | ENABLE |
| 0046 | | SETF | OUTE |
| 0047 | | CLR | SD |
| 0048 | | WAIT | DV |
| 0049 | | MOVE | BREG,SB |
| 004A | | NOOP | |
| 004B | | CLR | BUSY |
| 004C | | SETF | CARRY |

TABLE 4-continued
PIPER INSTRUCTION CODE PROGRAM

| INSTRUCTION NUMBER | SUBROUTINE ENTRY POINT | INSTRUCTION | |
|---|---|---|---|
| 004D | | CLR | OUTE |
| 004E | | WAIT | RDY |
| 004F | | CLR | CARRY |
| 0050 | | SETF | BUSY |
| 0051 | L14: | JPNC | NMD,L15 |
| 0052 | | MOVE | BREG,TOC |
| 0053 | | WAIT | ENABLE |
| 0054 | | SETF | OUTE |
| 0055 | | CLR | TOCPTR |
| 0056 | | WAIT | DV |
| 0057 | | CLR | OUTE |
| 0058 | L16: | WAIT | DVTOC |
| 0059 | | JPNC | BRCMD,L16 |
| 005A | | CLR | TOCPTR |
| 005B | | GOTO | L4 |
| 005C | | NOOP | |
| 005D | | NOOP | |
| 005E | | NOOP | |
| 005F | | NOOP | |
| 0060 | L15: | CLR | BUSY |
| 0061 | | SETF | CARRY |
| 0062 | | CLR | SB |
| 0063 | | WAIT | RDY |
| 0064 | | CLR | CARRY |
| 0065 | | MOVE | MINREG,MIN |
| 0066 | L8: | MOVE | BREG,MINREG |
| 0067 | L6: | SETF | BUSY |
| 0068 | | JPNC | ENABLE,L7 |
| 0069 | | SETF | OUTE |
| 006A | | CLR | BUSY |
| 006B | | WAIT | DV |
| 006C | | SETF | CARRY |
| 006D | | CLR | OUTE |
| 006E | | GOTO | L9 |
| 006F | | NOOP | |
| 0070 | | NOOP | |
| 0071 | | NOOP | |
| 0072 | | NOOP | |
| 0073 | L11: | MOVE | POC,TOC |
| 0074 | | JPNC | BRCMD,L12 |
| 0075 | | GOTO | L22 |

TABLE 5

| DDA | BDA | ES = QS | QS < ES | ES < QS |
|---|---|---|---|---|
| 0 | 0 | $\frac{1}{QS^3}$ | $\frac{1}{(ES)(QS)^2}$ | $\frac{ES}{QS^4}$ |
| 0 | 1 | $\frac{1}{QS^2}$ | $\frac{1}{(ES)(QS)}$ | $\frac{ES}{QS^3}$ |
| 1 | 0 | $\frac{1}{QS}$ | $\frac{1}{ES}$ | $\frac{ES}{QS^2}$ |
| 1 | 1 | 1 | $\frac{QS}{ES}$ | $\frac{ES}{QS}$ |

TABLE 6
BRIGHTNESS GENERATOR CODE PROGRAM

| INSTRUCTION NUMBER | SUBROUTINE ENTRY POINT | INSTRUCTION | |
|---|---|---|---|
| 0000 | L1: | CLR | GO |
| 0001 | L2: | SETF | RESET |
| 0002 | | SETF | RESET |
| 0003 | | SETF | RESET |
| 0004 | | CLR | BUSY |
| 0005 | | SETF | FLG |
| 0006 | | CLR | BOLD |
| 0007 | | SETF | ENT |
| 0008 | L3: | JPNC | ENR,L3 |
| 0009 | | WAIT | DV |
| 000A | | MOVE | QS,BRBG |

TABLE 6-continued
BRIGHTNESS GENERATOR CODE PROGRAM

| INSTRUCTION NUMBER | SUBROUTINE ENTRY POINT | INSTRUCTION | |
|---|---|---|---|
| 000B | L4: | WAIT | DV |
| 000C | | JPNC | BREOF,L5 |
| 000D | | SETF | GO |
| 000E | | MOVE | ES,BRBG |
| 000F | | SHIFT | QSM,1,1,0 |
| 0010 | | SHIFT | QSM,1,1,0 |
| 0011 | | MOVE | MPC,SHFT |
| 0012 | | SHIFT | QS,1,1,0 |
| 0013 | | NOOP | |
| 0014 | | NOOP | |
| 0015 | | SETF | BUSY |
| 0016 | | SHIFT | MULT,1,1,0 |
| 0017 | | MOVE | WR1,SHFT |
| 0018 | | JPNC | QSESLZ,L6 |
| 0019 | | SETF | ESDIV |
| 001A | | SETF | ESDIV |
| 001B | | MOVE | WR2,NDIV |
| 001C | | JPNC | DDAZ,L9 |
| 001D | | SHIFT | WR2,0,0,0 |
| 001E | | MOVE | MPC,SHFT |
| 0019 | L8: | SHIFT | NDIV,0,0,0 |
| 0020 | | NOOP | |
| 0021 | | NOOP | |
| 0022 | L13: | JPNC | BDAZ,L16 |
| 0023 | | SHIFT | MULT,0,0,0 |
| 0024 | | WAIT | SDONE |
| 0025 | | MOVE | MPC,SHFT |
| 0026 | | SHIFT | NDIV,0,0,0 |
| 0027 | | GOTO | L15 |
| 0028 | | NOOP | |
| 0029 | | NOOP | |
| 002A | | NOOP | |
| 002B | L5: | CLR | ENT |
| 002C | L5A: | JPNC | ENR,L2 |
| 002D | | GOTO | L5A |
| 002E | | NOOP | |
| 002F | | NOOP | |
| 0030 | L6: | JPNC | QSESZ,L7 |
| 0031 | | JPNC | DDAZ,L10 |
| 0032 | | MOVE | WR2,N3DIV |
| 0033 | L9: | JPNC | BDAZ,L12 |
| 0034 | | GOTO | L14 |
| 0035 | | NOOP | |
| 0036 | | NOOP | |
| 0037 | L7: | SHIFT | ES,0,1,1 |
| 0038 | | WAIT | SDONE |
| 0039 | | MOVE | MPC,SHFT |
| 003A | | JPNC | DDAZ,L8 |
| 003B | | SHIFT | N3DIV,0,0,0 |
| 003C | | GOTO | L13 |
| 003D | | NOOP | |
| 003E | | NOOP | |
| 003F | L12: | SHIFT | WR2,0,0,0 |
| 0040 | | MOVE | MPC,SHFT |
| 0041 | | SHIFT | QS,0,1,1 |
| 0042 | | WAIT | SDONE |
| 0043 | | NOOP | |
| 0044 | L15: | NOOP | |
| 0045 | L16: | SHIFT | MULT,0,0,0 |
| 0046 | | WAIT | SDONE |
| 0047 | | MOVE | WR2,SHFT |
| 0048 | | GOTO | L14 |
| 0049 | | NOOP | |
| 004A | | NOOP | |
| 004B | L10: | JPNC | BDAZ,L11 |
| 004C | | MOVE | WR2,NDIV |
| 004D | L14: | CLR | BUSY |
| 004E | | WAIT | RDY |
| 004F | | CLR | ENT |
| 0050 | | SETF | BUSY |
| 0051 | | NOOP | |
| 0052 | L17A | JPNC | ENR,L17: |
| 0053 | | GOTO | L17A |
| 0054 | | NOOP | |
| 0055 | | NOOP | |
| 0056 | L11: | MOVE | WR2,C1E |
| 0057 | | GOTO | L14 |

TABLE 6-continued
BRIGHTNESS GENERATOR CODE PROGRAM

| INSTRUCTION NUMBER | SUBROUTINE ENTRY POINT | INSTRUCTION | |
|---|---|---|---|
| 0058 | | NOOP | |
| 0059 | L17: | CLR | BUSY |
| 005A | | NOOP | |
| 005B | | NOOP | |
| 005C | | NOOP | |
| 005D | | NOOP | |
| 005E | | GOTO | L18 |
| 005F | | NOOP | |
| 0060 | | NOOP | |
| 0061 | L31: | MOVE | ASB,C1 |
| 0062 | L32: | MOVE | MPC,SHFT |
| 0063 | | SHIFT | ASB,0,1,0 |
| 0064 | L18: | MOVE | LMIN,CMIN |
| 0065 | L19: | SETF | DV |
| 0066 | | WAIT | DV |
| 0067 | | MOVE | CMIN,BREG |
| 0068 | | NOOP | |
| 0069 | | NOOP | |
| 006A | | NOOP | |
| 006B | | JPNC | RDY,L19 |
| 006C | | SHIFT | MULT,0,0,0 |
| 006D | | CLR | GO |
| 006E | | SETF | BUSY |
| 006F | | JPNC | FLGZ,L20 |
| 0070 | | WAIT | SDONE |
| 0071 | | MOVE | MPC,SHFT |
| 0072 | | SHIFT | WR2,0,0,0 |
| 0073 | | NOOP | |
| 0074 | | NOOP | |
| 0075 | | NOOP | |
| 0076 | | SHIFT | MULT,1,0,0 |
| 0077 | | WAIT | SDONE |
| 0078 | | MOVE | ASB,SHFT |
| 0079 | | JPNC | ASBBGZ,L21 |
| 007A | | MOVE | POS,LMIN |
| 007B | L21: | JPNC | CMINNC,L33 |
| 007C | | CLR | BUSY |
| 007D | | WAIT | RDY |
| 007E | | SETF | GO |
| 007F | | MOVE | ASB,ME |
| 0080 | | NOOP | |
| 0081 | | NOOP | |
| 0082 | | MOVE | ASD,WR1 |
| 0083 | L22: | SETF | DV |
| 0084 | | SHIFT | C1,1,1,0 |
| 0085 | | WAIT | DV |
| 0086 | | SETF | DV |
| 0087 | | MOVE | ASD,ASDB |
| 0088 | | WAIT | DV |
| 0089 | | MOVE | ASBB,ASBB |
| 008A | | MOVE | ASB,ASBB |
| 008B | | JPNC | RDY,L22 |
| 008C | | CLR | GO |
| 008D | | JPNC | NEXACT,L30 |
| 008E | | JPNC | DDAZ,L23 |
| 008F | | SHIFT | ASD,0,1,1 |
| 0090 | | GOTO | L24 |
| 0091 | | NOOP | |
| 0092 | | NOOP | |
| 0093 | | NOOP | |
| 0094 | | NOOP | |
| 0095 | L23: | SHIFT | C1E,0,0,0 |
| 0096 | | NOOP | |
| 0097 | L24: | JPNC | RDY,L25 |
| 0098 | | SETF | GO |
| 0099 | | JPNC | BDAZ,L31 |
| 009A | | GOTO | L32 |
| 009B | | NOOP | |
| 009C | | NOOP | |
| 009D | L25: | SETF | ENT |
| 009E | L25A: | JPNC | ENR,L25A |
| 009F | | SETF | GO |
| 00A0 | | SETF | BUSY |
| 00A1 | | NOOP | |
| 00A2 | | SETF | DV |
| 00A3 | | SETF | DV |
| 00A4 | | NOOP | |
| 00A5 | | WAIT | DV |
| 00A6 | | JPNC | BRCMD,L26 |
| 00A7 | | CLR | ENT |
| 00A8 | | CLR | GO |
| 00A9 | L27: | JPNC | ENR,L28 |
| 00AA | | GOTO | L27 |
| 00AB | L28: | CLR | BUSY |
| 00AC | | GOTO | L24 |
| 00AD | | NOOP | |
| 00AE | L20: | CLR | FLG |
| 00AF | | GOTO | L21 |
| 00B0 | | NOOP | |
| 00B1 | L30: | MOVE | ASB,C1 |
| 00B2 | | MOVE | POS,LMIN |
| 00B3 | L33: | CLR | BUSY |
| 00B4 | | MOVE | BRBG,BOLD |
| 00B5 | | SETF | ENT |
| 00B6 | L34: | JPNC | ENR,L34 |
| 00B7 | | SETF | OUTE |
| 00B8 | | SETF | DV |
| 00B9 | | SETF | DV |
| 00BA | | CLR | ENT |
| 00BB | | CLR | OUTE |
| 00BC | L35: | JPNC | ENR,L36 |
| 00BD | | GOTO | L35 |
| 00BE | | NOOP | |
| 00BF | | NOOP | |
| 00C0 | | NOOP | |
| 00C1 | | NOOP | |
| 00C2 | L36: | JPNC | CMINNF,L2 |
| 00C3 | | JPNC | BOLDN1,L2 |
| 00C4 | | CLR | BOLD |
| 00C5 | | SETF | ENT |
| 00C6 | L37: | JPNC | ENR,L37 |
| 00C7 | | GOTO | L4 |

What is claimed is:

1. A method utilizing a plurality of processing means, each processing means comprising a plurality of data stores and a corresponding temporary store for each such data store, the method determining a particular criterion value and an associated positional value indicative of the degree of match between the juxtaposition of a plurality of event types of a query and a plurality of corresponding event types of a particular stored data base entry, the method utilizing a priorly-formed array of data values, each of the data values representing the number of event positions between the occurrence of an event type in the query and the occurrence of a corresponding event type in the particular stored data base entry, a group of one or more of the data values being provided for each of a plurality of different ones of the query event types, each different group being stored in a different data store with the data values thereof arranged in an incremental order from one end thereof to the other, one end being called a first end, the method comprising the steps of:

(a) designating in each processing means at least one of the data values contained in each of a plurality of the data stores as a first data value;

(b) detecting in each processing means at least one of the designated first data values, from step (a), where the detected data value has a predetermined magnitude relative to the other designated first data values in such processing means;

(c) determining from among the detected data values for all of the processing means a particular detected data value which has a predetermined magnitude relative to the others and providing a determined value corresponding to the particular detected data value;

(d) storing in each processing means the at least one detected data value, from step (b), in the temporary store which corresponds to the data store in which such detected data value is detected;

(e) forming in each of the processing means for each of the individual data stores thereof a first distance value which represents the algebraic difference between the determined data value, from step (c), and the designated data value, from step (a), in such data store;

(f) forming in each procesing means for each of the individual data stores thereof a second distance value representing the algebraic difference between the determined data value and the data value in the temporary store corresponding to such individual data store;

(g) selecting in each processing means for each of the individual data stores at least one of the distance values from among the corresponding first and second distance values, such selected first or second distance value, for a particular data store, being the one that has a predetermined magnitude relative to the non-selected distance value for the same data store;

(h) forming in each processing means for the detected data value, from step (b), a sum-of-distance value representing the sum of the absolute values of the selected distance values which are formed in step (g) for the detected data value;

(i) designating in each of the processing means a new data value in the data store which contained the determined data value and repeating the steps (b)-(i) using such new data value as the designated data value recited in step (a), the step of designating a new data value including the step of designating, in a predetermined order in the recited order of data values, the next data value from the one which was previously designated; and (j) utilizing the determined data values and the corresponding sum-of-distance values provided in each processing means during steps (b)-(i) for deriving such criterion value and positional value.

2. A method according to claim 1 wherein in each processing means the data values in the groups are arranged in an increasing value order with the smallest data value as a first data value and wherein the step of detecting comprises the step of detecting the smallest data value of the first data values.

3. A method according to claim 1 wherein the step of determining comprises the step of determining the smallest of the designated first data values.

4. A method according to claim 1 wherein in each processing means the step of selecting comprises the step of selecting the smallest of the first and second distance values.

5. A method according to claim 1 wherein in each processing means there is a store for a pipewidth value and the method comprises, for each processing means, the additional steps of:

(a) detecting a predetermined relation between each algebraic difference, used in the step of forming a sum-of-distance value, and a value in the pipewidth value store; and (b) operative upon the preceding step, detecting such predetermined relation as to a particular algebraic difference for substituting a predetermined value for such algebraic difference when forming such sum-of-distance value.

6. A method according to claim 1 wherein in each processing means, if the formed first distance value represents zero for a particular data store, the designated data value is stored in the temporary store corresponding to such data store and the next data value in such data store is designated as the first data value.

7. A method according to claim 1 wherein the processing means includes a store for a positional value, and wherein for a determined data value a positional value corresponding to the determined data value is stored in the positional value store.

8. A method according to claim 1 wherein in each processing means a weighting value is stored in the data store in association with each of said data values, the method comprising the additional step of combining the weighting values that are associated with the data values that are used in the step of forming a sum-of-distance value and to thereby form sum-of-weighting values.

9. A method according to claim 8 wherein in each processing means for each temporary store and corresponding data store which have a data value in the temporary store and a designated first data value of the corresponding group, the method includes the steps of:

(a) detecting if the distance values formed from the data value in the temporary store and the designated data value of the corresponding group are equal;

(b) selecting from the two weighting values that are associated with the two data values which are associated with the two distance values detected to be equal, that weighting value which has a predetermined magnitude relative to the other; and (c) utilizing the selected weighting value in the step of combining the weighting values.

10. A method according to claim 9 wherein in each processing means, the step of selecting from the two weighting values comprises the step of selecting the largest weighting value of the two weighting values.

11. A method according to claim 10 wherein for a determined data value the sum-of-distance value and the corresponding sum-of-weighting value formed in each processing means are combined to form a criterion value.

12. A method according to claim 11 wherein the processing means comprises a store for a criterion value and wherein for a determined data value the sum-of-distance value and the corresponding sum-of-weighting value formed in each processing means are combined to form a criterion value, the criterion value replacing a priorly-formed criterion value in the criterion value store if such newly-formed criterion value has a predetermined relation to the value in the criterion value store.

13. A method according to claim 12 wherein the value in the criterion value store is replaced with the newly-formed criterion value when the newly-formed criterion value exceeds the value in the criterion value store.

14. A method according to claim 13 wherein there is a store for the positional value, the value in the positional value store being replaced with the positional value corresponding to the detected data value used in forming a criterion value having the predetermined relation to the value in the criterion value store.

15. A method according to claim 1 wherein the step of utilizing comprises the step of forming a criterion value "B" as follows:

$$B = (QS(QS - M) - SSD)(M + SSB)\frac{MIN(QS,ES)}{MAX(QS,ES)} \cdot \frac{1}{QS^3}$$

Where:
QS = the plurality of events of a query;
ES = the plurality of events of a stored data base entry;
M = the number of events in the query for which at least one corresponding event type is not found in the entry;
SSD = is the total of the sum-of-distance values from each processing means;
SSB = is the total of the sum-of-weighting values from each processing means;
MAX(QS,ES) = is the larger of QS and ES; and
MIN(QS,ES) = is the smaller of QS and Es.

16. A method according to claim 15 comprising the step of repeating the recited steps until all data values in the data stores in all the processing means have been processed in accordance with the method.

17. A data processing means for determining a particular criterion value and an associated positional value indicative of the degree of match between the juxtaposition of a plurality of event types of a query and a plurality of corresponding event types of a particular stored data base entry, the data processing means utilizing a priorly-formed array of data values, each of the data values representing the number of event positions between the juxtaposition of an event type in the query and a corresponding event type in the particular stored data base entry, a group of one or more of the data values being provided for each of a plurality of different ones of the query event types, the data processing means comprising:
(a) a plurality of processing means, each comprising:
  (1) a plurality of data stores and a corresponding temporary store for each such data store, each different group of the data values being stored in a different data store with the data values thereof arranged in an incremental order from one end thereof to the other, one end being called a first end, the data values being stored in the data stores of a plurality of said processing means;
  (2) means for designating at least one of the data values contained in each of a plurality of the data stores as a first data value;
  (3) means for detecting at least one of the designated first data values, provided by means (a)(2), where the detected data value has a predetermined magnitude relative to the other designated first data values;
(b) means for determining from among the detected data values for all of the processing means a particular detected data value which has a predetermined magnitude relative to the others and for providing a determined value corresponding to the particular detected data value;
(c) each processing means additionally comprising:
  (1) means for storing the detected data value, from the means (a)(3), in the temporary store of such processing means, wherein the temporary store corresponds to the data store in which the detected data value is detected;
  (2) means for forming for each of the individual data stores of such processing means, a first distance value which represents the algebraic difference between the determined data value, provided by the means (b), and the designated data value, provided by the means (a)(2), in such data store;
  (3) means for forming for each of the individual data stores of such processing means, a second distance value representing the algebraic difference between the determined data value and the data value in the temporary store corresponding to such individual data store;
  (4) means for selecting for each of the individual data stores of such processing means, at least one of the distance values from among the corresponding first and second distance values, such selected first or second distance value, for a particular data store, being the one that has a predetermined magnitude relative to the non-selected distance value for the same data store;
  (5) means for forming for the detected data value, provided by the means (a)(3), a sum-of-distance value representing the sum of the absolute value of the selected distance values which are formed by the means (c)(4) for the detected data value;
  (6) means for designating a new data value in the data store, of such processing means, which contained the at least one determined data value, means for repeating the operation of the means recited above commencing with the means (a)(2) for designating using such new data value as a designated data value,
the means for designating a new data value including means for designating, in a predetermined order in the recited order of data values, the next data value from the one which was previously designated; and
(d) means for utilizing the detected data values and the corresponding sum-of-distance values provided in each processing means for deriving such criterion value and positional value.

18. A data processing means according to claim 17 wherein each processing means has the data values in the groups arranged in an increasing value order with the smallest data value as a first data value and wherein the means for detecting comprises means for detecting the smallest data value of the first data values.

19. A data processing means according to claim 17 wherein the means for determining comprises means for determining the smallest of the detected first data values.

20. A data processing means according to claim 17 wherein the means for storing the determined data value in the temporary store comprises means for storing the other designated data values in their corresponding temporary stores, which data values are of the same value as the determined data value.

21. A data processing means according to claim 17 wherein the means for selecting comprises means for selecting the smallest of the first and second distance values.

22. A data processing means according to claim 17 wherein the data processing means comprises a store for a pipewidth value, each processing means comprising:
means for detecting a predetermined relation between each algebraic difference used in forming a sum-of-distance value, and a value in the pipewidth value store; and
means for detecting such predetermined relation as to a particular algebraic difference and for substituting a predetermined value for such algebraic difference when forming a sum-of-distance value.

23. A data processing means according to claim 17 wherein the means for designating comprises means for designating as a first data value the next value in the data store if the formed first distance is zero.

24. A data processing means according to claim 17 wherein a weighting value is stored in the data stores in association with each of said data values in each of the processing means, each processing means comprising means for combining the weighting values that are associated with the data values that are used in forming a sum-of-distance value and to thereby form such sum-of-weighting values.

25. A data processing means according to claim 24 wherein for each temporary store and corresponding data store which have a data value in the temporary store and a designated first value of the corresponding group, each processing means comprises means operative:

for detecting if the distance values formed from the data value in the temporary store and the designated data value of the corresponding group are equal;

for selecting from the two weighting values that are associated with the two data value which are associated with the two distance values detected to be equal, that weighting value which has a predetermined magnitude relative to the other; and for utilizing the selected weighting value in combining the weighting values.

26. A data processing means according to claim 25 wherein the means for selecting from the two weighting values comprises means for selecting the largest weighting value of the two weighting values.

27. A data processing means according to claim 26 wherein the means for utilizing comprises means for combining for a determined data value the corresponding sum-of-distance value and the corresponding sum-of-weighting value to form a criterion value.

28. A data processing means according to claim 27 wherein each processing means comprises a store for a criterion value; and means for combining for a determined data value, the sum-of-distance value and the corresponding sum-of-weighting value to form a criterion value, the criterion value replacing a priorly-formed criterion value in the criterion value store if such newly-formed criterion value has a predetermined relation to the value in the criterion value store.

29. A data processing means according to claim 28 wherein each processing means comprises means for replacing the value in the criterion value store with the newly-formed criterion value when the newly-formed criterion value exceeds the value in the criterion value store.

30. A data processing means according to claim 29 including:

a store for a positional value; and means for storing in the positional value store for a determined data value, a positional value corresponding to the determined data value.

31. A data processing means according to claim 30 including means for replacing the value in the positional value store with the positional value corresponding to the determined data value used in forming a criterion value having the predetermined relation to the value in the criterion store.

32. A data processing means according to claim 31 wherein the means for utilizing comprises means for forming a criterion value "B" as follows:

$$B = (QS(QS - M) - SSD)(M + SSB)\frac{MIN(QS,ES)}{MAX(QS,ES)} \cdot \frac{1}{QS^3}$$

Where:

QS = the plurality of events of a query;

ES = the plurality of events of a stored data base entry;

M = the number of events in the query for which at least one correspondng event type is not found in the entry;

SSD = the total of the sum-of-distance values from each data processing means;

SSB = the total of the sum-of-weighting values from each data processing means;

MAX(QS,ES) = the larger of QS and ES; and

MIN(QS,ES) = the smaller of QS and ES.

33. The data processing means according to claim 32 comprising means for enabling the recited means to repeat the operation thereof until all the data values in the data stores have been processed.

* * * * *